United States Patent [19]

Tzikas

[11] Patent Number: 4,766,206
[45] Date of Patent: Aug. 23, 1988

[54] REACTIVE DYESTUFFS COMPRISING A VINYLSULFONYLALKYLAMINOCARBONYL MOIETY

[75] Inventor: Athanassios Tzikas, Pratteln, Switzerland

[73] Assignee: Ciba-Geigy Corporation, Ardsley, N.Y.

[21] Appl. No.: 911,176

[22] Filed: Sep. 24, 1986

[30] Foreign Application Priority Data

Oct. 3, 1985 [CH] Switzerland ............... 4289/85

[51] Int. Cl.$^4$ ............... C09B 62/08; C09B 62/02; C09B 62/44; C09B 62/62
[52] U.S. Cl. ............... 534/619; 534/617; 534/618; 534/620; 534/621; 534/622; 534/623; 534/624; 534/625; 534/626; 534/627; 534/628; 534/629; 534/630; 534/631; 534/632; 534/633; 534/634; 534/635; 534/636; 534/637; 534/638; 534/642; 534/643
[58] Field of Search ............... 534/617-638, 534/642, 643

[56] References Cited

U.S. PATENT DOCUMENTS

| | | | |
|---|---|---|---|
| 3,128,267 | 4/1964 | Schmitz et al. | 534/643 X |
| 3,503,953 | 3/1970 | Loffelman | 534/643 X |
| 3,737,437 | 6/1973 | Von Brachel et al. | 260/314.5 |
| 4,248,773 | 2/1981 | Hurter et al. | 534/643 X |
| 4,602,084 | 7/1986 | Hurter | 534/643 X |

FOREIGN PATENT DOCUMENTS

| | | | |
|---|---|---|---|
| 0144766 | 6/1985 | European Pat. Off. | 534/619 |
| 881536 | 11/1961 | United Kingdom | 534/643 |
| 1155149 | 6/1969 | United Kingdom | 534/643 |
| 1354906 | 5/1974 | United Kingdom | 534/643 |
| 1435575 | 5/1976 | United Kingdom | 534/617 |
| 1576237 | 10/1980 | United Kingdom | 534/638 |

*Primary Examiner*—Floyd D. Higel
*Attorney, Agent, or Firm*—Edward McC. Roberts; Meredith C. Findlay

[57] ABSTRACT

Disclosed are reactive dyes, and the use thereof, according to the formula $$(R-U)_n-D-(X)_r$$

in which D is the radical of a monoazo, polyazo or metal complex azo dye; U is —CO— or —SO$_2$—; R is a radical of the formula

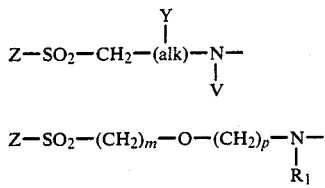

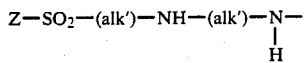

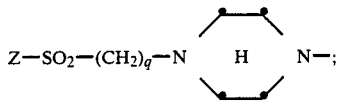

or

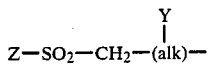

Z is sulfatoethyl, β-thiosulfatoethyl, β-phosphatoethyl, β-acetoxyethyl, β-halogenoethyl or vinyl; alk is straight-chained or branched C$_1$–C$_6$-alkylene; Y is hydrogen, chlorine, bromine, fluorine, hydroxyl, sulfato, C$_1$–C$_4$-alkanoyloxy, cyano, carboxyl, alkoxycarbonyl having 1 to 5 C-atoms, carbamoyl or a radical —SO$_2$—Z in which Z is as defined above; V is hydrogen or C$_1$–C$_4$-alkyl unsubstituted or substituted by carboxyl, sulfo, C$_1$–C$_2$-alkoxy, halogen or hydroxyl or is a radical $$Z-SO_2-CH_2-(alk)-\overset{Y}{|}-$$

in which Z, alk and Y are as defined above; R$_1$ is hydrogen or C$_1$–C$_6$-alkyl; alk' are independently of each other straight-chained or branched C$_2$–C$_6$-alkylene; n is 1 or 2, r is 1 or 2, m is 1 to 6, p is 1 to 6, q is 1 to 6; and X is a reactive radical comprising a halogenotriazine, halogenopyrimidine, halogenoacryloyl, halogenopropionyl, β-halogenoethylsulfonyl, β-sulfatoethylsulfonyl or vinylsulfonyl group, with the proviso that if D is a monoazo dye X must comprise a halogenotriazine or halogenopyrimidine group.

10 Claims, No Drawings

REACTIVE DYESTUFFS COMPRISING A VINYLSULFONYLALKYLAMINOCARBONYL MOIETY

The present invention relates to novel reactive dyes, to a process for their preparation and to their use for dyeing or printing fiber materials.

The practice of dyeing with reactive dyes has recently led to increased demands on the quality of the dyeings and the economics of the dyeing process. There consequently continues to be a demand for new reactive dyes which have improved properties, in particular application properties.

The present demand in the dyeing of cotton by the cold pad-batch method is for reactive dyes which have adequate substantivity at the low dyeing temperature and which also have good wash-off properties with respect to the unfixed portions. They should also have a high reactivity, so that only short batching times are necessary, and they should in particular produce dyeings having high degrees of fixation. These demands are met only inadequately by known dyes.

The present invention therefore has for its object to find new, improved reactive dyes for the cold pad-batch method which have the qualities characterized above to a high degree. The new dyes should be distinguished in particular by high degrees of fixation and high fiber-dye bond stabilities, and moreover the portions not fixed on the fiber should be easy to wash off. They should furthermore produce dyeings having good allround fastness properties, for example light and wet fastness properties.

It has now been found that this object is achieved with the novel reactive dyes defined hereinafter.

The invention accordingly provides reactive dyes of the formula $$(R-U)_{\overline{n}}D-(X)_r \qquad (1),$$

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; U is —CO— or —SO$_2$—; R is a radical of the formula

(1a)

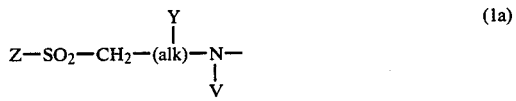
(1b)

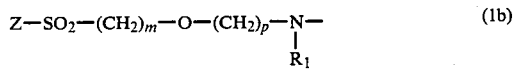
(1c)

or

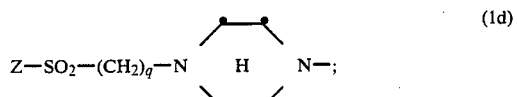
(1d)

Z is sulfatoethyl, β-thiosultafoethyl, β-phosphatoethyl, β-acetoxyethyl, β-halogenoethyl or vinyl; alk is a polymethylene radical having 1 to 6 C atoms or its branched isomers; Y is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical —SO$_2$—Z in which Z is as defined above; V is hydrogen or an alkyl radical having 1 to 4 C atoms which can be substituted by carboxyl or sulfo groups or by derivatives thereof, alkoxy groups having 1 or 2 C atoms, halogen or hydroxyl; or a radical

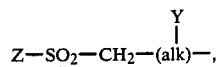

in which Z, alk and Y are as defined above; R$_1$ is hydrogen or C$_{1-6}$-alkyl; alk' are independently of each other polymethylene radicals having 2 to 6 C atoms or branched isomers thereof; n is 1 or 2, r is 1 or 2, m is 1 to 6, p is 1 to 6, q is 1 to 6; and X is an aliphatic, aromatic or heterocyclic reactive radical; and if U is —SO$_2$—, V must not be hydrogen; except the reactive dyes of German Offenlegungsschrift No. 2,040,620.

The radical D in the formula (1) can contain bonded to its basic structure the substituents customary with organic dyes.

Examples of further substituents in the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo. Preferably the radical D contains one or more sulfonic acid groups. Suitable further substituents on the radical D are, in particular, methyl, ethyl, methoxy, ethoxy, acetylamino, benzoylamino, amino, chlorine, bromine, ureido, hydroxyl, carboxyl, sulfomethyl or sulfo. A β-halogenoethyl Z is in particular the β-chloroethyl radical. The polymethylene radical alk is preferably methylene, ethylene, methylmethylene, propylene or butylene. An acyloxy radical Y is in particular etyloxy [sic], propionyloxy or butyryloxy, and as an alkoxycarbonyl radical Y is in particular methoxycarbonyl, ethoxycarbonyl or propyloxycarbonyl. An alkyl radical V can be methyl, ethyl, propyl, isopropyl, butyl, isobutyl, sec-butyl or tert.-butyl. Derivatives of a carboxyl or sulfo group are for example carbamoyl, N-methylcarbamoyl, N-ethylcarbamoyl, N,N-dimethylcarbamoyl and N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfamoyl, N,N-dimethylsulfamoyl, N,N-diethylsulfamoyl, methylsulfonyl, ethylsulfonyl and propylsulfonyl. The radical $R_1$ is for example methyl, ethyl, propyl, isopropyl, butyl, isobutyl, sec.-butyl, tert.-butyl, pentyl or hexyl, or preferably hydrogen. The polymethylene radicals alk' are preferably ethylene, propylene or butylene. The indices m, p and q are independent of one another and preferably 2, 3 or 4.

The reactive radical X is in particular a low molecular weight alkanoyl or alkylsulfonyl radical which is substituted by a detachable atom or a detachable group; a low molecular weight alkenoyl or alkenesulfonyl radical which can be substituted by a detachable atom or a detachable group; a carbocyclic or heterocyclic radical which contains 4-, 5- or 6-rings and is ... [sic] via a carbonyl or sulfonyl group and substituted by a detachable atom or a detachable group; or a triazine or pyrimidine radical which is bonded directly via a carbon atom and is substituted by a detachable atom or a detachable group; or contains such a radical. Examples of such reactive radicals are six-membered heterocyclic radicals which contain halogen atoms and are bonded via an amino group, such as any halogenotriazine or halogenopyrimidine radical, or any aliphatic acyl radical, such as any halogenopropionyl or halogenoacryloyl radical, or any directly bonded β-halogenoethylsulfonyl, β-sulfatoethylsulfonyl or vinylsulfonyl radical. The reactive radical X can thus be bonded to D via an amino group or in some other way, for example by a direct bond.

Preference is given to reactive dyes of the formula (1) in which D is the radical of a monoazo or disazo dye or of a metal complex azo dye.

Preference is given in particular to reactive dyes of the formula

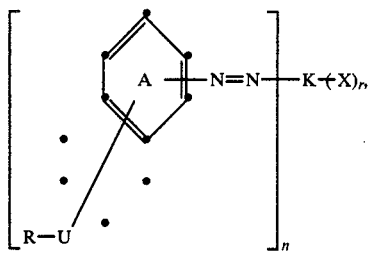
(2)

in which K is the radical of a coupling component of the benzene or naphthalene series or of the heterocyclic series; U, R, X, n and r are as defined under the formula (1); and the benzene or naphthalene radical A can contain further substituents.

The radical K can in turn contain azo groups, and can thus be the radical of an azo compound, in particular of a monoazo compound. When K is the radical of a coupling component of the benzene or naphthalene series, K is preferably a benzene, naphthalene, arobenzene, naphthylazobenzene, azonaphthalene or phenylazonaphthalene radical which can be further substituted as indicated hereinafter; in this case n is preferably 1. When n is 2, K must be the radical of a twice coupleable component, or contain such a radical. Suitable twice coupleable components are in particular those of the aminonaphtholsulfonic acid series which are mentioned hereinafter. When K is the radical of a coupling component of the heterocyclic series, it is in particular a pyrazolone or pyridone radical or a radical of one of the hetercyclic coupling components mentioned hereinafter. In this case too the radical K can contain further azo groups, for example when K is present as a phenylazopyrazolone radical.

Suitable further substituents on the benzene or naphthalene radical A are the same as those mentioned above in the explanation of the radical D.

Preference is given further to reactive dyes of the formula

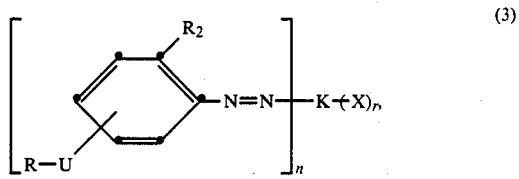
(3)

in which $R_2$ is hydrogen, $C_{1-4}$-alkyl, $C_{1-4}$-alkoxy, halogen, hydroxyl, carboxyl or sulfo; and K, U, R, X, n and r are as defined under the formula (2);

reactive dyes of the formula

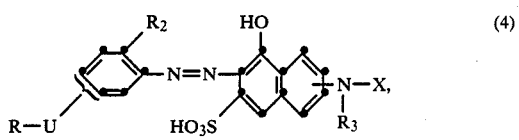
(4)

in which $R_3$ is hydrogen or a substituted or unsubstituted $C_{1-4}$-alkyl radical; and $R_2$, U, R and X are as defined under the formula (3);

reactive dyes of the formula

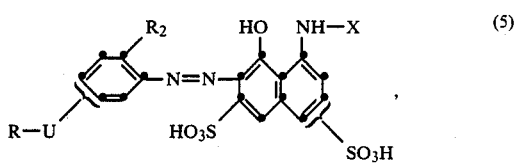
(5)

in which $R_2$, U, R and X are as defined under the formula (3);

reactive dyes of the formula

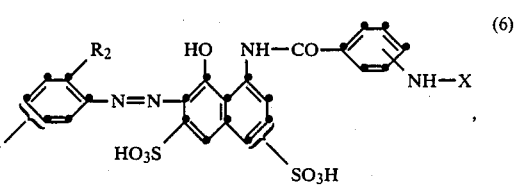
(6)

in which $R_2$, U, R and X are as defined under formula (3);

reactive dyes of the formula

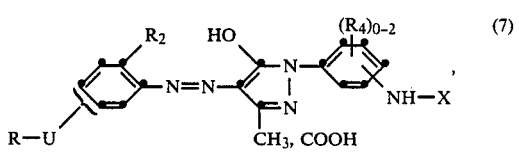
(7)

in which $R_4$ is 0 to 2 substituents from the group $C_{1-4}$-alkyl, $C_{1-4}$-alkoxy, halogen, carboxyl or sulfo; and $R_2$, U, R and X are as defined under the formula (3);

reactive dyes of the formula

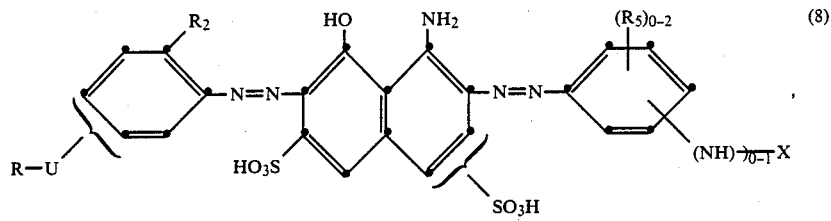

in which $R_5$ is 0 to 2 substituents from the group $C_{1-4}$-alkyl, $C_{1-4}$-alkoxy, halogen, carboxyl or sulfo; and $R_2$, U, R and X are as defined under the formula (3);

reactive dyes of the formula

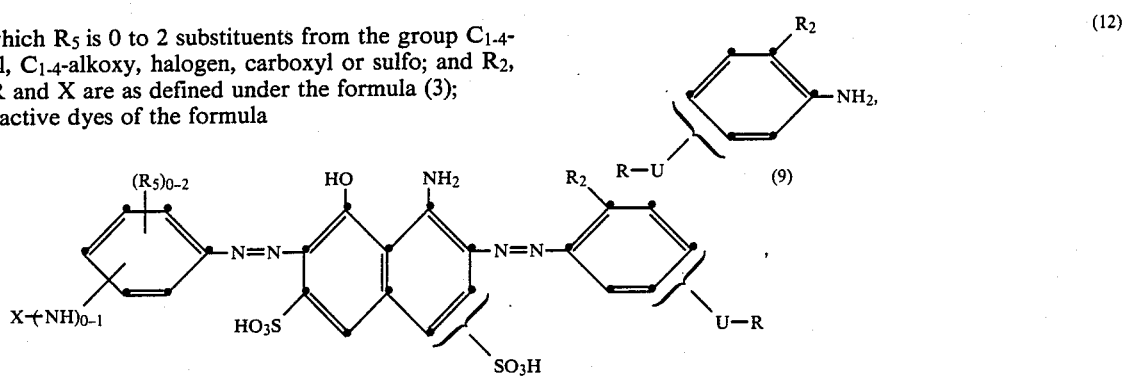

in which $R_5$ is 0 to 2 substituents from the group $C_{1-4}$-alkyl, $C_{1-4}$-alkoxy, halogen, carboxyl or sulfo; and $R_2$, U, R and X are as defined under the formula (3);

heavy metal complexes of reactive dyes of the formulae (1) to (9); suitable complexing heavy metals being in particular copper, nickel, cobalt or chromium.

Preference is given in particular to compounds of the formulae (1) to (9) in which Z is the β-sulfatoethyl, β-chloroethyl or vinyl group.

The process for preparing reactive dyes of the formula (1) comprises reacting dyes of the formula

or precursors thereof with reactive components to introduce the radicals R and X to give reactive dyes of the formula (1), or converting the resulting intermediates into the desired end dyes, if desired following up with a further conversion reaction.

If desired, a precursor is used in place of a dye of the formula (10) and the end dye is completed by further reaction or reactions, for example condensation, coupling or some other conversion reaction, with the intermediate.

The preferred azo dyes of the formulae (2) to (9) can be obtained by starting from a diazo component which already contains the radical —U—R, ie. from a compound of the formula

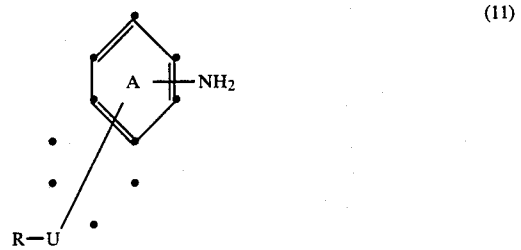

diazotizing this compound and coupling onto a coupling component which likewise already contains the radical X, for example a β-sulfatoethylsulfonyl or vinylsulfonyl group, or a halogenopyrimidyl or halogenotriazinylamino radical; or which contains an amino group which can be subsequently acylated with a reactive component, for example, α,β-dibromopropionyl chloride, 2,4,6-trichloro-s-triazine, 2,4-difluoro-6-amino-s-trazine or 2,4,6-trifluoro-5-chloropyrimidine.

In the case of the disazo dyes of the formulae (8) and (9), the reactive radical X is bonded not to a coupling component but likewise to a diazo component. In this case too the starting point is a diazo component which already contains the radical X, for example, 1-amino-3-vinylsulfonylbenzene, or a diazo component into which the radical X can be introduced after completed coupling, for example 1,3-phenylenediamine-4-sulfonic acid subsequently acylated with 2,4-dichloro-6-3'-sulfophenylamino-s-triazine [sic].

When the reactive radical X contains two or more than two detachable substituents, for example halogen atoms, the compounds of the formulae (11) or (12) can be condensed onto the radical X, so that a halogen atom is replaced by the reactive amino radical in question. This method gives, for example, reactive dyes of the formula (3) which, in addition to the radical R—U— in the diazo component, contain a radical

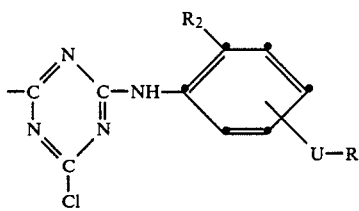

(13)

bonded to the coupling component. Instead of the —NH— group an —N(alkyl)— group can be present as a linking member.

Starting compounds which can be used, depending on the structure of the desired end dye, are as follows.

COMPOUNDS OF THE FORMULA (11) and N-ALKYL DERIVATIVES THEREOF

1-β-(β'-chloroethylsulfonyl)-ethylcarbamoyl-3-aminobenzene,
1-β-(β'-chloroethylsulfonyl)-ethylcarbamoyl-4-chloro-3-aminobenzene,
1-β-(β'-chloroethylsulfonyl)-ethylcarbamoyl-4-methyl-3-aminobenzene,
1-β-(β'-chloroethylsulfonyl)-ethylcarbamoyl-4-methoxy-3-aminobenzene,
1-β-[β'-(β''-chloroethylsulfonyl)-ethyloxy]-ethylcarbamoyl-3-aminobenzene,
1-γ-(β'-chloroethylsulfonyl)-propylcarbamoyl-3-aminobenzene,
1-bis-[β-(β'-chloroethylsulfonyl)-ethyl]-carbamoyl-3-aminobenzene,
1-bis-[γ-(β'-chloroethylsulfonyl)-propyl]-carbamoyl-3-aminobenzene,
1-β-(β'-chloroethylsulfonyl)-ethylcarbamoyl-3-N-ethylaminobenzene,
1-β-[β'-chloroethylsulfonyl)-ethylcarbamoyl-3-N-isopropylaminobenzene,
1-γ-(β'-chloroethylsulfonyl)-propylcarbamoyl-3-N-isopropylaminobenzene,
1-β-(β'-chloroethylsulfonyl)-ethylcarbamoyl-4-aminobenzene, 1-β-[β'-(β''-chloroethylsulfonyl)-ethyloxy]-ethylcarbamoyl-4-aminobenzene,
1-γ-(β'-chloroethylsulfonyl)-propylcarbamoyl-4-aminobenzene, 1-bis-[β-(β'-chloroethylsulfonyl)-ethyl]-carbamoyl-4-aminobenzene,
1-bis-[γ-(β'-chloroethylsulfonyl)-propyl]-carbamoyl-4-aminobenzene,
1-β-(β'-chloroethylsulfonyl)-ethylcarbamoyl-4-N-ethylaminobenzene,
1-γ-(β'-chloroethylsulfonyl)-propylcarbamoyl-4-N-isopropylaminobenzene,
1-β-(vinylsulfonyl)-ethylcarbamoyl-4-aminobenzene,
1-δ-(β'-chloroethylsulfonyl)-butylcarbamoyl-4-aminobenzene,
1-bis-[β-(vinylsulfonyl)-ethyl]-carbamoyl-4-aminobenzene,
1-bis-[β-(β'-chloroethylsulfonyl)-ethyl]-carbamoyl-4-chloro-3-aminobenzene,
1-bis-[γ-(β'-chloroethylsulfonyl)-propyl)-carbamoyl-4-methoxy-3-aminobenzene,
1-δ-(β'-chloroethylsulfonyl)-butylcarbamoyl-3-aminobenzene,
1-bis-[β-(β'-chloroethylsulfonyl)-ethyl]-carbamoyl-4-methyl-3-aminobenzene,
1-β-[β'-(β''-chloroethylsulfonyl)-ethyloxy]-ethylcarbamoyl-3-aminobenzene,
1-β-(β'-chloroethylsulfonyl)-ethylcarbamoyl-4-hydroxy-3-aminobenzene,
1-bis-[β-(β'-chloroethylsulfonyl)-ethyl]-carbamoyl-4-hydroxy-3-amino-benzene,
1-bis-[β-(β'-chloroethylsulfonyl)-ethyl]-carbamoyl-4-methoxy-3-aminobenzene,
and corresponding compounds in which the β-chloroethylsulfonyl group is replaced by β-sulfatoethylsulfonyl or vinylsulfonyl; also suitable are:
1-β-(β'-chloroethylsulfonyl)-ethylcarbamoyl-4-amino-3-sulfobenzene,
1-β-(β'-sulfatoethylsulfonyl)-ethylcarbamoyl-4-amino-3-sulfobenzene,
1-β-vinylsulfonyl-ethylcarbamoyl-4-amino-3-sulfobenzene,
1-β-vinylsulfonyl-ethylcarbamoyl-3-amino-2-sulfobenzene,
1-β-(β'-sulfatoethylsulfonyl)-ethylcarbamoyl-3-amino-4-methoxybenzene,
1-bis-(β-vinylsulfonylethyl)-carbamoyl-4-amino-3-sulfobenzene,
1-bis-[β-(β'-sulfatoethylsulfonyl)-ethyl]-carbamoyl-3-amino-4-methoxybenzene,
1-bis-(β-vinylsulfonylethyl)-carbamoyl-3-amino-2-sulfobenzene,
1-(3-amino-4-methoxybenzoyl)-N'-(γ-vinylsulfonylpropyl)piperazine,
1-bis(β-vinylsulfonylethyl)carbamoyl-4-amino-3-methoxybenzene,
1-β-(β'-vinylsulfonyl)-ethylamino)-ethylcarbamoyl-3-aminobenzene,
1-(3-amino-4-methylbenzoyl)-N'-(β-vinylsulfonylethyl)-piperazine,
1-bis-[β-(β'-sulfatoethylsulfonyl)-ethyl]-carbamoyl-4-amino-3-sulfobenzene,
1-bis-(β-vinylsulfonylethyl)carbamoyl-3-amino-4-methoxybenzene,
1-(β-vinylsulfonylethyl)-carbamoyl-3-amino-4-methoxybenzene,
1-(4-amino-3-sulfobenzoyl)-N'-(γ-vinylsulfonylpropyl)-piperazine,
1-β(β'-vinylsulfonylethylamino)-ethylcarbamoyl-4-amino-3-sulfobenzene,
1-β-(β'-sulfatoethylsulfonyl)-ethylcarbamoyl-3-amino-4-methylbenzene,
1-bis-[β-(β'-chloroethylsulfonyl)-ethyl]-carbamoyl-4-amino-3-sulfobenzene,
1-(4-amino-3-sulfobenzoyl)-N'-(β-vinylsulfonylethyl)-piperazine,
1-β-(β'-vinylsulfonylethylamino)-ethylcarbamoyl-4-amino-3-sulfobenzene,
5-amino-1,3-bis(β-vinylsulfonylethylcarbamoyl)-benzene,
1-β-(β'-vinylsulfonylethyloxy)-ethylcarbamoyl-4-amino-3-sulfobenzene.
and further analogous aminobenzamides or aminobenzenesulfonamides of the following amino compounds:
β-[β'-(β''-chloroethylsulfonyl)-ethylamino]-ethylamine,
β-(β'-vinylsulfonyl-ethylamino)-ethylamine,
β-[β'-(β''-sulfatoethylsulfonyl)-α'-methylethylamino]ethylamine,
β-[β'-(β''-sulfatoethylsulfonyl)-α'-methyl-ethylamino]-β-methyl-ethylamine,
γ-[β'-(β''-sulfatoethylsulfonyl)-α'-methyl-ethylamino]-propylamine,
Δ-[β'-(β''-sulfatoethylsulfonyl)-α'-methyl-ethylamino]-n-butylamine.

Suitable diazo components are furthermore suitable compounds from the aminobenzene and aminonaphthalene series, for example those which are present in the azo dyes of the formulae mentioned hereinafter, such as 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene-1,3-diamino-2,4,6-trimethylbenzene, 1,4-diaminonaphthalene-1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-amino-benzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid and 1,3,5-triaminobenzene.

Aromatic amines which can be used as diazo components for preparing the monoazo or disazo dyes and which contain one or two bonded groups of the formula X—SO$_2$— are for example:

1-amino-4-β-sulfatoethylsulfonylbenzene, 1-amino-4-β-thiosulfatoethylsulfonylbenzene, 1-amino-4-vinylsulfonylbenzene, 1-amino-4-β-chloroethylsulfonylbenzene, 1-amino-3-β-sulfatoethylsulfonylbenzene, 1-amino-3-vinylsulfonylbenzene, 1-amino-2-methoxy-5-β-sulfatoethylsulfonylbenzene, 1-amino-2-methoxy-5-β-thiosulfatoethylsulfonylbenzene, 1-amino-2-methoxy-5-vinylsulfonylbenzene, 1-amino-4-methoxy-3-β-sulfatoethylsulfonylbenzene, 1-amino-4-methoxy-3-β-vinylsulfonylbenzene, 1-amino-2,5-dimethoxy-4-β-sulfatoethylsulfonylbenzene, 1-amino-2,5-dimethoxy-4-vinylsulfonylbenzene, 1-amino-2-methoxy-4-β-sulfatoethylsulfonyl-5-methylbenzene, 1-amino-2-methoxy-4-vinylsulfonyl-5-methylbenzene, 1-amino-3-β-sulfatoethylsulfonyl-6-carboxybenzene, 1-amino-3-vinylsulfonyl-6-carboxybenzene, 1-amino-4-β-sulfatoethylsulfonylbenzene-2-sulfonic acid, 1-amino-4-vinylsulfonylbenzene-2-sulfonic acid, 1-amino-5-vinylsulfonylbenzene-2,4-disulfonic acid, 1-amino-2-hydroxy-5-β-sulfatoethylsulfonylbenzene, 1-amino-2-hydroxy-4-β-sulfatoethylsulfonylbenzene-1-amino-2-hydroxy-5-β-sulfatoethylsulfonylbenzene-3-sulfonic acid, 1-amino-2-bromo-4-β-sulfatoethylsulfonylbenzene, 1-amino-2,6-dichloro-4-β-sulfatoethylsulfonylbenzene, 1-amino-2,4-di-(β-sulfatoethylsulfonyl)-benzene, 1-amino-2,4-di-(β-sulfatoethylsulfonyl)-5-chlorobenzene, 1-amino-2,4-di-(β-thiosulfatoethylsulfonyl)-5-chlorobenzene, 1-amino-2,4-di(vinylsulfonyl)-benzene, 1-amino-2,4-di-(vinylsulfonyl)-5-chlorobenzene, 1-amino-2,4-di-(β-acetoxyethylsulfonyl)-benzene, 1-amino-2,4-di-(β-acetoxyethylsulfonyl)-5-chlorobenzene, 2-amino-8-β-sulfatoethylsulfonylnaphthalene, 2-amino-6-β-sulfatoethylsulfonylnaphthalene, 2-amino-6-β-sulfatoethylsulfonylnaphthalene-1-sulfonic acid, 2-amino-8-β-sulfatoethylsulfonylnaphthalene-6-sulfonic acid and 2-amino-6,8-di-(β-sulfatoethylsulfonyl)-naphthalene.

A mention should also be given to corresponding β-hydroxy compounds which can be used as precursors, for example: 1-amino-4-β-hydroxyethylsulfonylbenzene, 1-amino-3-β-hydroxyethylsulfonylbenzene, 1-amino-2,4-di-(β-hydroxyethylsulfonyl)-benzene and 1-amino-2,4-di-(β-hydroxyethylsulfonyl)-5-chlorobenzene.

If the diazo component to be used is not a diamine but an aminoacetylamino compound from which the acetyl group is subsequently to be re-eliminated by hydrolysis, as mentioned above in the explanation of the process, the monoacetyl compounds of the abovementioned diazo components are possible, examples thereof being 1-acetylamino-3-aminobenzene-4-sulfonic acid and 1-acetylamino-4-aminobenzene-3-sulfonic acid.

The coupling components are in the main suitable compounds of the aminobenzene and naphthalene series, for example anilines, N-monosubstituted anilines, m-phenylenediamine derivatives, aminonaphthalenes, naphthols, aminonaphthalenesulfonic acid, naphtholsulfonic acids or aminonaphtholsulfonic acids, and also pyrazolones, aminopyrazoles, aminopyridines, hydroxypyridines/pyridones, aminopyrimidines, hydroxypyrimidines, indoles, barbituric acid derivatives or acetoacetarylides. Specific examples are:

1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 2-amino-5-hydroxynaphthalene-7-sulfonic acid, 2-methyl- or 2-ethylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethylamino-8-hydroxynaphthalene-6-sulfonic acid, 2-amino-8-hydroxynaphthalene-3,6-disulfonic acid, 1-amino-5-hydroxynaphthalene-7-sulfonic acid, 1-amino-8-hydroxynaphthalene-3,6-or -4,6-disulfonic acid, 1-(4'-aminobenzoylamino)-8-hydroxynaphthalene-3,6- or -4,6-disulfonic acid, 2-(4'-amino-3'-sulfophenylamino)-5-hydroxynaphthalene-7-sulfonic acid, 1-amino-8-hydroxynaphthalene-4-sulfonic acid, 2,4,6-triamino-3-cyanopyridine, 1-β-aminoethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1- amino-3-(N,N-di-β-hydroxyethylamino)-benzene, 1-amino-3-(N,N-di-β-sulfatoethylamino)-benzene, 1-amino-3-(N,N-di-β-hydroxyethylamino)-4-methoxybenzene, 1-amino-3-(N,N-di-β-sulfatoethylamino)-4-methoxybenzene, 1-amino-3-sulfobenzylaminobenzene, 1-amino-3-sulfobenzylamino-4-chlorobenzene, 1-amino-3-(N,N-di-sulfo-benzylamino)-benzene, 1-(3'-aminophenyl)-3-methyl-5-pyrazolone and 1-(aminophenyl)-3-carboxy-5-pyrazolones which can be substituted in the phenyl nucleus by chlorine, methyl, methoxy, nitro or sulfo, such as 1-(2'-sulfo-4'-aminophenyl)-3-carboxypyrazol-5-one.

If one of the two components contains both reactive groups at the same time or if these can be introduced into the component in question, for example if a compound of the formula (II) is used a coupling component, the other component, in this case the diazo component, can also be non-reactive, examples being:

aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 2-aminodiphenyl ether, 1-aminobenzene-2-, -3- or -4-sulfonamide, 1-aminobenzene-2-, -3- or -4-carboxylic acid, dehydrothio-p-toluidine-sulfonic acid, 1-amino-3-trifluoromethylbenzene-6-sulfonic acid, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, 6-, -7- or -8-sulfonic acid, 2-aminonaphthalene-1-, -3-, -4-, -5-, -6-, -7- or -8-sulfonic acid, 2-aminonaphthalene-3,6- or 5,7-disulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-6-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid.

The diazotization of intermediates containing a diazotizable amino group is generally effected by the action of nitrous acid in aqueous mineral acid solution at low temperature and the coupling on to the coupling components at strongly [sic] acid, neutral or weakly alkaline pH.

If X is a reactive radical bonded via an amino group, the condensation of the corresponding reactive components with the diazo components or the coupling components, or with acylatable monoazo or disazo intermediates or with amino-containing dyes or precursors thereof is preferably effected in aqueous solution or suspension at a low temperature and at weakly acid, neutral or weakly alkaline pH. Advantageously the hydrogen halide freed in the course of the condensation is continuously neutralized by adding aqueous alkali metal hydroxides, carbonates or bicarbonates.

A modified embodiment of the process comprises first preparing a dye which contains a precursor of the reactive radical and subsequently converting this precursor into the final form, for example by esterification or an addition reaction. It is possible for example to prepare a dye in which Z is an HO—$CH_2CH_2$—$SO_2$— radical and to react the intermediate with sulfuric acid before or after the acylation, so that the hydroxyl group is converted into a sulfato group; or to use an analogous dye in which Z is an $H_2C{=}CH$—$SO_2$— group and to add thiosulfuric acid onto the intermediate to form an $HO_3SS$—$CH_2CH_2$—$SO_2$— radical. The sulfation of the hydroxyl group in the dye of the formula (1) or in a suitable precursor is effected for example by reacting with concentrated sulfuric acid at 0° C. to a moderately elevated temperature. The sulfation can also be effected by reacting the hydroxy compound with two equivalents of chlorosulfonic acid per hydroxyl group in a polar organic solvent, for example N-methylpyrrolidone, at 10° to 80° C. Preferably the sulfation is effected by adding the compound in question to sulfuric acid monohydrate at temperatures between 5° and 15° C. The introduction of another radical for Z in a compound of the formula (1) or in an intermediate in place of a halogen atom or the sulfato group, for example a thiosulfone or phosphato group, is effected in manner known per se.

In addition it is possible to follow up the synthesis with elimination reactions. For example, reactive dyes of the formula (1) which contain sulfatoethylsulfonyl radicals can be treated with agents which eliminate hydrogen halide, such as sodium hydroxide, and the sulfatoethylsulfonyl radicals turn into vinylsulfonyl radicals.

If desired, it is possible to use a process variant in which the starter materials used are dye precursors. This variant is suitable for preparing reactive dyes of the formula (1) in which D is the radical of a dye which is composed of two or more than two components, for example of an anthraquinone dye of the bromomine acid series, of a copper or nickel phthalocyanine, or of a copper-formazan. In principle, the reactive dyes of the formula (1) of all dye classes can be prepared in a manner known per se or analogously to known procedures by starting from precursors or intermediates for dyes which contain fiber-reactive radicals as per the formula (1), or by introducing these fiber-reactive radicals into intermediates which are suitable for this purpose and have dye character.

If the reactive dyes prepared contain groups capable of metal complex formation, the reactive dyes can subsequently also be metallized.

The most important process variants are described in the worked examples.

Also of importance are the compounds of the formula

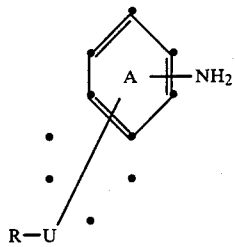
(11)

in which R and U are as defined under the formula (1).

The compounds of formula (11) can be prepared by condensing the corresponding aminobenzoyl or aminonaphthoyl chlorides or the corresponding sulfonic acid chlorides with amines which conform to the radicals of the formula (1a) or (1b); or by starting from a nitrobenzoyl or nitro-naphthoyl chloride or sulfochloride, condensing with the amine and reducing the nitro group to an amino group. According to another method described in German Offenlegungsschrift No. 2,040,620, the acid chloride can be reacted with an unsaturated aliphatic amine and 2-mercaptoethanol can be addedonto the double bond of the acid amide at temperatures between 50° C. and 180° C. using catalytic amounts of a free radical producer or of sulfur. The resulting hydroxyethyl thioether compounds can also be prepared by condensing the acid chloride with a halogenoalkylamine and heating the condensation product with 2-mercaptoethanol and sodium alcoholate in alcohol. The thioether compounds are then additionally oxidized to the corresponding sulfones.

The oxidation of the thioether compounds to the sulfones can be effected by various methods, for example with hydrogen peroxide with or without the presence of tungsten or vanadium compounds as catalysts, and also with peracetic acid, potassium permanganate or chromic acid, or with chlorine/hydrochloric acid in each case in an aqueous, aqueous-organic or organic medium.

The carboxamides and sulfonamides thus obtainable, in which the grouping —$SO_2$—Z is a β-hydroxyethylsulfonyl group, can be converted by treatment with sulfating agents, phosphorylating agents, halogenating agents, alkyl- or aryl-sulfonic acid halides, alkyl- or aryl-carboxylic acid halides, alkyl- or aryl-carboxylic anhydrides into the corresponding dye precursors in which the —$SO_2$—Z grouping is the —$SO_2$—$CH_2$—$CH_2$—O—$SO_3$H, —$SO_2$—$CH_2$—$CH_2$—O—$PO_3H_2$, —$SO_2$—$CH_2$—$CH_2$— halogen or —$SO_2$—$CH_2$—$CH_2$—O—acyl grouping. The products thus obtained can in turn be converted by treatment with alkalizing agents, for example alkali metal hydroxide or alkali metal carbonate, such as sodium hydroxide or sodium carbonate, into corresponding compounds in which the —$SO_2$—Z grouping is a $SO_2$—CH=$CH_2$ grouping. The products thus obtained can in turn be converted by reaction (addition) with salts of thiosulfuric acid, such as sodium thiosulfate, with dialkylamines, such as dimethylamine or diethylamine, or with phenol into compounds in which the —$SO_2$—Z grouping is the —$SO_2$—$CH_2$—$CH_2$—S—$SO_3H$, —$SO_2$—$CH_2$—$CH_2$—N(alkyl)$_2$ or

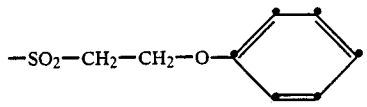

grouping.

Suitable sulfating agents are herein for example concentrated sulfuric acid and also chlorosulfonic acid and amido-sulfonic acid or other compounds which give off sulfur trioxide. Suitable phosphorylating agents are herein for example concentrated phosphoric acid, pyrophosphoric, metaphosphoric or polyphosphoric acid, alkyl polyphosphates, phosphorus oxychloride or mixtures of phosphoric acid and phosphorus(V) oxide. Suitable halogenating agents are for example thionyl chloride or thionyl bromide.

Preferred compounds have the formula

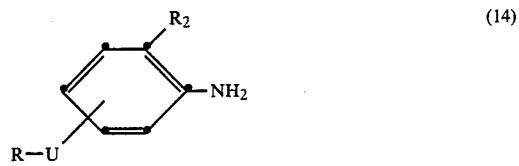
(14)

in which R is a radical of the formula

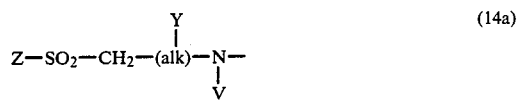
(14a)

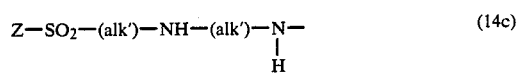
(14b)

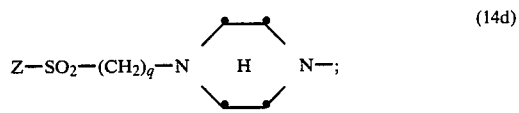
(14c)

or

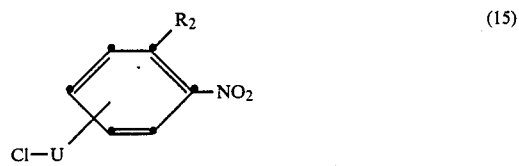
(14d)

U, alk', A, Z, V, $R_1$, alk, m, p and q are as defined under the formula (1); and $R_2$ is hydrogen, $C_{1-4}$-alkyl, $C_{1-4}$-alkoxy, halogen, hydroxyl, carboxyl or sulfo.

The preferred process for preparing the compounds of the formula (14) comprises condensing a nitrobenzoyl chloride of the formula (15)

with an amine of the formula $$Z-SO_2-CH_2-(alk)-\underset{V}{\overset{Y}{\underset{|}{N}H}} \quad (16)$$

$$Z-SO_2-(CH_2)_m-O-(CH_2)_p-\underset{R_1}{\overset{|}{N}H} \quad (17)$$

$$Z-SO_2-(alk')-NH-(alk')-NH_2 \quad (18)$$

or

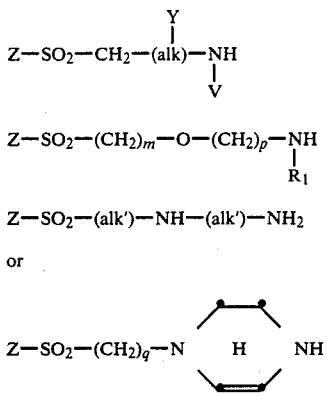

$$Z-SO_2-(CH_2)_q-N\!\!\!\overset{\frown}{\phantom{X}}\!\!\!H \quad NH \quad (19)$$

and reducing the nitro group to an amino group.

The reaction is preferably carried out in a high-boiling organic solvent, for example nitrobenzene. The reduction of the nitro group to the amino group is effected in a manner known per se by catalytic hydrogenation with Pd/carbon in ethanol, ethyl acetate or tetrahydrofuran at room temperature up to about 40° C. The reduction can also be carried out with Fe/hydrochloric acid or Fe/acetic acid in aqueous solution.

In a modification of the process described above, compounds of the formula (14) can also be prepared by condensing a nitrobenzoyl chloride of the formula (15) with an amine of the formula $$HOCH_2CH_2-S-CH_2-(alk)-\underset{V}{\overset{Y}{\underset{|}{N}H}} \quad (20)$$

$$HOCH_2CH_2-S-(CH_2)_m-O-(CH_2)_p-\underset{R_1}{\overset{|}{N}H} \quad (21)$$

$$HOCH_2CH_2-S-(alk')-NH-(alk')-NH_2 \quad (22)$$

or

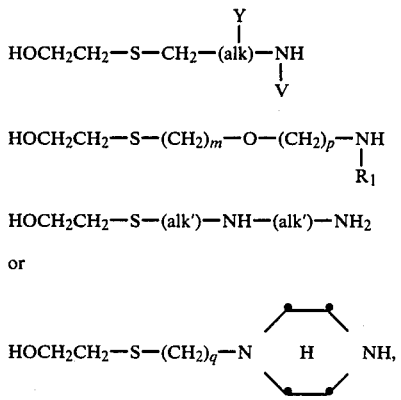

$$HOCH_2CH_2-S-(CH_2)_q-N\!\!\!\overset{\frown}{\phantom{X}}\!\!\!H \quad NH, \quad (23)$$

oxidizing the condensation product with elemental chlorine to the corresponding β-chloroethylsulfonyl compound and reducing the nitro group to the amino group.

The condensation of the nitrobenzoyl chloride with the amines of the formulae (20) to (23) is carried out for example in chloroform at room temperature and in the presence of alkaline, acid-binding agents, for example alkali metal hydroxides, carbonates or bicarbonates. The condensation product is subsequently oxidized in a manner known per se with a chlorine/hydrochloric acid mixture. The reduction of the nitro group to the amino group is effected as described above.

The amines of the formulae (16) to (23) used as starting compounds can be prepared analogously to the process of Example 1 of German Offenlegungsschrift No. 2,614,550.

The parts of the formula (1) which are enclosed in round brackets are reactive radicals which can each be present once or twice in the molecule; both possibilities are important. If n is 2 or r is 2, the reactive radicals in question can be identical or different; preferably the two radicals are identical. The reactive radical contains a substituent which is a fiber-reactive leaving group or contains a fiber-reactive leaving group, for example when Z is β-chloroethyl, or which can become active in the manner of fiber-reactive leaving groups, for example if Z is vinyl. Fiber-reactive compounds are to be understood as meaning those which are capable of reacting with the hydroxyl groups of cellulose, the amino, carboxyl, hydroxyl and thiol groups in the case of wool and silk or with the amino and possibly carboxyl groups of synthetic polyamides to form covalent chemical bonds.

The reactive dyes of the formula (1) are suitable for dyeing and printing a very wide variety of materials, such as silk, leather, wool, polyamide fibers and polyurethanes, and in particular cellulose-containing fiber materials of any kind. These fiber materials are for example the natural cellulose fibers, such as cotton, linen and hemp, and also wood pulp and regenerated cellulose. The reactive dyes of the formula (1) are also suitable for dyeing or printing hydroxyl-containing fibers which are contained in blend fabrics, for example blends of cotton with polyester fibers or polyamide fibers.

The dyes according to the invention can be applied to the fiber material and be fixed on the fiber in various ways, in particular in the form of aqueous dye solutions and print pastes. They are suitable not only for the exhaust method of dyeing but also for dyeing by the pad dye method, thereby the cloth is impregnated with aqueous dye solutions which can, if desired, also contain salt, and the days are fixed after an alkali treatment or in the presence of alkali, if desired, with heating. They are particularly suitable for the so-called cold pad-batch method, whereby the dye is applied together with the alkali on a pad-mangle and is then fixed by storing at room temperature for several hours. After fixing, the dyeings or prints are thoroughly rinsed with cold and hot water, if desired in the presence of an agent which acts like a dispersant and promotes the diffusion of the unfixed portions.

The reactive dyes of the formula (1) are distinguished by high reactivity, good buildup and good fixing properties. They can therefore be used in the exhaust dyeing method at low dyeing temperatures and only require short steaming times in the pad-steam method. The degrees of fixation are high, and the unfixed portions can be readily washed off, the difference between the degree of exhaustion and the degree of fixation being remarkably small, i.e. the hydrolysis loss being very low. The reactive dyes of the formula (1) are also particularly suitable for printing, especially on cotton, but also for printing nitrogen-containing fibers, for example wool, silk or wool-containing blend fabrics.

The dyeings and prints on cellulose fiber materials prepared with the dyes according to the invention have a high tinctorial strength and a high fiber-dye bond stability not only in the acid but also in the alkaline range, as well as a good light fastness and very good wet fastness properties, such as wash, water, seawater, cross-dyeing and perspiration fastness properties, and a good pleating fastness, hot press fastness and crock fastness.

The following examples serve to illustrate the invention. The temperatures are given in degrees celsius, and parts and percentages are by weight unless otherwise stated. Parts by weight relate to parts by volume as the kilogram relates to the liter.

The preparation of the monoazo or disazo intermediate compounds has not been described in all cases in the examples which follow, but it is immediately evident from the general description.

EXAMPLE 1

32.7 parts of 1-β(β'-chloroethylsulfonyl)-ethylcarbamoyl-4-aminobenzene hydrochloride are diazotized in the presence of hydrochloric acid and added in solution, for coupling, at 0°–5° C. and pH 5–6 to a solution of 29.9 parts of 1-(2'-sulfo-5'-aminophenyl)-3-carboxy-5-pyrazolone. The yellow monoazo dye subsequently has added to it a suspension of 18.8 parts of cyanuric chloride and is acylated at pH 6.

The chlorotriazine dye formed is isolated; it conforms to the formula

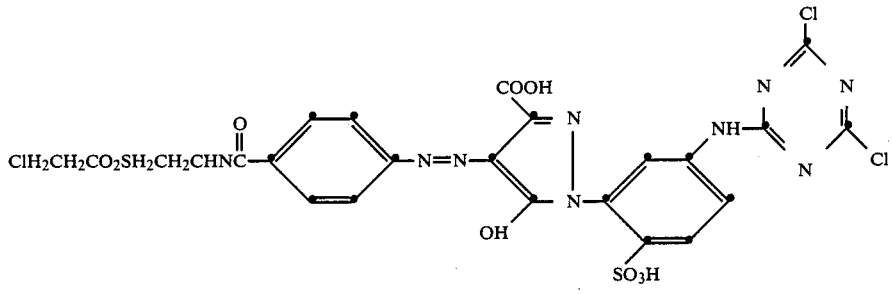

EXAMPLE 2

35.7 parts of 1-β(β'-chloroethylsulfonyl)-ethylcarbamoyl-4-methoxy-3-aminobenzene hydrochloride are diazotized in the presence of hydrochloric acid and added in solution, for coupling, at 0°–5° C. and pH 5–6 to a solution of 29.9 parts of 1-(2'-sulfo-5'-aminophenyl)-3-carboxy-5-pyrazolone. The yellow monoazo dye has subsequently added to it a suspension of 18.8 parts of cyanuric chloride and is acylated at pH 6. 10.7 parts of N-methylaniline are then added to carry out the second condensation at 20°–30° C. and pH 6.5. The monochlorotriazine dye formed is isolated; it conforms to the formula

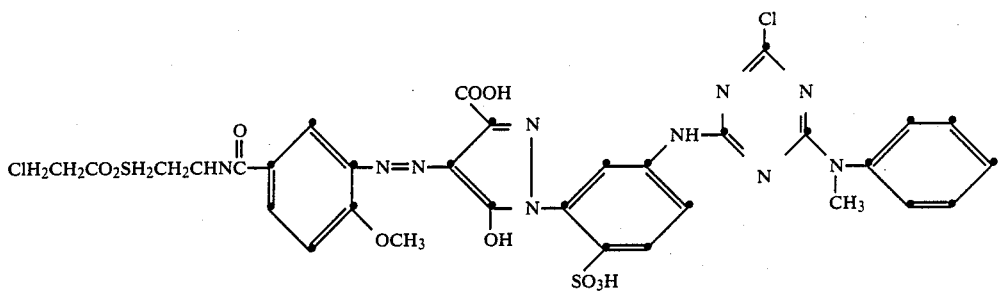

EXAMPLE 3

35.7 parts of 1-β(β'-chloroethylsulfonyl)-ethylcarbamoyl-4-methoxy-3-aminobenzene hydrochloride are diazotized in the presence of hydrochloric acid and added in solution, for coupling, at 0°–5° C. and pH 5–6 to a solution of 29.9 parts of 1-(2'-sulfo-5-aminophenyl)-3-carboxy-5-pyrazolone. The yellow monoazo dye has subsequently added to it a suspension of 21 parts of 2,4-dichloro-6-isopropoxytriazine and is acylated at 20°–35° C. and pH 6.

The monochlorotriazine dye formed is isolated; it conforms to the formula

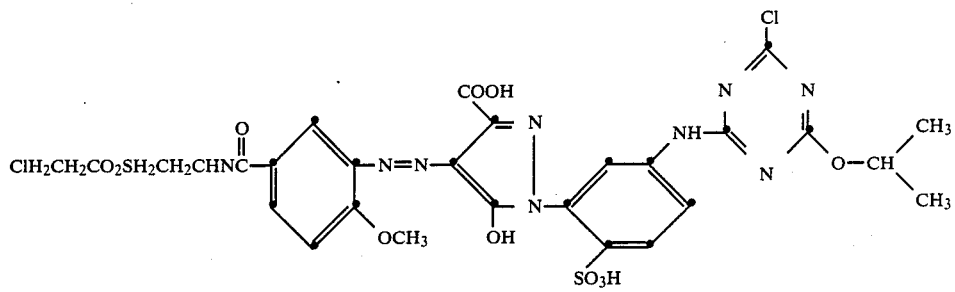

EXAMPLE 4

32.7 parts of 1-β(β'-chloroethylsulfonyl)-ethylcarbamoyl-4-aminobenzene hydrochloride are diazotized in the presence of hydrochloric acid and added in solution, for coupling, at 0°–5° C. and pH 5–6 to a solution of 29.9 parts of 1-(2'-sulfo-5'-aminophenyl)-3-carboxy-5-pyrazolone. The yellow monoazo dye subsequently has added to it a suspension of 21 parts 2,4-dichloro-6-isopropoxytriazine and is acylated at 20°–35° C. and pH 6.

The chlorotriazine dye formed is isolated; it conforms to the formula of 29.9 parts of 1-(2'-sulfo-5'-aminophenyl)-3-carboxy-5-pyrazolone. The yellow monoazo dye subsequently has

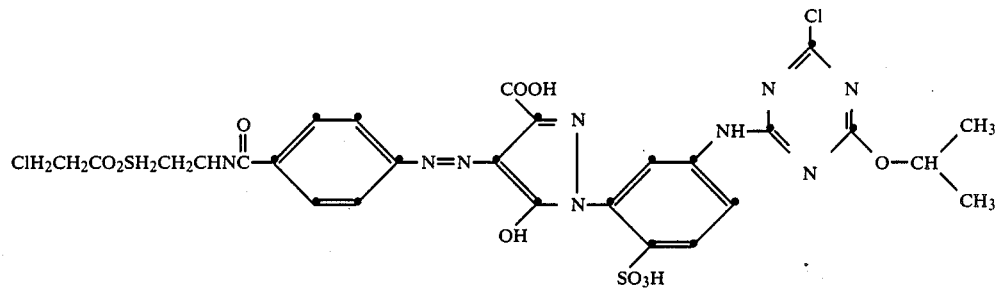

EXAMPLE 5

32.7 parts of 1-β(β'-chloroethylsulfonyl)-ethylcarbamoyl-4-aminobenzene hydrochloride are diazotized in the presence of hydrochloric acid and added in solution, for coupling, at 0°–5° C. and pH 5–6 to a solution of 29.9 parts of 1-(2'-sulfo-5'-aminophenyl)-3-carboxy-5-pyrazolone. The yellow monoazo dye subsequently has added to it a suspension of 22 parts of 2,4,5,6-tetrachloropyrimidine and is acylated at 20°–35° C. and pH 6.

The trichloropyrimidine dye formed is isolated; it conforms to the formula

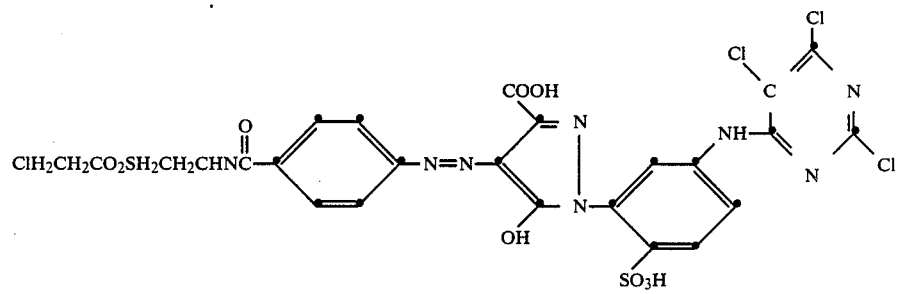

tion, for coupling, at 0°–5° C. and pH 5–6 to a solution of 29.9 parts of 1-(2'-sulfo-5'-aminophenyl)-3-carboxy-5-pyrazolone. The yellow monoazo dye subsequently has added to it a suspension of 17 parts of 2,4,6-trifluoro-5-chloropyrimidine and is acylated at room temperature and pH 6.

The difluorochloropyrimidine dye formed is isolated; it conforms to the formula

EXAMPLE 7

32.7 parts of 1-β(β'-chloroethylsulfonyl)-ethylcarbamoyl-4-aminobenzene hydrochloride are diazotized in the presence of hydrochloric acid and added in solution, for coupling, at 0°–5° C. and pH 5–6 to a solution of 29.9 parts of 1-(2'-sulfo-5'-aminophenyl)-3-carboxy-5-pyrazolone. The yellow monoazo dye subsequently has

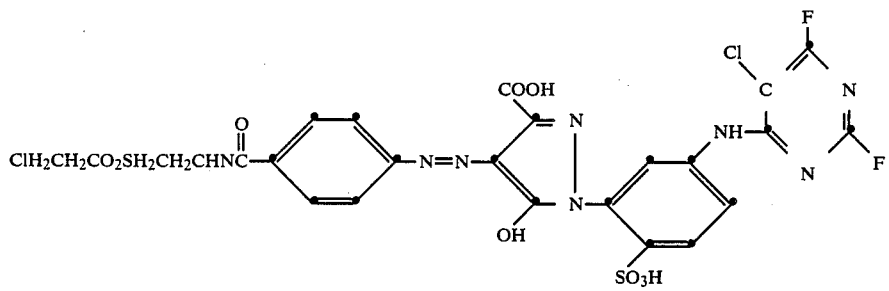

EXAMPLE 6

32.7 parts of 1-β(β'-chloroethylsulfonyl)-ethylcarbamoyl-4-aminobenzene hydrochloride are diazotized in the presence of hydrochloric acid and added in solution, for coupling, at 0°–5° C. and pH 5–6 to a solution added to it a suspension of 18.8 parts of cyanuric chloride and acylated at pH 6. 10.7 parts of N-methylaniline is then added to carry out the second condensation at 20°–30° C. and pH 6.5. The monochlorotriazine dye formed is isolated; it conforms to the formula

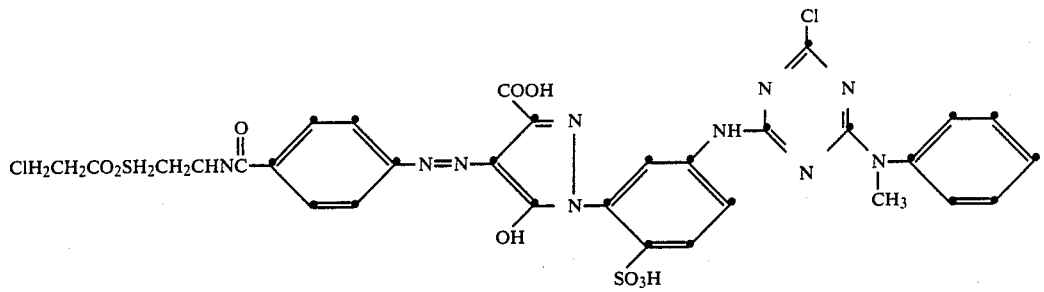

EXAMPLE 8

32.7 parts of 1-β(β'-chloroethylsulfonyl)-ethylcarbamoyl-4-aminobenzene hydrochloride are diazotized in the presence of hydrochloric acid and added in solution, for coupling, at 0°–5° C. and pH 5–6 to a solution of 29.9 parts of 1-(2'-sulfo-5'-aminophenyl)-3-carboxy-5-pyrazolone. The yellow monoazo dye has subsequently added to it 14 parts of cyanuric fluoride and is acylated at pH 6. 10.7 parts of N-methylaniline are added to carry out the second condensation at 0°–20° C. and pH 6.5. The monofluorotriazine dye formed is isolated; it conforms to the formula

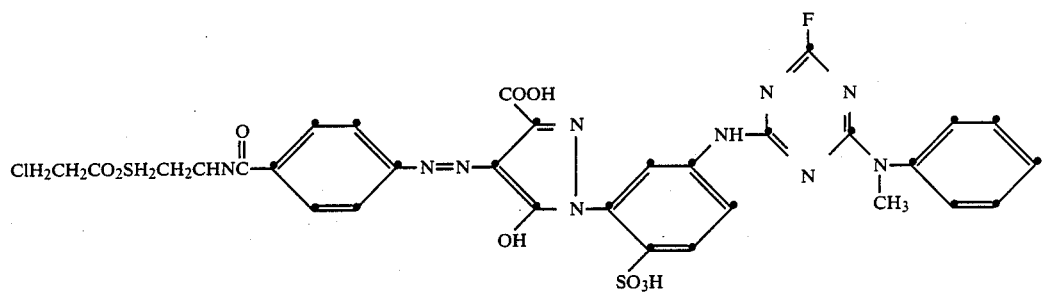

The process of Example 1 can be used to prepare further valuable reactive dyes of the general formula (1) in which $D_1$ is the radical of a diazo component corresponding to the part of formula (2) indicated in angular brackets, K is as defined under formula (2), Z is a reactive radical corresponding to X in formula (2) and $W_1$ to $W_7$ are as defined hereinafter. The last column of the table indicates the hue obtained with the dye in question on cotton.

| Example | $D_1$ | K | Z | Hue |
|---|---|---|---|---|
| 9 | 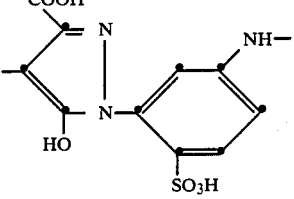 | 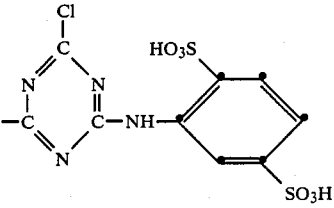 | 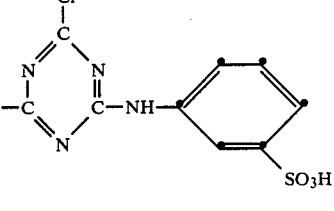 | yellow |
| 10 | 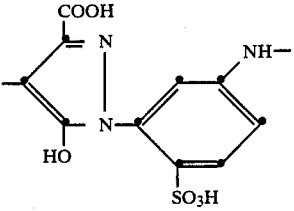 | 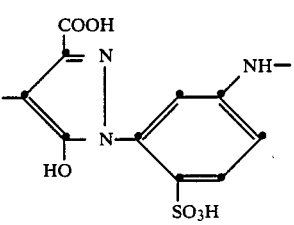 | 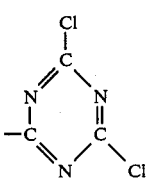 | yellow |
| 11 | 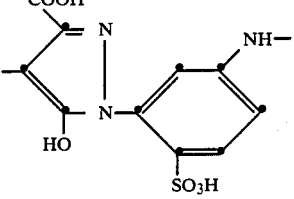 | 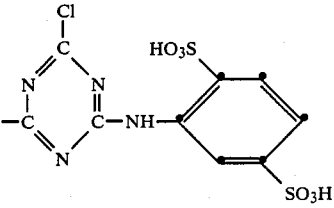 | 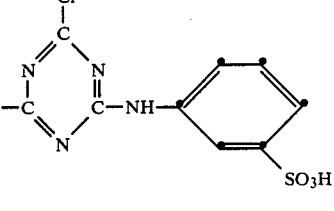 | yellow |

-continued

| Example | D₁ | K | Z | Hue |
|---|---|---|---|---|
| 12 | W₅—⬡ | (COOH)C=N–N(HO)–C=C–⬡(NH—)(SO₃H) | chloro-isopropoxy-triazine | yellow |
| 13 | W₁—⬡ | (COOH)C=N–N(HO)–C=C–⬡(NH—)(SO₃H) | chloro-phenyl-triazine | yellow |
| 14 | W₂—⬡ | (COOH)C=N–N(HO)–C=C–⬡(NH—)(SO₃H) | chloro-methyl-triazine | yellow |
| 15 | W₃—⬡ | (COOH)C=N–N(HO)–C=C–⬡(NH—)(SO₃H) | trichloropyrimidine | yellow |
| 16 | W₆—⬡ | (COOH)C=N–N(HO)–C=C–⬡(NH—)(SO₃H) | chloro-difluoropyrimidine | yellow |
| 17 | W₁—⬡ | (COOH)C=N–N(HO)–C=C–⬡(NH—)(SO₃H) | chloro-methoxy-triazine | yellow |
| 18 | W₁—⬡ | (COOH)C=N–N(HO)–C=C–⬡(NH—)(SO₃H) | chloro-ethoxy-triazine | yellow |

4,766,206
-continued

| Example | D₁ | K | Z | Hue |
|---|---|---|---|---|
| 19 | W₁–C₆H₄– | pyrazolone-COOH, N=N, linked to phenyl-NH–, SO₃H | 4-chloro-6-phenoxy-1,3,5-triazin-2-yl | yellow |
| 20 | W₁–C₆H₄– | pyrazolone-COOH, N=N, linked to phenyl-NH–, SO₃H | 4-chloro-6-methylthio-1,3,5-triazin-2-yl | yellow |
| 21 | W₃–C₆H₄– | pyrazolone-COOH, N=N, linked to phenyl-NH– | 4-fluoro-6-(4-sulfophenylamino)-1,3,5-triazin-2-yl | yellow |
| 22 | W₁–C₆H₃(OCH₃)– | pyrazolone-COOH, N=N, linked to phenyl-NH– | 4-fluoro-6-(2,5-disulfophenylamino)-1,3,5-triazin-2-yl | yellow |
| 23 | W₁–C₆H₃(CH₃)– | pyrazolone-COOH, N=N, linked to phenyl-NH– | 4-chloro-6-(4-sulfophenylamino)-1,3,5-triazin-2-yl | yellow |
| 24 | W₆–C₆H₃(CH₃)(Cl)– | pyrazolone-COOH, N=N, linked to phenyl-NH– | 4-chloro-6-(2,5-disulfophenylamino)-1,3,5-triazin-2-yl | yellow |

| Example | D₁ | K | Z | Hue |
|---|---|---|---|---|
| 25 | W₁—phenyl | 1-(phenyl-NH-)-3-methyl-5-hydroxy-pyrazole coupler (CH₃, N=N, OH, NH—) | 4-chloro-6-(2,5-disulfoanilino)-1,3,5-triazin-2-yl (Cl, NH-phenyl-(SO₃H)₂) | yellow |
| 26 | W₂—phenyl | 1-(2-sulfo-4-amino-phenyl)-3-carboxy-5-hydroxy-pyrazole (COOH, N=N, OH, SO₃H, NH—) | 4-chloro-6-(4-sulfoanilino)-1,3,5-triazin-2-yl (Cl, NH-phenyl-SO₃H) | yellow |
| 27 | W₃—phenyl | (COOH, N=N, OH, SO₃H, NH—) pyrazolone coupler | 4-chloro-6-morpholino-1,3,5-triazin-2-yl (Cl, N-morpholino) | yellow |
| 28 | W₅—phenyl | (COOH, N=N, OH, SO₃H, NH—) pyrazolone coupler | 4-chloro-6-(2-sulfoethylamino)-1,3,5-triazin-2-yl (Cl, —NHCH₂CH₂SO₃H) | yellow |
| 29 | W₆—phenyl | (COOH, N=N, OH, SO₃H, NH—) pyrazolone coupler | 4-chloro-6-(N-ethyl-N-phenylamino)-1,3,5-triazin-2-yl (Cl, C₂H₅, N-phenyl) | yellow |
| 30 | W₁—phenyl | 2-amino-5-(NH—)-benzenesulfonic acid (HO₃S, H₂N, NH—) | 4-chloro-6-(3-sulfoanilino)-1,3,5-triazin-2-yl (Cl, NH-phenyl-SO₃H) | yellow |
| 31 | W₁—phenyl (methyl-substituted) | 2-amino-5-(NH—)-benzenesulfonic acid (HO₃S, H₂N, NH—) | 4-chloro-6-isopropoxy-1,3,5-triazin-2-yl (Cl, —OCH(CH₃)₂) | yellow |

| Example | D₁ | K | Z | Hue |
|---|---|---|---|---|
| 32 | W₃—(tolyl) | HO₃S, H₂N-phenyl-NH— | dichlorotriazine (Cl, Cl) | yellow |
| 33 | W₁—(tolyl) | HO₃S, H₂N-phenyl-NH— | fluorotriazine —NH—C₆H₄—SO₃H | yellow |
| 34 | W₆—phenyl | HO₃S, H₂N-phenyl-NH— | dichloropyrimidine (Cl, Cl) | yellow |
| 35 | W₆—(tolyl) | HO₃S, H₂N-phenyl-NH— | chlorofluoropyrimidine (Cl, F) | yellow |

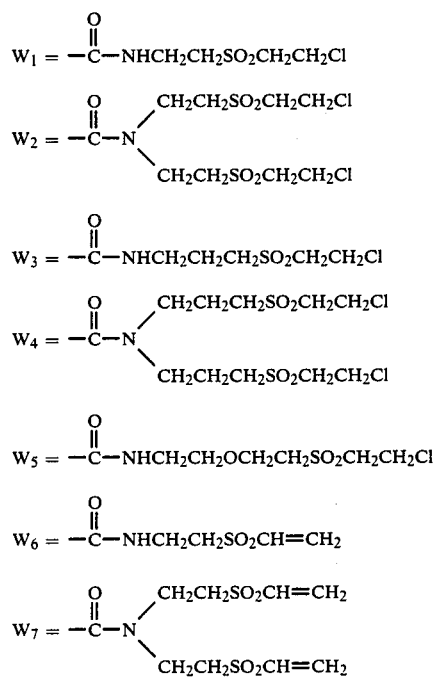

$W_1 = -\overset{O}{\underset{\|}{C}}-NHCH_2CH_2SO_2CH_2CH_2Cl$ $W_2 = -\overset{O}{\underset{\|}{C}}-N\begin{matrix}CH_2CH_2SO_2CH_2CH_2Cl \\ CH_2CH_2SO_2CH_2CH_2Cl\end{matrix}$ $W_3 = -\overset{O}{\underset{\|}{C}}-NHCH_2CH_2CH_2SO_2CH_2CH_2Cl$ $W_4 = -\overset{O}{\underset{\|}{C}}-N\begin{matrix}CH_2CH_2CH_2SO_2CH_2CH_2Cl \\ CH_2CH_2CH_2SO_2CH_2CH_2Cl\end{matrix}$ $W_5 = -\overset{O}{\underset{\|}{C}}-NHCH_2CH_2OCH_2CH_2SO_2CH_2CH_2Cl$ $W_6 = -\overset{O}{\underset{\|}{C}}-NHCH_2CH_2SO_2CH=CH_2$ $W_7 = -\overset{O}{\underset{\|}{C}}-N\begin{matrix}CH_2CH_2SO_2CH=CH_2 \\ CH_2CH_2SO_2CH=CH_2\end{matrix}$

EXAMPLE 36

48 parts of 2-amino-5-naphthol-7-sulfonic acid are dissolved in 800 parts of water by adding 30% sodium hydroxide solution to establish a pH 4.0 to 4.5. The temperature is then raised to 60° C., and 45 parts of 2,4,5,6-tetrachloropyrimidine are added dropwise, the pH value being maintained at pH 3.0 to 4.0 by the dropwise addition of 5N sodium hydroxide solution. This is followed by condensation at pH 3.0 at [sic] 3.5 and 60° C. for 20 hours.

The solution is used as a coupling component for dye synthesis.

To prepare the diazonium compound, 66 parts of 1-β(β'-chloroethylsulfonyl)-ethylcarbamoyl-4-aminobenzene hydrochloride are suspended in 500 parts of ice-water and, after addition of 45 parts of concentrated aqueous hydrochloric acid, are diazotized with 40 parts by volume of a 5N sodium nitrite solution. The suspension is subsequently stirred at about 5° C. for 2 hours, and excess nitrous acid is then destroyed by means of amidosulfonic acid. The diazonium salt solution thus prepared is slowly added at pH 5.5 to 6.0 to the solution of coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula

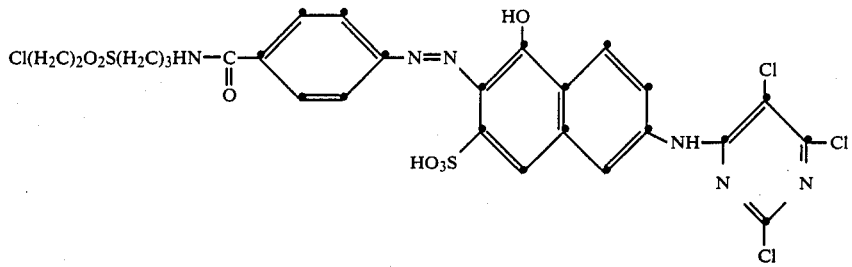

This compound has very good dye properties and dyes cellulose materials by the customary dyeing and printing processes for reactive dyes in orange shades having very good wet fastness properties.

EXAMPLE 37

48 parts of 2-amino-5-naphthol-7-sulfonic acid are dissolved in 800 parts of water at pH 6.0 to 6.5 by adding 30% strength sodium hydroxide solution. The temperature is then reduced to 10° C., and 34 parts of 2,4,6-trifluoro-5-chloropyrimidine are added dropwise, while the pH value is maintained at pH 6.0 to 6.5 by the dropwise addition of 5N sodium hydroxide solution. This is followed by 20 minutes of stirring at pH 6.0 to 6.5 and 15° C.

The solution is used as a coupling component for dye synthesis.

To prepare the diazonium compound, 66 parts of 1-β-(β′-chloroethylsulfonyl)-ethylcarbamoyl-3-aminobenzene hydrochloride are suspended in 500 parts of ice-water, acidified with 45 parts of concentrated aqueous hydrochloric acid and diazotized with 40 parts by volume of a 5N sodium nitrate solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula This compound has very good dye properties and dyes cellulose materials by the customary dyeing and printing processes for reactive dyes in orange shades having very good wet fastness properties.

EXAMPLE 38

195 parts of cyanuric chloride are dissolved in 800 parts by volume of acetone; with thorough stirring this solution is added to a mixture of 1300 parts of water and 1300 parts of crushed ice and also 20 parts by volume of 2N hydrochloric acid. To this suspension thus obtained is added in the course of 50 to 60 minutes with stirring a solution, having a pH value of 6.9 to 7.2, of 239 parts of 2-amino-5-naphthol-7-sulfonic acid, 65 parts of sodium carbonate and 2000 parts of water. The reaction of the cyanuric chloride with the aminonaphthol is carried out at a temperature between 0° and 5° C. and at a pH value of 3 to 5. Stirring is continued until free amine is no longer detectable by means of a diazotization sample.

The coupling component solution thus prepared has added to it 330 parts of diazotized 1-β-(β′-chloroethylsulfonyl)ethylcarbamoyl-4-aminobenzene hydrochloride. The mixture is stirred for 2 hours, during which the pH value is raised to 6.5-7.0 by sprinkling in sodium carbonate a little at a time. Stirring is continued at that pH value and at room temperature for a further hour. 173 parts of aniline-m-sulfonic acid and, a little at a time, about 110 parts of sodium carbonate are then added in order to maintain the pH value at 5.0 to 6.0. This reaction solution is heated to 50° C. and maintained at that temperature with stirring for one hour. After the reaction solution has cooled down, the azo compound formed is precipitated by means of sodium chloride, filtered off with suction and dried under reduced pressure at 60° C. This gives a red, electrolyte-containing powder which contains the sodium salt of a compound of the formula

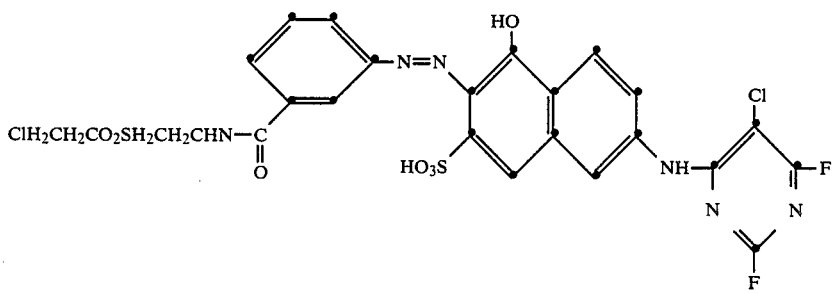

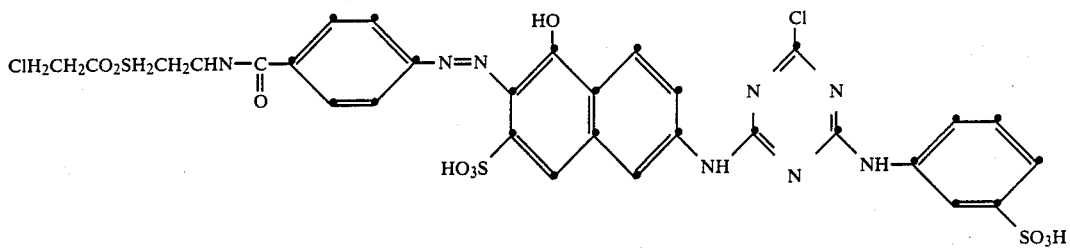

This azo compound is highly suitable for use as a dye. Owing to its fiber-reactive properties, it produces for example from an aqueous-alkaline liquor by the customary exhaust or padding methods, deep, orange dyeings on cotton fibers. The dyeings have very good wash and light fastness properties.

EXAMPLE 39

195 parts of cyanuric chloride are dissolved in 800 parts by volume of acetone; with thorough stirring this solution is added to a mixture of 1300 parts of water and 1300 parts of crushed ice and also 20 parts by volume of 2N hydrochloric acid. To this suspension thus obtained is added in the course of 50 to 60 minutes with stirring a solution, having a pH value of 6.9 to 7.2, of 239 parts of 2-amino-8-naphthol-6-sulfonic acid, 65 parts of sodium carbonate and 2000 parts of water. The reaction of the cyanuric chloride with the aminonaphthol is carried out at a temperature between 0° and 5° C. and at a pH value of 3 to 5. Stirring is continued until free amine is no longer detectable by means of a diazotization sample.

The coupling component solution thus prepared has added to it 330 parts of diazotized 1-β-(β'-chloroethylsulfonyl)ethylcarbamoyl-3-aminobenzene hydrochloride. The mixture is stirred for 2 hours, during which the pH value is raised to 6.5–7.0 by sprinkling in sodium carbonate a little at a time. Stirring is continued at that pH value and at room temperature for a further hour. 173 parts of aniline-m-sulfonic acid and a little at a time, about 110 parts of sodium carbonate are then added in order to maintain the pH value at 5.0 to 6.0. This reaction solution is heated to 50° C. and maintained at that temperature with stirring for one hour. After the reaction solution has cooled down, the azo compound formed is precipitated by means of sodium chloride, filtered off with suction and dried under reduced pressure at 60° C. This gives a red, electrolyte-containing powder which contains the sodium salt of a compound of the formula

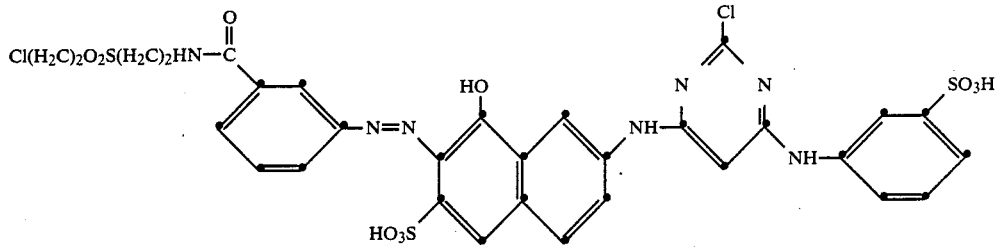

This azo compound is highly suitable for use as a dye. Owing to its fiber-reactive properties, it produces for example from an aqueous-alkaline liquor by the customary exhaust or padding methods, deep, orange dyeings on cotton fibers. The dyeings have very good wash and light fastness properties.

The methods described in Examples 38 and 39 can be used to prepare further valuable reactive dyes of the general formula (2) in which $D_1$ is the radical of a diazo component corresponding to the part of formula (2) indicated in angular brackets, K is as defined under formula (2), Z is a reactive radical corresponding to X in formula (2) and $W_1$ to $W_7$ have the same meaning as indicated on page 36. The last column of the table indicates the hue obtained with the dye in question on cotton.

| Example | $D_1$ | K | Z | Hue |
|---|---|---|---|---|
| 40 | (W₁-phenyl) | (HO, HO₃S-naphthyl-NH—) | (chlorotriazinyl-NH-phenyl-SO₃H) | orange |

-continued

| Example | D₁ | K | Z | Hue |
|---|---|---|---|---|
| 41 | W₆—⟨phenyl⟩— | HO, HO₃S-substituted naphthyl-NH— | chloro-triazine-NHCH₂CH₂SO₃H | |
| 42 | W₄—⟨phenyl⟩— | HO, HO₃S-substituted naphthyl-NH— | chloro-triazine-N(CH₃)CH₂COOH | orange |
| 43 | W₆—⟨phenyl⟩— | HO, HO₃S-substituted naphthyl-NH— | dichloro-triazine | orange |
| 44 | W₁—⟨phenyl⟩— | HO, HO₃S-substituted naphthyl-NH— | fluoro-triazine-NH-phenyl-SO₃H | orange |
| 45 | W₄—⟨phenyl⟩— | HO, HO₃S-substituted naphthyl-NH— | fluoro-triazine-NH-phenyl(HO₃S)(SO₃H) | orange |
| 46 | W₂—⟨phenyl⟩— | HO, HO₃S-substituted naphthyl-NH— | fluoro-triazine-NH-phenyl(HO₃S)(SO₃H) | orange |
| 47 | W₅—⟨phenyl⟩— | HO, HO₃S-substituted naphthyl-NH— | fluoro-triazine-NH-phenyl(HO₃S)(SO₃H) | orange |

-continued

| Example | D₁ | K | Z | Hue |
|---|---|---|---|---|
| 48 | W₄—[phenyl] | 2-methyl-1-hydroxy-6-sulfo-naphthalene-7-NH— | F-triazine—NH—[phenyl(3-SO₃H)(5-SO₃H)] | orange |
| 49 | W₁—[phenyl] | 2-methyl-1-hydroxy-6-sulfo-naphthalene-7-NH— | Cl-triazine—O—CH₃ | orange |
| 50 | W₁—[phenyl] | 2-methyl-1-hydroxy-6-sulfo-naphthalene-7-NH— | Cl-triazine—OCH(CH₃)₂ | orange |
| 51 | W₆—[phenyl] | 2-methyl-1-hydroxy-6-sulfo-naphthalene-7-NH— | Cl-triazine—[phenyl] | orange |
| 52 | W₆—[phenyl] | 2-methyl-1-hydroxy-6-sulfo-naphthalene-7-NH— | Cl-triazine—CH₃ | orange |
| 53 | W₆—[phenyl] | 2-methyl-1-hydroxy-6-sulfo-naphthalene-7-NH— | 2,4,5-trichloropyrimidine | orange |
| 54 | W₆—[phenyl] | 2-methyl-1-hydroxy-6-sulfo-naphthalene-7-NH— | 5-Cl-2,4-difluoropyrimidine | orange |
| 55 | W₇—[phenyl] | 2-methyl-1-hydroxy-6-sulfo-naphthalene-7-NH— | 5-Cl-2,4-difluoropyrimidine | orange |

-continued

| Example | D₁ | K | Z | Hue |
|---|---|---|---|---|
| 56 | W₁–⟨phenyl⟩ | 1-hydroxy-2-methyl-6-sulfo-7-amino-naphthalene (HO, CH₃, HO₃S, NH–) | 5-chloro-2,6-difluoropyrimidin-4-yl | orange |
| 57 | W₁–⟨phenyl⟩–OCH₃ | 1-hydroxy-2-methyl-6-sulfo-7-amino-naphthalene | 4-chloro-6-[(4-sulfophenyl)amino]-1,3,5-triazin-2-yl | scarlet |
| 58 | W₆–⟨phenyl(CH₃)⟩–CH₃ | 1-hydroxy-2-methyl-6-sulfo-7-amino-naphthalene | 4-chloro-6-(2-sulfoethylamino)-1,3,5-triazin-2-yl (–NHCH₂CH₂SO₃H) | orange |
| 59 | W₄–⟨phenyl(CH₃)⟩–Cl | 1-hydroxy-2-methyl-6-sulfo-7-amino-naphthalene | 4-chloro-6-[N-methyl-N-(carboxymethyl)amino]-1,3,5-triazin-2-yl (CH₃, –NCH₂COOH) | orange |
| 60 | W₆–⟨phenyl(CH₃)⟩–OCH₃ | 1-hydroxy-2-methyl-6-sulfo-7-amino-naphthalene | 2,4-dichloro-1,3,5-triazin-6-yl | scarlet |
| 61 | W₁–⟨phenyl(CH₃)⟩–OCH₃ | 1-hydroxy-2-methyl-6-sulfo-7-amino-naphthalene | 4-fluoro-6-[(4-sulfophenyl)amino]-1,3,5-triazin-2-yl | scarlet |
| 62 | W₄–⟨phenyl(CH₃)⟩–CH₃ | 1-hydroxy-2-methyl-6-sulfo-7-amino-naphthalene | 4-fluoro-6-[(2,5-disulfophenyl)amino]-1,3,5-triazin-2-yl (HO₃S, SO₃H) | orange |

| Example | D₁ | K | Z | Hue |
|---|---|---|---|---|
| 63 | W₂-(phenyl, CH₃, Cl) | HO, HO₃S-naphthyl-NH— | F-triazine-NH-(phenyl, HO₃S, SO₃H) | orange |
| 64 | W₁-(phenyl, CH₃, OCH₃) | HO, HO₃S-naphthyl-NH— | Cl-triazine-OCH₃ | scarlet |
| 65 | W₁-(phenyl, CH₃, CH₃) | HO, HO₃S-naphthyl-NH— | Cl-triazine-OCH(CH₃)₂ | orange |
| 66 | W₆-(phenyl, CH₃, OCH₃) | HO, HO₃S-naphthyl-NH— | Cl-triazine-phenyl | scarlet |
| 67 | W₆-(phenyl, CH₃, OCH₃) | HO, HO₃S-naphthyl-NH— | Cl-triazine-CH₃ | orange |
| 68 | W₆-phenyl, CH₃ | HO, HO₃S-naphthyl-NH— | Cl-triazine-Cl | scarlet |
| 69 | W₆-phenyl | HO, HO₃S-naphthyl-NH— | Cl-triazine-OCH(CH₃)₂ | scarlet |
| 70 | W₁-phenyl, CH₃ | HO, HO₃S-naphthyl-NH— | Cl-triazine-NH-(phenyl-SO₃H) | scarlet |

-continued

| Example | D₁ | K | Z | Hue |
|---|---|---|---|---|
| 71 | W₁—⟨benzene⟩ | HO, HO₃S-substituted naphthalene with NH— | fluorotriazine—NH—⟨benzene⟩—SO₃H | scarlet |
| 72 | W₄—⟨benzene⟩ | HO, HO₃S-substituted naphthalene with NH— | fluorotriazine—NH—⟨benzene with HO₃S⟩—SO₃H | scarlet |
| 73 | W₃—⟨benzene with CH₃⟩ | HO, HO₃S-substituted naphthalene with NH— | trichloropyrimidine | scarlet |
| 74 | W₆—⟨benzene with CH₃⟩ | HO, HO₃S-substituted naphthalene with NH— | chloro-difluoropyrimidine | scarlet |
| 75 | W₇—⟨benzene with CH₃⟩ | HO, HO₃S-substituted naphthalene with NH— | chloro-fluoropyrimidine | scarlet |
| 76 | W₆—⟨benzene with CH₃, OCH₃⟩ | HO, HO₃S-substituted naphthalene with NH— | dichlorotriazine | red |
| 77 | W₆—⟨benzene with CH₃, CH₃⟩ | HO, HO₃S-substituted naphthalene with NH— | chloro-isopropoxy-triazine | scarlet |

-continued

| Example | D₁ | K | Z | Hue |
|---|---|---|---|---|
| 78 | W₁—⟨benzene⟩—Cl (with CH₃) | HO-naphthalene(HO₃S)-NH— | Cl-triazine-NH-⟨benzene⟩-SO₃H | scarlet |
| 79 | W₁—⟨benzene⟩—CH₃ | HO-naphthalene(HO₃S)-NH— | F-triazine-NH-⟨benzene⟩-SO₃H | scarlet |
| 80 | W₁—⟨benzene⟩—OCH₃ | HO-naphthalene(HO₃S)-NH— | F-triazine-NH-⟨benzene⟩(HO₃S)-SO₃H | red |

EXAMPLE 81

31.9 parts of 1-amino-8-hydroxynaphthalene-3,6-disulfonic acid are dissolved in 800 ml of water under neutral conditions, and the solution is cooled at 0° to 5°. At that temperature 14.2 parts of 2,4,6-trifluoro-1,3,5-tirazine are added dropwise in the course of 20 minutes, during which the pH of the reaction solution is maintained weakly acid to Congo red by simultaneous addition of 2N sodium hydroxide solution. After addition of a mixture, adjusted to pH 5, of 33 parts of 1-β(β'-chloroethylsulfonyl)ethylcarbamoyl-4-aminobenzene hydrochloride in 100 ml of water, the pH of the reaction mixture is first kept weakly acid to Congo red for a short time and then at 5–6 by the continuous addition of 2N sodium hydroxide solution. At the same time the temperature is raised to 20° to 25° in the course of 2 to 3 hours. After the reaction has ended, this intermediate is coupled at 0° to 10° and pH 6.5 with 33 parts of 1-β(β'-chloroethylsulfonyl)ethylcarbamoyl-3-aminobenzene hydrochloride. After the coupling reaction has ended at pH 8, the reaction mixture is clarified and the resulting reactive dye of the formula is isolated by evaporating or freeze-drying the reaction solution at pH 7. It dyes cotton in red shades.

EXAMPLE 82

31.9 parts of 1-amino-8-hydroxynaphthalene-3,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to pH 5, of 33 parts of 1-β(β'-chloroethylsulfonyl)ethylcarbamoyl-4-aminobenzene hydrochloride in 100 ml of water, the pH of the reaction mixture is first kept weakly acid to Congo red for a short time and then at 5–6 by the continuous addition of 2N sodium hydroxide solution. At the same time the temperature is raised to 20° to 25° in the course of 2 to 3 hours. After the reaction has ended, this intermediate is coupled at 0° to 10° and pH 6.5 with 33 parts of 1-β(β'-chloroethylsulfonyl)ethylcarbamoyl-4-aminobenzene hydrochloride. After the coupling reaction has ended at pH 8, the reaction mixture is clarified and the resulting reactive dye of the formula

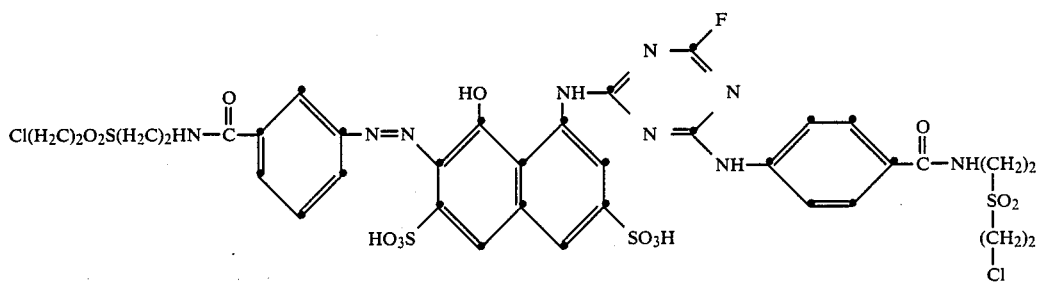

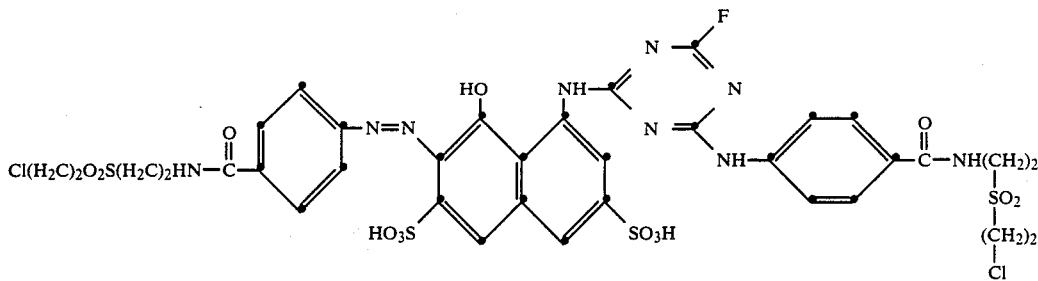

is isolated by evaporating or freeze-drying the reaction solution at pH 7. It dyes cotton in red shades.

EXAMPLE 83

64 parts of 1-amino-8-naphthol-3,6-disulfonic acid are dissolved in 800 parts of water at pH 5.0 by adding 30% sodium hydroxide solution. The temperature is then raised to 30° C., and 42 parts of 2,4-dichloro-6-isopropoxytriazine are added dropwise, while the pH value is maintained at pH 4.0 to 4.5 by the dropwise addition of 5N sodium hydroxide solution. Condensation takes place at pH 4.0 to 4.5 and at 65° C. in the course of 15 hours.

The solution is used as a coupling component for dye synthesis.

To prepare the diazonium compound, 56 parts of 1-$\beta$-($\beta'$-chloroethylsulfonyl)-ethylcarbamoyl-3-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula This compound has very good dye properties and dyes cellulose materials by the customary dyeing and printing processes for reactive dyes in bluish-red shades having very good wet fastness properties.

EXAMPLE 84

64 parts of 1-amino-8-naphthol-3,6-disulfonic acid are dissolved in 800 parts of water at pH 5.0 by adding 30% sodium hydroxide solution. The temperature is then raised to 30° C., and 42 parts of 2,4-dichloro-6-isopropoxytriazine are added dropwise, while the pH value is maintained at pH 4.0 to 4.5 by the dropwise addition of 5N sodium hydroxide solution. Condensation takes place at pH 4.0 to 4.5 and at 65° C. in the course of 15 hours.

The solution is used as a coupling component for dye synthesis.

To prepare the diazonium compound, 56 parts of 1-$\beta$-($\beta'$-chloroethylsulfonyl)-ethylcarbamoyl-4-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula

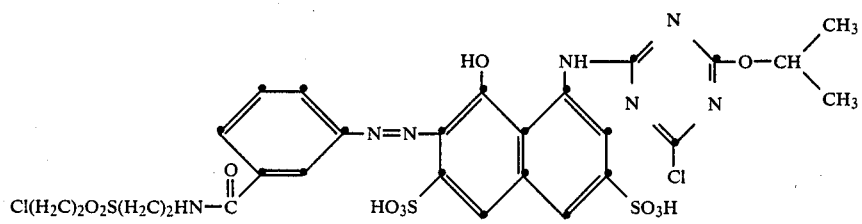

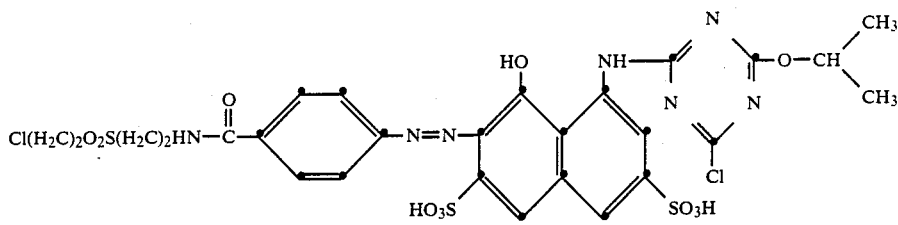

This compound has very good dye properties and dyes cellulose materials by the customary dyeing and printing processes for reactive dyes in bluish-red shades having very good wet fastness properties.

EXAMPLE 85

64 parts of 1-amino-8-naphthol-3,6-disulfonic acid are dissolved in 800 parts of water at pH 9.0 to 9.5 by adding 30% sodium hydroxide solution. The temperature is then reduced to 10° C., and 34 parts of 2,4,6-trifluoro-5-chloropyrimidine are added dropwise, while the pH value is maintained at pH 9.25 to 9.5 by the dropwise addition of 5N sodium hydroxide solution. This is followed by stirring at pH 8.5 to 9 at 15° C. for 15 minutes, and 4N hydrochloric acid solution is then added until the pH value of 6.5 is reached.

The solution is used as a coupling component for dye synthesis.

To prepare the diazonium compound, 66 parts of 1-β-(β'-chloroethylsulfonyl)-ethylcarbamoyl-3-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C in vacuo. Milling gives a red, electrolyte-containing dye powder which contains the sodium salt of the compound of the formula This compound has very good dye properties and dyes cellulose materials by the customary dyeing and printing processes for reactive dyes in bluish-red shades having very good wet fastness properties.

EXAMPLE 86

64 parts of 1-amino-8-naphthol-3,6-disulfonic acid are dissolved in 800 parts of water at pH 9.0 to 9.5 by adding 30% sodium hydroxide solution. The temperature is then reduced to 10° C., and 34 parts of 2,4,6-trifluoro-5-chloropyrimidine are added dropwise, while the pH value is maintained at pH 9.25 to 9.5 by the dropwise addition of 5N sodium hydroxide solution. This is followed by stirring at pH 8.5 to 9 at 15° C. for 15 minutes, and 4N hydrochloric acid solution is then added until the pH value of 6.5 is reached.

The solution is used as a coupling component for dye synthesis.

To prepare the diazonium compound, 66 parts of 1-β-(β'-chloroethylsulfonyl)-ethylcarbamoyl-4-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula

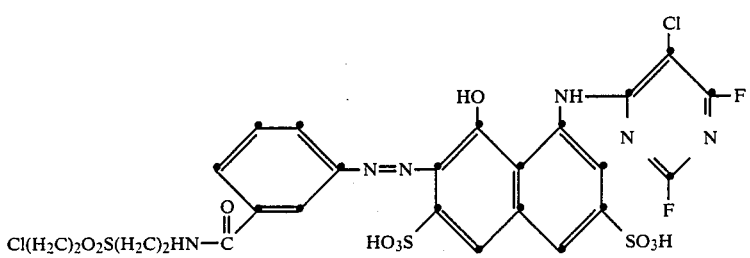

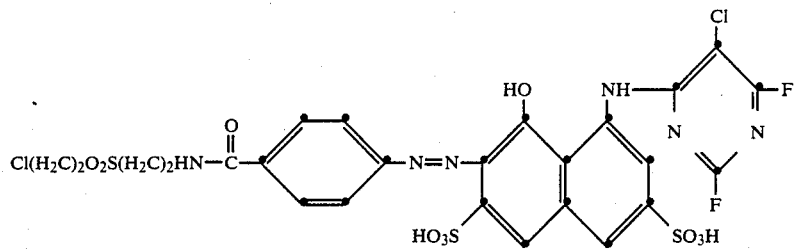

This compound has very good dye properties and dyes cellulose materials by the customary dyeing and printing processes for reactive dyes in bluish-red shades having very good wet fastness properties.

EXAMPLE 87

64 parts of 1-amino-8-napthol-3,6-disulfonic acid are dissolved in 800 parts of water at pH 5.0 adding 30% sodium hydroxide solution. The temperature is then raised to 30° C., and 45 parts of 2,4,5,6-tetrachloropyrimidine are added dropwise, while the pH value is maintained at pH 4.0 to 4.5 by the dropwise addition of 4N sodium hydroxide solution. Condensation is carried out at pH 4.0 to 4.5 and 65° C. in the course of 15 hours.

The solution is used as a coupling component for dye synthesis.

To prepare the diazonium compound, 66 parts of 1-β-(β'-chloroethylsulfonyl)-ethylcarbamoyl-3-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula This compound has very good dye properties and dyes cellulose materials by the customary dyeing and printing processes for reactive dyes in bluish-red shades having very good wet fastness properties.

EXAMPLE 88

64 parts of 1-amino-8-napthol-3,6-disulfonic acid are dissolved in 800 parts of water at pH 5.0 adding 30% sodium hydroxide solution. The temperature is then raised to 60° C., and 45 parts of 2,4,5,6-tetrachloropyrimidine are added dropwise, while the pH value is maintained at pH 4.0 to 4.5 by the dropwise addition of 5N sodium hydroxide solution. Condensation is carried out at pH 4.0 to 4.5 and 65° C. in the course of 15 hours.

The solution is used as a coupling component for dye synthesis.

To prepare the diazonium compound, 66 parts of 1-β-(β'-chloroethylsulfonyl)-ethylcarbamoyl-4-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula

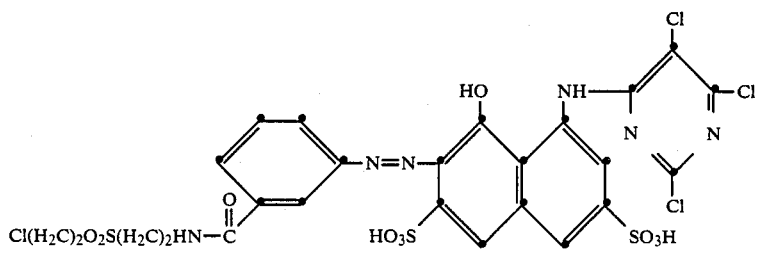

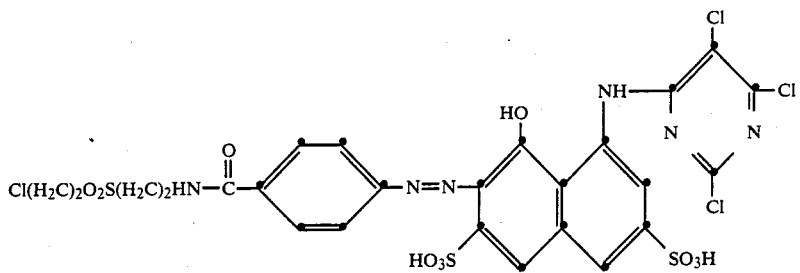

This compound has very good dye properties and dyes cellulose materials by the customary dyeing and printing processes for reactive dyes in bluish-red shades having very good wet fastness properties.

on the suction filter and dried at 40° C. in vacuo. Milling gives a red, electrolyte-containing dye powder which contains the sodium salt of the compound of the formula

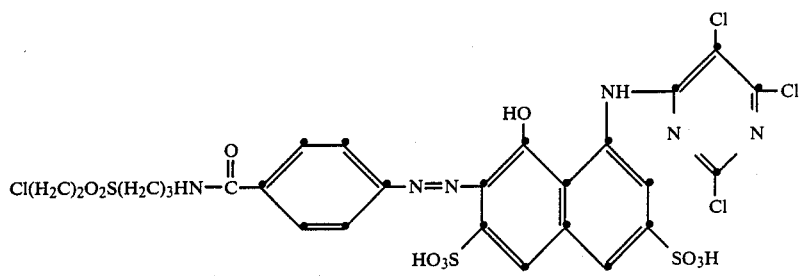

EXAMPLE 89

64 parts of 1-amino-8-napthol-3,6-disulfonic acid are dissolved in 800 parts of water at pH 5.0 adding 30% sodium hydroxide solution. The temperature is then raised to 60° C., and 45 parts of 2,4,5,6-tetrachloropyrimidine are added dropwise, while the pH value is maintained at pH 4.0 to 4.5 by the dropwise addition of 2N sodium hydroxide solution. Condensation is carried out at pH 4.0 to 4.5 and 65° C. in the course of 15 hours.

The solution is used as a coupling component for dye synthesis.

To prepare the diazonium compound, 67 parts of 1-γ-(β'-chloroethylsulfonyl)-propylcarbamoyl-4-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated This compound has very good dye properties and dyes cellulose materials by the customary dyeing and printing processes for reactive dyes in bluish-red shades having very good wet fastness properties.

EXAMPLE 90

31.9 parts of 1-amino-8-hydroxynaphthaline-3,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to pH 5, of 33 parts of 1-β(β'-chloroethylsulfonyl)ethylcarbamoyl-3-aminobenzene hydrochloride in 100 ml of water, the pH of the reaction mixture is first kept weakly acid to Congo red for a short time and then at 5–6 by the continuous addition of 2N sodium hydroxide solution. At the same time the temperature is raised to 20° to 25° in the course of 2 to 3 hours. After the reaction has ended, this intermediate is coupled at 0° to 10° and pH 6.5 with 33 parts of 1-β(β'-chloroethylsulfonyl)ethylcarbamoyl-3-aminobenzene hydrochloride. After the coupling reaction has ended at pH 8, the reaction mixture is clarified and the resulting reactive dye of the formula

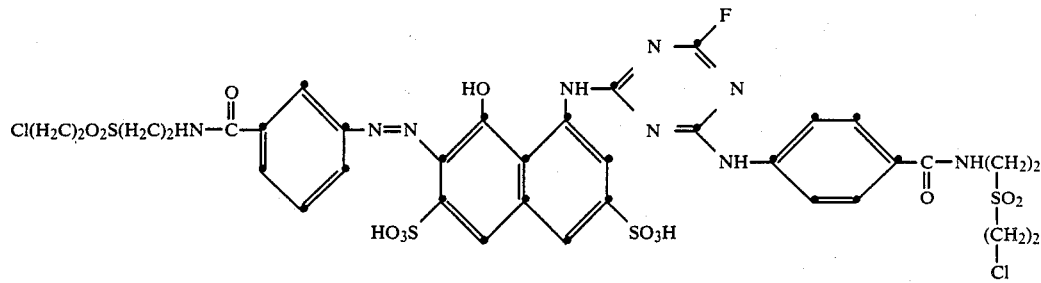

is isolated by evaporating or freeze-drying the reaction solution at pH 7. It dyes cotton in red shades.

EXAMPLE 91

31.9 parts of 1-amino-8-hydroxynaphthaline-3,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to pH 5, of 33 parts of 1-β(β'-chloroethylsulfonyl)ethylcarbamoyl-3-aminobenzene hydrochloride in 100 ml of water, the pH of the reaction mixture is first kept weakly acid to Congo red for a short time and then at 5–6 by the continuous addition of 2N sodium hydroxide solution. At the same time the temperature is raised to 20° to 25° in the course of 2 to 3 hours. After the reaction has ended, this intermediate is coupled at 0° to 10° and pH 6.5 with 33 parts of 1-β(β'-chloroethylsulfonyl)ethylcarbamoyl-3-aminobenzene hydrochloride. After the coupling reaction has ended at pH 8, the reaction mixture is clarified and the resulting reactive dye of the formula

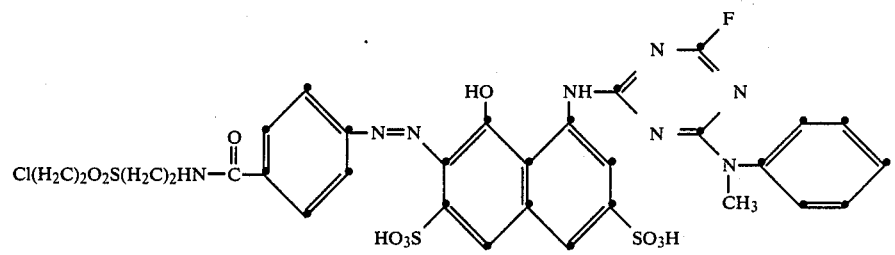

is isolated by evaporating or freeze-drying the reaction solution at pH 7. It dyes cotton in red shades.

EXAMPLE 92

31.9 parts of 1-amino-8-hydroxynaphthaline-3,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to . . . [sic] 5, of 11 parts of N-methylaniline in 100 ml of water, the pH of the reaction mixture is first kept weakly acid to Congo red for a short time and then at 5–6 by the continuous addition of 2N sodium hydroxide solution. At the same time the temperature is raised to 20° to 25° in the course of 2 to 3 hours. After the reaction has ended, this intermediate is coupled at 0° to 10° and pH 6.5 with 33 parts of diazotized 1-β(β'-chloroethylsulfonyl)ethylcarbamoyl-4-aminobenzene hydrochloride. After the coupling reaction has ended at pH 8, the reaction mixture is clarified and the resulting reactive dye of the formula

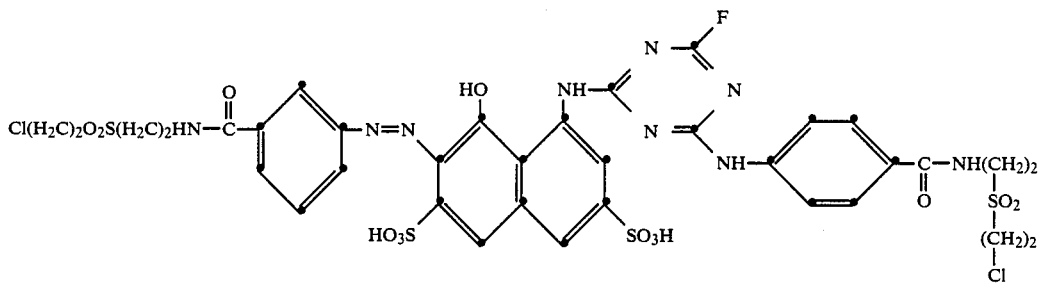

is isolated by evaporating or freeze-drying the reaction solution at pH 7. It dyes cotton in red shades.

EXAMPLE 93

31.9 parts of 1-amino-8-hydroxynaphthaline-3,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to pH 5, of 11 parts of O-toluidine in 100 ml of water, the pH of the reaction mixture is first kept weakly acid to Congo red for a short time and then at 5–6 by the continuous addition of 2N sodium hydroxide solution. At the same time the temperature is raised to 20° to 25° in the course of 2 to 3 hours. After the reaction has ended, this intermediate is coupled at 0° to 10° and pH 6.5 with 33 parts of diazotized 1-β(β'-chloroethylsulfonyl)ethylcarbamoyl-3-aminobenzene hydrochloride. After the coupling reaction has ended at pH 8, the reactive mixture is clarified and the resulting reactive dye of the formula pled at 0° to 10° and pH 6.5 with 49 parts of diazotized 1-bis-β-(bis-β'-chloroethylsulfonyl)ethylcarbamoyl-4-aminobenzene hydrochloride. After the coupling reaction has ended at pH 8, the reaction mixture is clarified and the resulting reactive dye of the formula

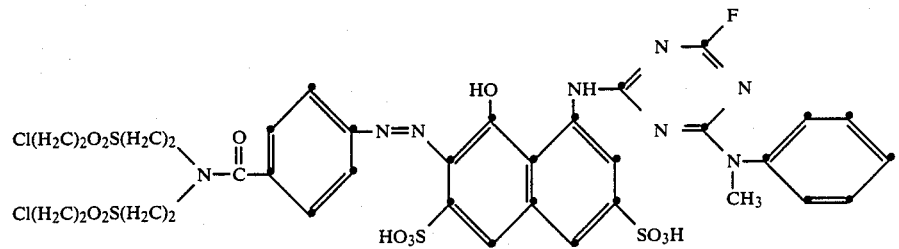

is isolated by evaporating or freeze-drying the reaction solution at pH 7. It dyes cotton in red shades.

EXAMPLE 95

31.9 parts of 1-amino-8-hydroxynaphthalene-3,6-disulfonic acid are dissolved in 800 ml of water under neutral conditions, and the solution is cooled down to 0° to 5°. At that temperature 18.4 parts of 2,4,6-trichloro-1,3,5-triazine are added; the reaction batch is stirred for a further 4 hours at a temperature of between 3° and 5° C. and at a pH value between 1.7 and 2.2, which is maintained by means of sodium bicarbonate. After addition of a mixture, adjusted to pH 5, of 33 parts of 1-β-(β'-chloroethylsulfonyl)-ethylcarbamoyl-4-aminobenzene hydrochloride in 100 ml of water, the pH of the reaction mixture is first maintained weakly acid to Congo red for a short time and then at 5–6 by the constant addition of 2N sodium hydroxide solution. At the same time the temperature is raised to 20° to 25° in the course of 2 to 3 hours. After the reaction has ended, this intermediate is coupled at 0° to 10° at pH 6.5 with 33 parts of diazotized 1-β(β'-chloroethylsulfonyl)-ethylcarbamoyl-4-aminobenzene hydrochloride. After the coupling reaction has ended at pH 8, the reaction mixture is clarified and the resulting reactive dye of the formula

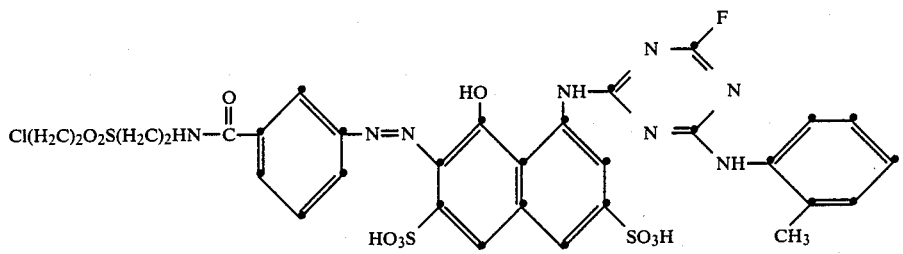

is isolated by evaporating or freeze-drying the reaction solution at pH 7. It dyes cotton in red shades.

EXAMPLE 94

31.9 parts of 1-amino-8-hydroxynaphthaline-3,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to pH 5, of 11 parts of N-methylaniline in 100 ml of water, the pH of the reaction mixture is first kept weakly acid to Congo red for a short time and then at 5–6 by the continuous addition of 2N sodium hydroxide solution. At the same time the temperature is raised to 20° to 25° in the course of 2 to 3 hours. After the reaction has ended, this intermediate is cou-

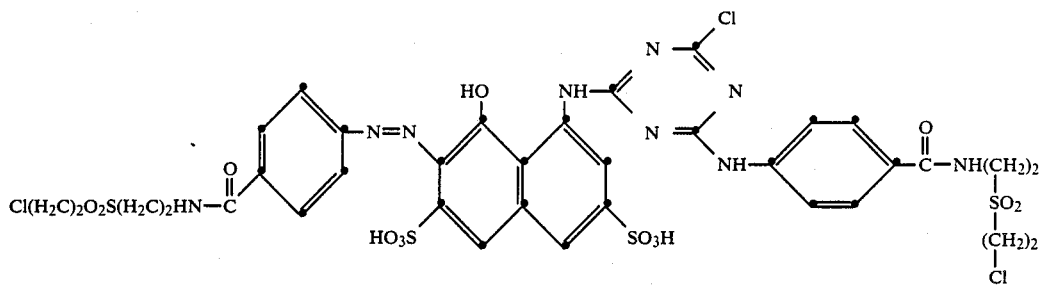

is isolated by evaporating or freeze-drying the reaction solution at pH 7. It dyes cotton in red shades.

EXAMPLE 96

31.9 parts of 1-amino-8-hydroxynaphthaline-3,6-disulfonic acid are dissolved in 800 ml of water under neutral conditions, and the solution is cooled at 0° to 5°. At that temperature 18.4 parts of 2,4,6-trichloro-1,3,5-triazine are added; the reaction batch is stirred for a further 4 hours at a temperature of between 3° and 5° C. and at a pH value between 1.7 and 2.2, which is maintained by means of sodium bicarbonate. After addition of a mixture, adjusted to pH 5, of 33 parts of 1-$\beta$-($\beta'$-chloroethylsulfonyl)-ethylcarbamoyl-4-aminobenzene hydrochloride in 100 ml of water, the pH of the reaction mixture is first maintained weakly acidic to Congo red for a short time and then at 5–6 by the constant addition of 2N sodium hydroxide solution. At the same time the temperature is raised to 20° to 25° in the course of 2 to 3 hours. After the reaction has ended, this intermediate is coupled at 0° to 10° at pH 6.5 with 33 parts of diazotized 1-$\beta$($\beta'$-chloroethylsulfonyl)-ethylcarbamoyl-3-aminobenzene hydrochloride. After the coupling reaction has ended at pH 8, the reaction mixture is clarified and the resulting reactive dye of the formula

EXAMPLE 97

31.9 parts of 1-amino-8-hydroxynaphthaline-3,6-disulfonic acid are dissolved in 800 ml of water under neutral conditions, and the solution is cooled at 0° to 5°. At that temperature 18.4 parts of 2,4,6-trichloro-1,3,5-triazine are added; the reaction batch is stirred for a further 4 hours at a temperature of between 3° and 5° C. and at a pH value between 1.7 and 2.2, which is maintained by means of sodium bicarbonate. After addition of a mixture, adjusted to pH 5, of 33 parts of 1-$\beta$-($\beta'$-chloroethylsulfonyl)-ethylcarbamoyl-3-aminobenzene hydrochloride in 100 ml of water, the pH of the reaction mixture is first maintained weakly acidic to Congo red for a short time and then at 5–6 by the constant addition of 2N sodium hydroxide solution. At the same time the temperature is raised to 20° to 25° in the course of 2 to 3 hours. After the reaction has ended, this intermediate is coupled at 0° to 10° at pH 6.5 with 35 parts of diazotized 1-$\gamma$($\beta'$-chloroethylsulfonyl)-propylcarbamoyl-3-aminobenzene hydrochloride. After the coupling reaction has ended at pH 8, the reaction mixture is clarified and the resulting reactive dye of the formula

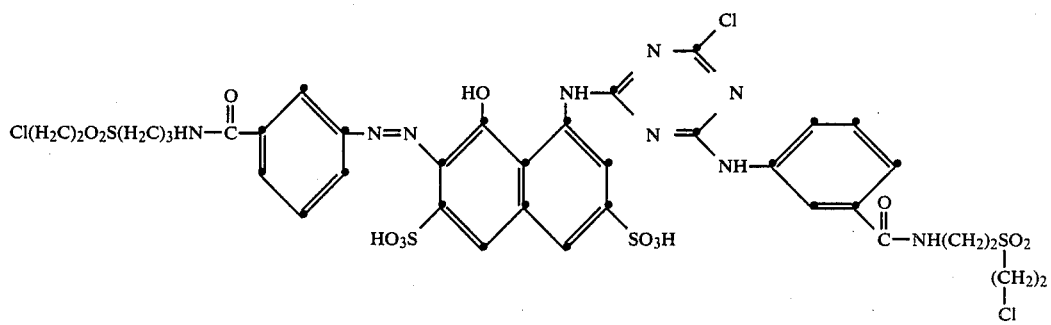

is isolated by evaporating or freeze-drying the reaction solution at pH 7. It dyes cotton in red shades.

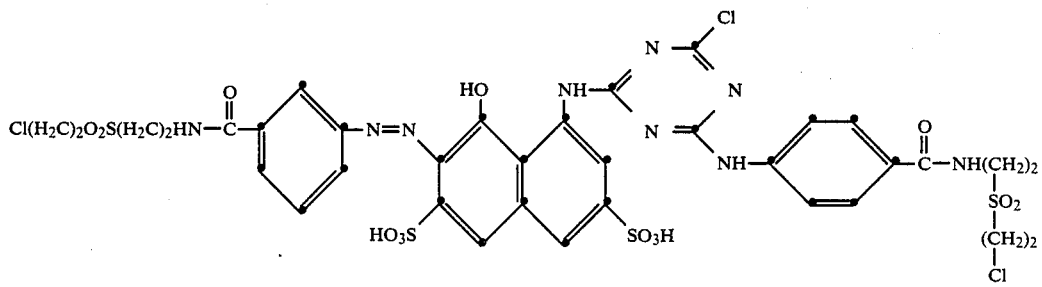

is isolated by evaporating or freeze-drying the reaction solution at pH 7. It dyes cotton in red shades.

EXAMPLE 98

31.9 parts of 1-amino-8-hydroxynaphthaline-3,6-disulfonic acid are dissolved in 800 ml of water under neutral conditions, and the solution is cooled at 0° to 5°. At that temperature 18.4 parts of 2,4,6-trichloro-1,3,5-triazine are added; the reaction batch is stirred for a further 4 hours at a temperature of between 3° and 5° C. and at a pH value between 1.7 and 2.2, which is maintained by means of sodium bicarbonate. After addition of a mixture, adjusted to pH 5, of 33 parts of 1-γ-(β'-chloroethylsulfonyl)-propylcarbamoyl-4-aminobenzene hydrochloride in 100 ml of water, the pH of the reaction mixture is first maintained weakly acidic to Congo red for a short time and then at 5–6 by the constant addition of 2N sodium hydroxide solution. At the same time the temperature is raised to 20° to 25° in the course of 2 to 3 hours. After the reaction has ended, this intermediate is coupled at 0° to 10° at pH 6.5 with 35 parts of diazotized 1-β(β'-chloroethylsulfonyl)-ethylcarbamoyl-4-aminobenzene hydrochloride. After the coupling reaction has ended at pH 8, the reaction mixture is clarified and the resulting reactive dye of the formula

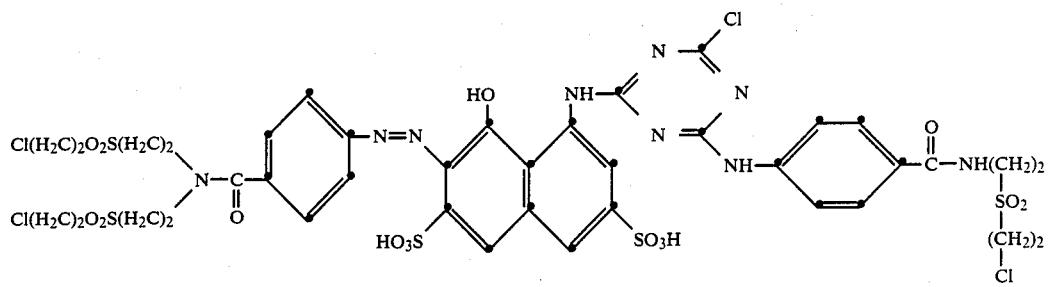

is isolated by evaporating or freeze-drying the reaction solution at pH 7. It dyes cotton in red shades.

EXAMPLE 99

31.9 parts of 1-amino-8-hydroxynaphthaline-3,6-disulfonic acid are dissolved in 800 ml of water under neutral conditions, and the solution is cooled at 0° to 5°. At that temperature 18.4 parts of 2,4,6-trichloro-1,3,5-triazine are added; the reaction batch is stirred for a further 4 hours at a temperature of between 3° and 5° C. and at a pH value between 1.7 and 2.2, which is maintained by means of sodium bicarbonate. After addition of a mixture, adjusted to pH 5, of 33 parts of 1-β-(β'-chloroethylsulfonyl)-ethylcarbamoyl-4-aminobenzene hydrochloride in 100 ml of water, the pH of the reaction mixture is first maintained weakly acidic to Congo red for a short time and then at 5–6 by the constant addition of 2N sodium hydroxide solution. At the same time the temperature is raised to 20° to 25° in the course of 2 to 3 hours. After the reaction has ended, this intermediate is coupled at 0° to 10° at pH 6.5 with 49 parts of diazotized 1-bis-β-(bis-β'-chloroethylsulfonyl)-ethylcarbamoyl-4-aminobenzene hydrochloride. After the coupling reaction has ended at pH 8, the reaction mixture is clarified and the resulting reactive dye of the formula

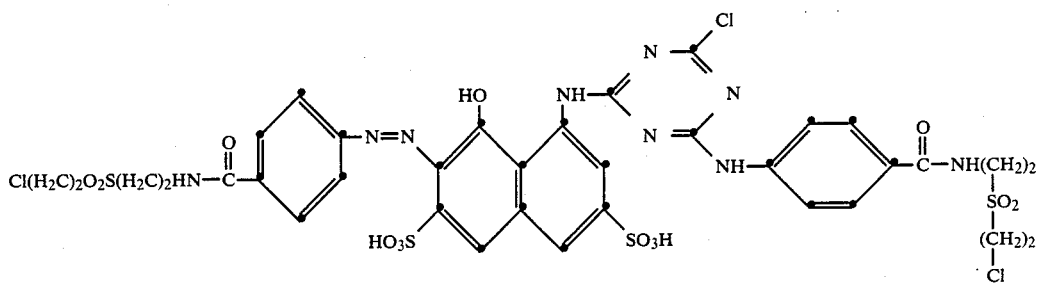

is isolated by evaporating or freeze-drying the reaction solution at pH 7. It dyes cotton in red shades.

EXAMPLE 100

(a) To a suspension of 255.2 parts of 1-amino-8-naphthol-3,6-disulfonic acid in 1440 parts of water and 720 parts of ice are added with thorough stirring 155.2 parts of cyanuric chloride; and reaction batch is subsequently stirred for a further 4 hours at a temperature of between 3° and 5° C. and at a pH value between 1.7 and 2.2, which is maintained by means of sodium bicarbonate.

(b) In a separate operation, the diazonium salt of the diazo component is prepared: a solution, having a pH value of 6.7–6.8, of 285 parts of 1-(β(β'-chloroethylsulfonyl)ethylcarbamoyl-4-aminobenzene hydrochloride in 640 parts of water have [sic] added to it 105 parts by volume of 40% aqueous sodium nitrite solution. This mixture is added with thorough stirring to a mixture of 800 parts of comminuted ice and 70 parts by volume of 95% aqueous sulfuric acid. This is followed by stirring at a temperature between 0° C. and 5° C. for a further hour, and then, as usual, excess nitrous acid is treated with a little amidosulfonic acid.

(c) The primary condensation product prepared here in (a) from cyanuric chloride and the aminonaphtholdisulfonic acid is combined with the diazonium salt solution described here in (b). To carry out the coupling reaction, the strongly acid reaction mixture is brought at a temperature of about 5° C. to a pH value of 4.0 to 5.5 by means of sodium bicarbonate, and the temperature is raised to 15° to 20° C. Stirring is continued at that pH value and at that temperature for some more hours until the coupling has ended.

(d) The solution of the monoazo compound of (c) is combined with the solution, having a pH value of 5.5 to 6.0, of 177 parts of HClH$_2$NCH$_2$CH$_2$SO$_2$CH$_2$CH$_2$Cl in 640 parts of water. The pH value is maintained at about 6, and the reaction mixture is heated to a temperature of 60° to 65° C. in the course of two hours. The pH is then raised by means of sodium bicarbonate to a value between 6.5 and 7.0, then the filtrate is spray-dried.

This gives about 1100 parts of powder, containing sodium chloride, of the formula

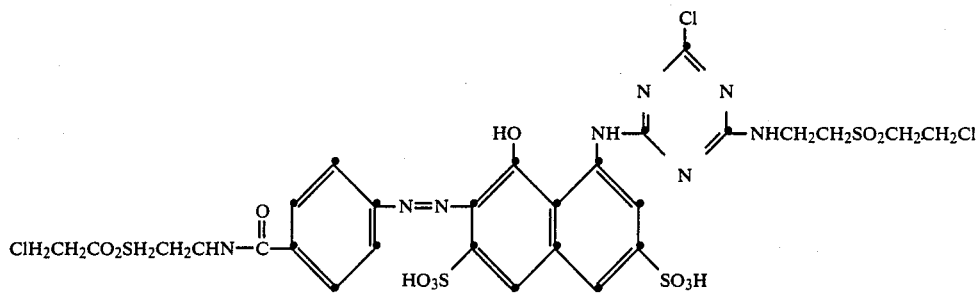

It dyes cotton in red shades.

EXAMPLE 101

(a) To a suspension of 255.2 parts of 1-amino-8-naphthol-3,6-disulfonic acid in 1440 parts of water and 720 parts of ice are added with thorough stirring 155.2 parts of cyanuric chloride; the reaction batch is subsequently stirred for a further 4 hours at a temperature of between 3° and 5° C. and at a pH value between 1.7 and 2.2, which is maintained by means of sodium bicarbonate.

(b) In a separate operation, the diazonium salt of the diazo component is prepared: a solution, having a pH value of 6.7–6.8, of 285 parts of 1-β(β'-chloroethylsulfonyl)ethylcarbamoyl-3-aminobenzene hydrochloride in 640 parts of water have [sic] added to it 105 parts by volume of 40% aqueous sodium nitrite solution. This mixture is added with thorough stirring to a mixture of 800 parts of comminuted ice and 70 parts by volume of 95% aqueous sulfuric acid. This is followed by stirring at a temperature between 0° C. and 5° C. for a further hour, and then, as usual, excess nitrous acid is treated with a little amidosulfonic acid.

(c) The primary condensation product prepared here in (a) from cyanuric chloride and the aminonaphtholdisulfonic acid is combined with the diazonium salt solution described here in (b). To carry out the coupling reaction, the strongly acid reaction mixture is brought at a temperature of about 5° C. to a pH value of 4.0 to 4.5 by means of sodium bicarbonate, and the temperature is raised to 15° to 20° C. Stirring is continued at that pH value and at that temperature for some more hours until the coupling has ended.

(d) The solution of the monoazo compound of (c) is combined with the solution, having a pH value of 5.5 to 6.0, of 177 parts of HClH$_2$NCH$_2$CH$_2$SO$_2$CH$_2$CH$_2$Cl in 640 parts of water. The pH value is maintained at about 6, and the reaction mixture is heated to a temperature of 60° to 65° C. in the course of two hours. The pH is then raised by means of sodium bicarbonate to a value between 6.5 and 7.0, then the filtrate is spray-dried.

This gives about 1100 parts of powder, containing sodium chloride, of the formula

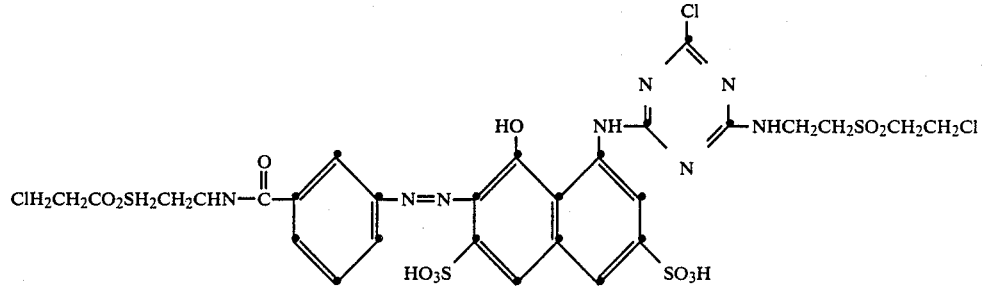

It dyes cotton in red shades.

EXAMPLE 102

(a) To a suspension of 255.2 parts of 1-amino-8-naphthol-3,6-disulfonic acid in 1440 parts of water and 720 parts of ice are added with thorough stirring 155.2 parts of cyanuric chloride; the reaction batch is subsequently stirred for a further 4 hours at a temperature of between 3° and 5° C. and at a pH value between 1.7 and 2.2, which is maintained by means of sodium bicarbonate.

(b) In a separate operation, the diazonium salt of the diazo component is prepared: a solution, having a pH value of 6.7–6.8, of 285 parts of 1-β(β'-chloroethylsulfonyl)ethylcarbamoyl-4-aminobenzene hydrochloride in 640 parts of water have [sic] added to it 105 parts by volume of 40% aqueous sodium nitrite solution. This mixture is added with thorough stirring to a mixture of 800 parts of comminuted ice and 70 parts by volume of 95% aqueous sulfuric acid. This is followed by stirring at a temperature between 0° C. and 5° C. for a further hour, and then, as usual, excess nitrous acid is treated with a little amidosulfonic acid.

(c) The primary condensation product prepared here in (a) from cyanuric chloride and the aminonaphtholdisulfonic acid is combined with the diazonium salt solution described here in (b). To carry out the coupling reaction, the strongly acid reaction mixture is brought at a temperature of about 5° C. to a pH value of 4.0 to 4.5 by means of sodium bicarbonate, and the temperature is raised to 15° to 20° C. Stirring is continued at that pH value and at that temperature for some more hours until the coupling has ended.

(d) The solution of the monoazo compound of (c) is combined with the solution, having a pH value of 5.5 to 6.0, of 312 parts of

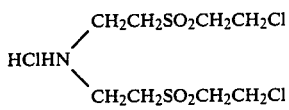

in 640 parts of water. The pH value is maintained at about 6, and the reaction mixture is heated to a temperature of 60° to 65° C. in the course of two hours. The pH is then raised by means of sodium bicarbonate to a value between 6.5 and 7.0, then the filtrate is spray-dried.

This gives about 1100 parts of powder, containing sodium chloride, of the formula

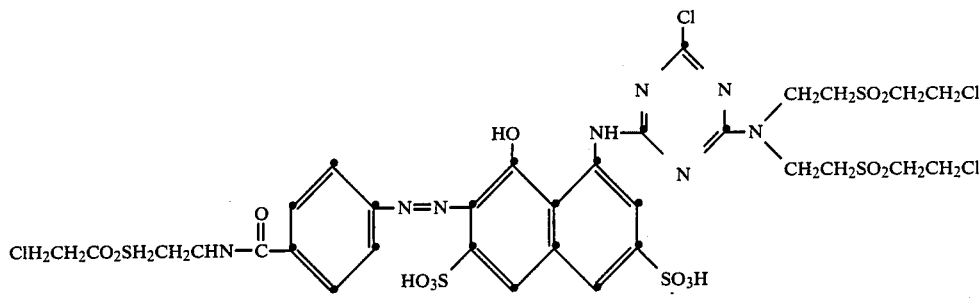

It dyes cotton in red shades.

EXAMPLE 103

(a) To a suspension of 255.2 parts of 1-amino-8-naphthol-3,6-disulfonic acid in 1440 parts of water and 720 parts of ice are added with thorough stirring 155.2 parts of cyanuric chloride; the reaction batch is subsequently stirred for a further 4 hours at a temperature of between 3° and 5° C. and at a pH value between 1.7 and 2.2, which is maintained by means of sodium bicarbonate.

(b) In a separate operation, the diazonium salts of the diazo component is prepared: a solution, having a pH value of 6.7–6.8, of 285 parts of 1-β(β'-chloroethylsulfonyl)ethylcarbamoyl-4-aminobenzene hydrochloride in 640 parts of water have [sic] added to it 105 parts by volume of 40% aqueous sodium nitrite solution. This mixture is added with thorough stirring to a mixture of 800 parts of comminuted ice and 70 parts by volume of 95% aqueous sulfuric acid. This is followed by stirring at a temperature between 0° C. and 5° C. for a further hour, and then, as usual, excess nitrous acid is treated with a little amidosulfonic acid.

(c) The primary condensation product prepared here in (a) from cyanuric chloride and the aminonaphtholdisulfonic acid is combined with the diazonium salt solution described here in (b). To carry out the coupling reaction, the strongly acid reaction mixture is brought at a temperature of about 5° C. to a pH value of 4.0 to 4.5 by means of sodium bicarbonate, and the temperature is raised to 15° to 20° C. Stirring is continued at that pH value and at that temperature for some more hours until the coupling has ended.

(d) The solution of the monoazo compound of (c) is combined with the solution, having a pH value of 5.5 to 6.0, of 240 parts of HClH$_2$NCH$_2$CH$_2$OCH$_2$CH$_2$SO$_2$CH$_2$CH$_2$Cl in 640 parts of water. The pH value is maintained at about 6, and the reaction mixture is heated to a temperature of 60° to 65° C. in the course of two hours. The pH is then raised by means of sodium bicarbonate to a value between 6.5 and 7.0, then the filtrate is spray-dried.

This gives about 1100 parts of powder, containing sodium chloride, of the formula

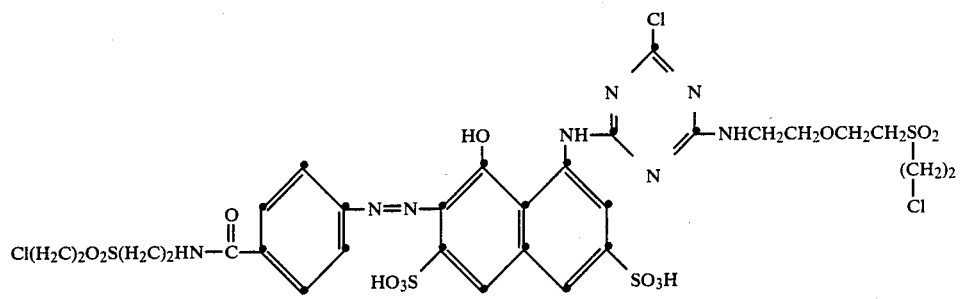

It dyes cotton in red shades.

EXAMPLE 104

64 parts of 1-amino-8-naphthol-3,6-disulfonic acid are dissolved in 800 parts of water at pH 5.0 adding 30% sodium hydroxide solution. The temperature is then raised to 30° C., and 42 parts of 2,4,2.4-dichloro-6-isopropoxytriazine added dropwise, while the pH value is maintained at pH 4.0 to 4.5 by the dropwise addition of 2N sodium hydroxide solution. Condensation is carried out at pH 4.0 to 4.5 and 65° C. in the course of 15 hours.

The solution is used as a coupling component for dye synthesis.

To prepare the diazonium compound, 56 parts of 1-β-(β'-chloroethylsulfonyl)-ethylcarbamoyl-4-aminobenzene hydrochloride are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula suspension of 194 parts of cyanuric chloride, 800 parts of water and 800 parts of ice at a pH value of 3.0 to 3.8. Stirring is continued at 0° to 5° C. and at the indicated pH value, which is maintained by sprinkling in 92 parts of sodium bicarbonate, for a further hour. To the clear solution thus obtained are added 107 parts of N-methylaniline, followed in the course of an hour by 115 parts of sodium carbonate, during which the pH rises to 6.5–7.0. At that pH value stirring is continued for a further 2 hours while the temperature is maintained at 15° to 20° C.

After the diazonium suspension and the solution of

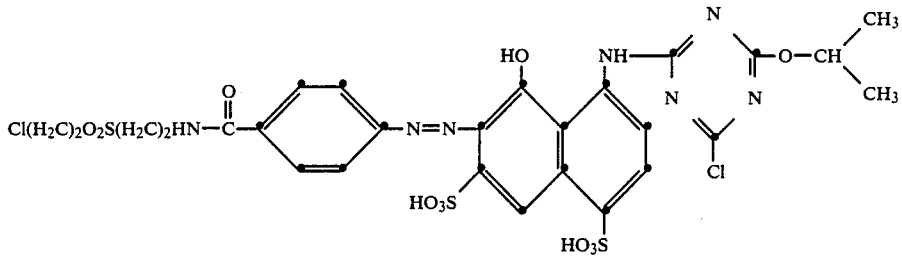

This compound has very good dye properties and dyes cellulose materials by the customary dyeing and printing processes for reactive dyes in bluish-red shades having very good wet fastness properties.

EXAMPLE 105

482 parts of 1-bis-β(bis-β'-chloroethylsulfonyl)ethylcarbamoyl-4-aminobenzene hydrochloride are added to 1000 parts of water and brought into solution by careful addition of 65 parts of sodium carbonate, a pH value of 6.5 to 7.0 becoming established. Stirring is continued at that pH for 2 hours, and 750 parts of ice and 255 parts of 31% aqueous hydrochloric acid are then added; subsequently 173 parts of the 40% aqueous sodium nitrite solution are added, stirring is subsequently continued at 0° to 5° C. for a further 2 hours, and excess nitrous acid is then destroyed by means of amidosulfonic acid. To the diazonium salt suspension thus prepared is added at a pH value of 6.0 to 6.5, together with the simultaneous solution of about 70 parts of sodium carbonate, the solution of a secondary condensation product of 1 mole each of cyanuric chloride and 1-amino-8-naphthol-4,6-disulfonic acid and N-methylaniline. This solution of the secondary condensation product is prepared as follows: 319 parts of 1-amino-8-naphthol-4,6-disulfonic acid are added with stirring to a mixture of 500 parts of water and 121 parts of 33% sodium hydroxide solution; the pH value of the solution should afterwards be 6.5 to 7.0. This solution is added in the course of an hour to a the coupling component have been combined, the coupling mixture is subsequently stirred at room temperature for a further 2 hours, during which a pH value of 6.0 to 6.5 is maintained by sprinkling in 70 parts of sodium carbonate a little at a time. After the coupling has ended, the temperature is raised to 50° C. and 40 parts of kieselguhr are added, the solution is clarified (filtered), and the filtrate is if desired treated with 50 parts of disodium phosphate and spray-dried.

This gives a red, electrolyte-containing powder which may contain the buffer substance mentioned and which contains the alkali metal salt in particular the sodium salt, of the compound of the formula

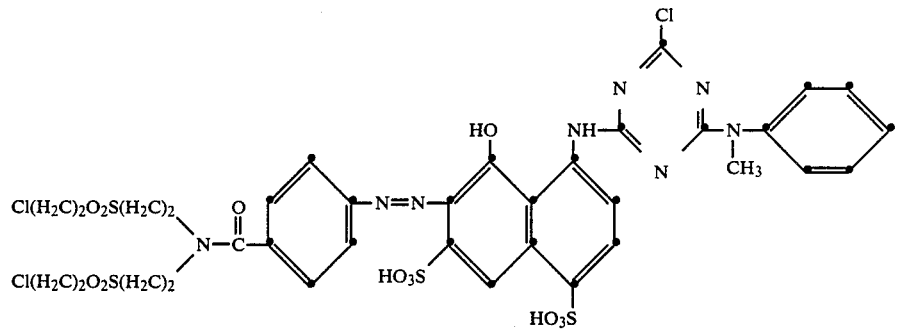

This compound has very good dye properties; it dyes the materials mentioned in the description, in particular wool from an acid bath or cellulose fiber materials in the presence of acid-binding agents by the application and fixing methods customary in the industry for fiber-reactive dyes, in bright red shades having very good color build-up and a high degree of fixation. The dyeings have very good wet fastness properties, for example an excellent wash fastness.

EXAMPLE 106

A neutral aqueous solution having a pH value of 6.5 is prepared by dissolving 327 parts of 1-β(β'-chloroethylsulfonyl)-ethylcarbamoyl-3-aminobenzene hydrochloride in 1000 parts of water. About 600 parts of ice are then added, followed slowly with stirring by about 200 parts of concentrated aqueous hydrochloric acid until a pH value of 2 has been reached. 173 parts of an aqueous 40% sodium nitrite solution are then added at a temperature of 0° to 5° C., the suspension is subsequently stirred for an hour, and excess nitrous acid is destroyed by means of amidosulfonic acid. This diazonium salt suspension obtained is coupled with the aqueous solution of the secondary condensation product of 1 mole each of cyanuric chloride and 1-amino-8-naphthol-4,6-disulfonic acid and aminobenzene-3-sulfonic acid in accordance with the method described in Example 1. Completing the coupling reaction, clarifying and isolating the dye, for example by spray-drying or salting out with sodium chloride, gives a red electrolyte-containing powder of the corresponding alkali metal salt of the compound of the formula a pH value of 6.0 to 6.5, together with the simultaneous addition of about 70 parts of sodium carbonate, the solution of a secondary condensation product of 1 mole each of cyanuric chloride and 1-amino-8-naphthol-4,6-disulfonic acid and dicyanoethylamine. This solution of the secondary condensation product is prepared as follows: 319 parts of 1-amino-8-naphthol-4,6-disulfonic acid are added with stirring to a mixture of 500 parts of water and 121 parts of 33% sodium hydroxide solution; the pH value of the solution should afterwards be 6.5 to 7.0. This solution is added in the course of an hour to a suspension of 194 parts of cyanuric chloride, 800 parts of water and 800 parts of ice at a pH value of 3.0 to 3.8. Stirring is continued at 0° to 5° C. and at the indicated pH value, which is maintained by sprinkling in 92 parts of sodium bicarbonate, for a further hour. To the clear solution thus obtained are added 107 parts of N-

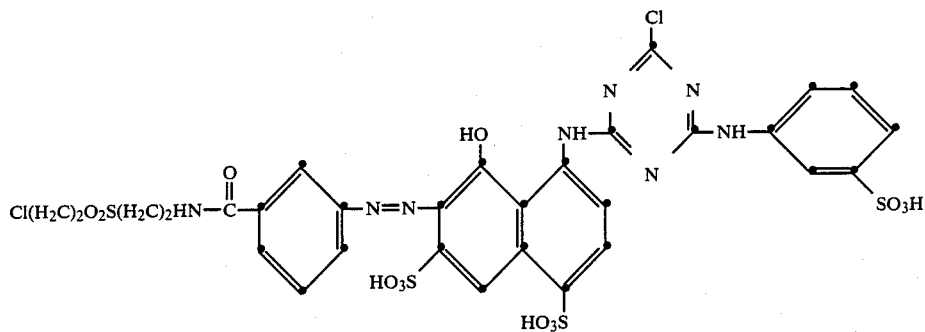

This compound likewise has very good dye properties and dyes polyamide fiber materials, such as in particular wool, and cellulose fiber materials by the dyeing and fixing methods customary for dyes which posses a fiber-reactive group, in particular the β-thiosulfatoethylsulfonyl group, in bright red shades having very good wet fastness properties, for example those mentioned for the dye of Example 1.

EXAMPLE 107

327 parts of 1-β(β'-chloroethylsulfonyl)-ethylcarbamoyl-4-aminobenzene hydrochloride are added to 1000 parts of water and brought into solution by careful addition of 65 parts of sodium carbonate, a pH value of 6.5 to 7.0 becoming established. Stirring is continued at that pH for 2 hours, and 750 parts of ice and 255 parts of 31% aqueous hydrochloric acid are then added; subsequently 173 parts of the 40% aqueous sodium nitrite solution are added, stirring is subsequently continued at 0° to 5° C. for a further 2 hours, and excess nitrous acid is then destroyed by means of amidosulfonic acid. To the diazonium salt suspension thus prepared is added at methylaniline, followed in the course of an hour by 115 parts of sodium carbonate, during which the pH rises to 6.5-7.0. At that pH value stirring is continued for a further 2 hours while the temperature is maintained at 15° to 20° C.

After the diazonium suspension and the solution of the coupling component have been combined, the coupling mixture is subsequently stirred at room temperature for a further 2 hours, during which a pH value of 6.0 to 6.5 is maintained by sprinkling in 70 parts of sodium carbonate a little at a time. After the coupling has ended, the temperature is raised to 50° C. and 40 parts of kieselguhr are added, the solution is clarified (filtered), and the filtrate is if desired treated with 50 parts of disodium phosphate and spray-dried.

This gives a red, electrolyte-containing powder which may contain the buffer substance mentioned and which contains the alkali metal salt in particular the sodium salt, of the compound of the formula

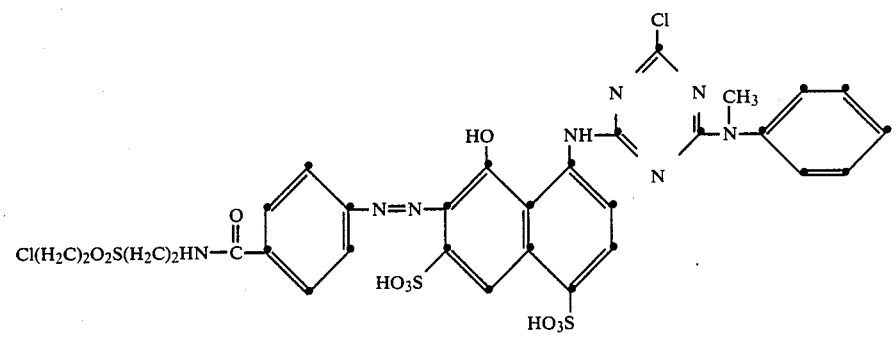

This compound likewise has very good dye properties and dyes polyamide fiber materials, such as in particular This compound has very good dye properties; it dyes the materials mentioned in the description, in particular wool from an acid or cellulose fiber materials in the presence of acid-binding agents by the application and fixing methods customary in the industry for fiber-reactive dyes, in bright red shades having very good color build-up and a high degree of fixation. The dyeings have very good good wet fastness properties, for example an excellent wash fastness.

EXAMPLE 108

31.9 parts of 1-amino-8-hydroxynaphthaline-4,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to pH 5, of 33 parts of 1-$\beta$-($\beta'$-chloroethylsulfonyl)-ethyl-carbamoyl-4-aminobenzene hydrochloride in 100 ml of water, the pH of the reaction mixture is first maintained weakly acidic to Congo red for a short time and then at 5–6 by the constant addition of 2N sodium hydroxide solution. At the same time the temperature is raised to 20° to 25° in the course of 2 to 3 hours. After the reaction has ended, this intermediate is coupled at 0° to 10° at pH 6.5 with 33 parts of 1-$\beta$-($\beta'$-chloroethylsulfonyl)-ethylcarbamoyl-3-aminobenzene hydrochloride. After the coupling reaction has ended at pH 8, the reaction mixture is clarified and the resulting reactive dye of the formula of 31% aqueous hydrochloric acid are then added; subsequently 173 parts of the 40% aqueous sodium nitrite solution are added, stirring is subsequently continued at 0° to 5° C. for a further 2 hours, and excess nitrous acid is then destroyed by means of amidosulfonic acid. To the diazonium salt suspension thus prepared is added at a pH value of 6.0 to 6.5, together with the simultaneous addition of about 70 parts of sodium carbonate, the solution of a secondary condensation product of 1 mole each of cyanuric chloride and 1-amino-8-naphthol-4,6-disulfonic acid and N-methylaniline. This solution of the secondary condensation product is prepared as follows: 319 parts of 1-amino-8-naphthol-4,6-disulfonic acid [sic] are added with stirring to a mixture of 500 parts of water and 121 parts of 33% sodium hydroxide solution; the pH value of the solution should afterwards be 6.5 to 7.0.

This solution is added in the course of an hour to a suspension of 194 parts of cyanuric chloride, 800 parts of water and 800 parts of ice at a pH value of 3.0 to 3.8. Stirring is continued at 0° to 5° C. and at the indicated pH value, which is maintained by sprinkling in 92 parts of sodium bicarbonate, for a further hour. To the clear solution thus obtained are added 107 parts of N-methylaniline, followed in the course of an hour by 115 parts of sodium carbonate, during which the pH rises to 6.5–7.0. At that pH value stirring is continued for a further 2 hours while the temperature is maintained at 15° to 20° C.

After the diazonium suspension and the solution of the coupling component have been combined, the coupling mixture is subsequently stirred at room temperature for a further 2 hours, during which a pH value of 6.0 to 6.5 is maintained by sprinkling in so-

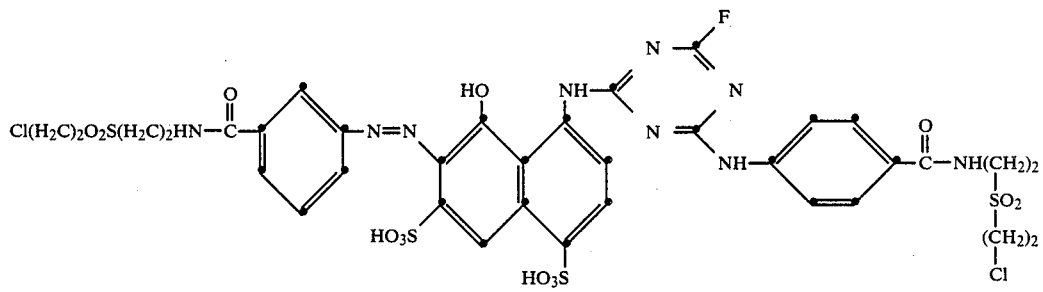

is isolated by evaporating or freeze-drying the reaction solution at pH 7. It dyes cotton in red shades.

EXAMPLE 109

482 parts of 1-bis-$\beta$(bis-$\beta'$-chloroethylsulfonyl)ethyl-carbamoyl-4-aminobenzene hydrochloride are added to 1000 parts of water and brought into solution by careful addition of 65 parts of sodium carbonate, a pH value of 6.5 to 7.0 becoming established. Stirring is continued at that pH for 2 hours, and 750 parts of ice and 255 parts dium carbonate a little at a time. After the coupling has ended, the temperature is raised to 50° C. and 40 parts of kieselguhr are added, the solution is clarified (filtered), and the filtrate is if desired treated with 50 parts of disodium phosphate and spray-dried.

This gives a red, electrolyte-containing powder which may contain the buffer substance mentioned and which contains the alkali metal salt in particular the sodium salt, of the compound of the formula

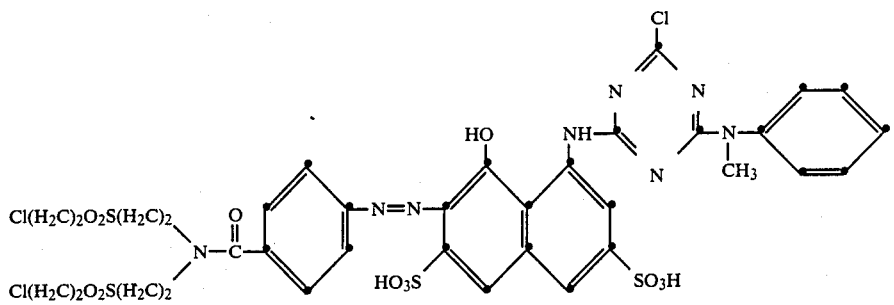

This compound has very good dye properties; it dyes the materials mentioned in the description, in particular wool from an acid bath or cellulose fiber materials in the presence of acid-binding agents by the application and fixing methods customary in the industry for fiber-reactive dyes, in bright red shades having very good color build-up and a high degree of fixation. The dyeings have very good wet fastness properties, for example an excellent wash fastness.

EXAMPLE 110

A neutral aqueous solution having a pH value of 6.5 is prepared by dissolving 327 parts of 1-β(β'-chloroethylsulfonyl)-ethylcarbamoyl-3-aminobenzene hydrochloride in 1000 parts of water. About 600 parts of ice are then added, followed slowly with stirring by about 200 parts of concentrated aqueous hydrochloric acid until a pH value of 2 has been reached. 173 parts of an aqueous 40% sodium nitrite solution are then added at a temperature of 0° to 5° C., the suspension is subsequently stirred for an hour, and excess nitrous acid is destroyed by means of amidosulfonic acid. This diazonium salt suspension obtained is coupled with the aqueous solution of the secondary condensation product of 1 mole each of cyanuric chloride and 1-amino-8-naphthol-3,6-disulfonic acid and aminobenzene-3-sulfonic acid in accordance with the method described in Example 1. After completing the coupling reaction, clarifying and isolating the dye, for example by spray-drying or salting out with sodium chloride, gives a red electrolyte-containing powder of the corresponding alkali metal salt of the compound of the formula

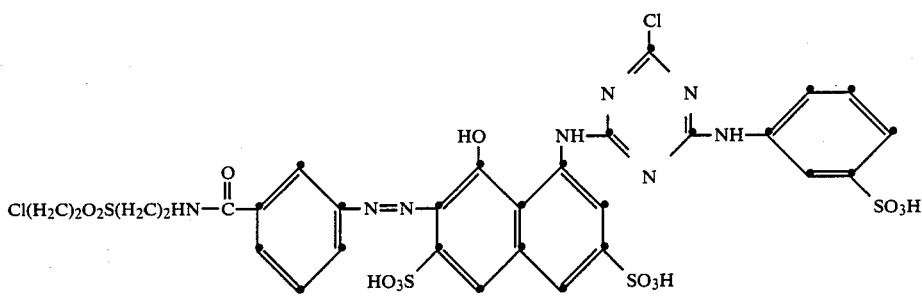

This compound likewise has very good dye properties and dyes polyamide fiber materials, such as in particular wool, and cellulose fiber materials by the dyeing and fixing methods customary for dyes which possess a fiber-reactive group, in particular the β-thiosulfatoethylsulfonyl group, in bright red shades having very good wet fastness properties, for example those mentioned for the dye of Example 1.

EXAMPLE 111

327 parts of 1-β(β'-chloroethylsulfonyl)-ethylcarbamoyl-4-aminobenzene hydrochloride are added to 1000 parts of water and brought into solution by careful addition of 65 parts of sodium carbonate, a pH value of 6.5 to 7.0 becoming established. Stirring is continued at that pH for 2 hours, and 750 parts of ice and 255 parts of 31% aqueous hydrochloric acid are then added; subsequently 173 parts of the 40% aqueous sodium nitrite solution are added, stirring is subsequently continued at 0° to 5° C. for a further 2 hours, and excess nitrous acid is then destroyed by means of amidosulfonic acid. To the diazonium salt suspension thus prepared is added at a pH value of 6.0 to 6.5, together with the simultaneous addition of about 70 parts of sodium carbonate, the solution of a secondary condensation product of 1 mole each of cyanuric chloride and 1-amino-8-naphthol-3,6-disulfonic acid and dicyanoethylamine. This solution of the secondary condensation product is prepared as follows: 319 parts of 1-amino-8-naphthol-3,6-disulfonic acid are added with stirring to a mixture of 500 parts of water and 121 parts of 33% sodium hydroxide solution; the pH value of the solution should afterwards be 6.5 to 7.0. This solution is added in the course of an hour to a suspension of 194 parts of cyanuric chloride, 800 parts of water and 800 parts of ice at a pH value of 3.0 to 3.8. Stirring is continued at 0° to 5° C. and at the indicated pH value, which is maintained by sprinkling in ρparts of sodium bicarbonate, for a further hour. To the clear solution thus obtained are added 107 parts of N-methylaniline, followed in the course of an hour by 115 parts of sodium carbonate, during which the pH rises to 6.5–7.0. At that pH value stirring is continued for a further 2 hours while the temperature is maintained at 15° to 20° C.

After the diazonium suspension and the solution of the coupling component have been combined, the coupling mixture is subsequently stirred at room temperature for a further 2 hors, during which a pH value of 6.0 to 6.5 is maintained by sprinkling in 70 parts of sodium carbonate a little at a time. After the coupling has ended, the temperature is raised to 50° C. and 40 parts of kieselguhr are added, the solution is clarified (filtered), and the filtrate is if desired treated with 50 parts of disodium phosphate and spray-dried.

This gives a red, electrolyte-containing powder which may contain the buffer substance mentioned and which contains the alkali metal salt in particular the sodium salt, of the compound of the formula and fixing methods customary in the industry for fiber-reactive dyes, in bright red shades having very good color build-up and a high degree of fixation. The dyeings have very good wet fastness properties, for example an excellent wash fastness.

The methods described in Examples 105 to 111 can be used to prepare further valuable reactive dyes of the general formula (2) in which $D_1$ is the radical of a diazo component corresponding to the part of formula (2) indicated in angular brackets, K is as defined under formula (2), Z is a reactive radical corresponding to X in formula (2), and $W_1$ to $W_7$ are as defined on page 36. The last column of the table shows the hue produced by the relevant dye on cotton.

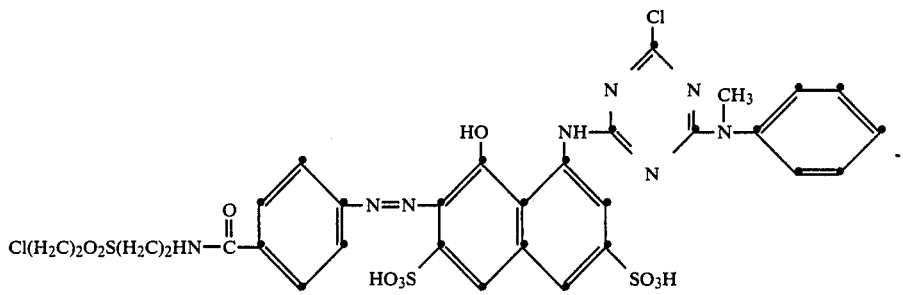

This compound has very good dye properties; it dyes the materials mentioned in the description, in particular wool from an acid bath or cellulose fiber materials in the presence of acid-binding agents by the application

| Example | D₁ | K | Z | Hue |
|---|---|---|---|---|
| 112 | W₁ | 1-hydroxy-2-(HO₃S)-6-(NH−)-3-(SO₃H) naphthalene (K group with HO, HO₃S, NH−, SO₃H substituents) | 4,6-dichloro-triazin-2-yl-NH-phenyl-SO₂(CH₂)₂OSO₃H | red |
| 113 | W₁ | same K | 4,6-dichloro-triazin-2-yl-NH-phenyl-SO₂CH=CH₂ | red |
| 114 | W₃ | same K | 4,6-dichloro-triazin-2-yl-NH-phenyl-SO₂(CH₂)₂-O-SO₃H | red |
| 115 | W₇ | same K | 4,6-dichloro-triazin-2-yl-NH-phenyl-SO₂CH=CH₂ | red |

-continued

| Example | $D_1$ | K | Z | Hue |
|---|---|---|---|---|
| 116 | phenyl with $W_3$ | 1-amino-8-hydroxy-naphthalene-3,6-disulfonic acid coupling (NH–, SO$_3$H, OH, HO$_3$S) | morpholino-substituted fluoro-triazine (F–C=N, N=C–N(morpholine), N–C) | red |
| 117 | phenyl with $W_3$ | same K as above | fluoro-triazine with –NH–(3-methylphenyl) | red |
| 118 | phenyl with $W_5$ | same K as above | fluoro-triazine with –NH–phenyl-(HO$_3$SOH$_2$CH$_2$CSO$_2$) | red |
| 119 | phenyl with $W_6$ | same K as above | fluoro-triazine with –NH–phenyl–C(=O)–NH–CH$_2$CH$_2$CO$_2$SH$_2$CH$_2$C | red |

-continued

| Example | D₁ | K | Z | Hue |
|---|---|---|---|---|
| 120 | (phenyl with W₂) | 1-amino-8-hydroxynaphthalene-3,6-disulfonic acid (H-acid type, NH—, SO₃H, HO, HO₃S) | trichlorotriazine (Cl, Cl, Cl on triazine ring) | yellowish-red |
| 121 | (phenyl with W₃) | same H-acid type | dichloro-fluoro triazine (F, Cl, Cl) | yellowish-red |
| 122 | (phenyl with W₅) | same H-acid type | chloro-difluoro triazine (F, F, Cl) | red |
| 123 | (phenyl with W₆) | same H-acid type | chloro-difluoro triazine (F, F, Cl) | red |

-continued

| Example | $D_1$ | K | Z | Hue |
|---|---|---|---|---|
| 124 | 2-CH₃, 4-W₁ phenyl | 2-HO, 6-NH-, 3-SO₃H, 8-SO₃H naphthyl | chloro-methyl-triazinyl-N(CH₃)-phenyl | bluish-red |
| 125 | 2-OCH₃, 4-W₂ phenyl | 2-HO, 6-NH-, 3-SO₃H, 8-SO₃H naphthyl | fluoro-methyl-triazinyl-N(CH₃)-phenyl | bluish-red |
| 126 | 2-Cl, 4-W₆ phenyl | 2-HO, 6-NH-, 3-SO₃H, 8-SO₃H naphthyl | chloro-triazinyl-C-NHCH₂CH₂SO₂(CH₂)₂Cl | red |
| 127 | 2-OCH₃, 4-W₃ phenyl | 2-HO, 6-NH-, 3-SO₃H, 8-SO₃H naphthyl | fluoro-triazinyl-NH-phenyl-C(=O)NH(CH₂)₂SO₂(CH₂)₂Cl | bluish-red |

| Example | D₁ | K | Z | Hue |
|---|---|---|---|---|
| 128 | W₂-phenyl | 1-amino-8-hydroxynaphthalene-3,6-disulfonic acid residue | triazine with F and C—NHCH₂CH₂SO₃H | red |
| 129 | W₆-phenyl | 1-amino-8-hydroxynaphthalene-3,6-disulfonic acid residue | triazine with F and C—N(C₂H₅)(phenyl) | red |
| 130 | W₄-phenyl | 1-amino-8-hydroxynaphthalene-3,6-disulfonic acid residue | triazine with F and C—NH-(4-SO₃H-phenyl) | red |
| 131 | W₅-phenyl | 1-amino-8-hydroxynaphthalene-3,6-disulfonic acid residue | triazine with F and C—NH-(3-Cl-phenyl) | red |
| 132 | W₁-phenyl | 1-amino-8-hydroxynaphthalene-3,6-disulfonic acid residue | triazine with Cl and C—OCH₂CH₂OH | red |

-continued

| Example | D₁ | K | Z | Hue |
|---|---|---|---|---|
| 133 | W₆-C₆H₄- | 1-NH-,2-HO-,...naphthalene disulfonic acid | 2-fluoro-4-(N-methyl-anilino)-1,3,5-triazin-6-yl | red |
| 134 | W₇-C₆H₄- | same K | 2-fluoro-4-(3-sulfo-anilino)-1,3,5-triazin-6-yl | red |
| 135 | W₃-C₆H₄- | same K | 2-fluoro-4-(2-methyl-anilino)-1,3,5-triazin-6-yl | red |
| 136 | W₁-C₆H₄- | same K | 2,6-dichloro-4-methyl-pyrimidin-yl | red |
| 137 | W₁-(CH₃)C₆H₃- | same K | 2,6-dichloro-4-phenyl-1,3,5-triazin-yl | red |

-continued

| Example | $D_1$ | K | Z | Hue |
|---|---|---|---|---|
| 138 | phenyl-$W_3$ | naphthalene with NH, OH, $SO_3H$, $HO_3S$ | triazine: Cl, $SCH_3$ | red |
| 139 | phenyl-$W_2$ | naphthalene with NH, OH, $SO_3H$, $HO_3S$ | triazine: Cl, S-phenyl | red |
| 140 | phenyl-$W_5$ | naphthalene with NH, OH, $SO_3H$, $HO_3S$ | triazine: Cl, $NHCH_2CH_2OH$ | red |
| 141 | phenyl-$W_6$ | naphthalene with NH, OH, $SO_3H$, $HO_3S$ | triazine: Cl, NH-phenyl-$SO_3H$ | red |
| 142 | phenyl-$W_3$ | naphthalene with NH, OH, $SO_3H$, $HO_3S$ | triazine: Cl, $NHCH_2CH_2SO_3H$ | red |

-continued

| Example | D₁ | K | Z | Hue |
|---|---|---|---|---|
| 143 | phenyl-W₂ | 1-hydroxy-2-sulfo-6-amino-8-sulfonaphthalene | monochlorotriazinyl with -NHCH₂CH₂COOH | red |
| 144 | phenyl-W₁ | 1-hydroxy-2-sulfo-6-amino-8-sulfonaphthalene | dichlorotriazinyl | red |
| 145 | phenyl-W₆ | 1-hydroxy-2-sulfo-6-amino-8-sulfonaphthalene | dichlorotriazinyl | red |
| 146 | phenyl-W₇ | 1-hydroxy-2-sulfo-6-amino-8-sulfonaphthalene | dichlorotriazinyl | red |
| 147 | phenyl-W₇ | 1-hydroxy-2-sulfo-6-amino-8-sulfonaphthalene | dichlorotriazinyl | red |

| Example | D₁ | K | Z | Hue |
|---|---|---|---|---|
| 148 | phenyl-W₂ | 1-amino-8-hydroxynaphthalene-3,6-disulfonic acid (methyl-substituted) | cyanuric chloride (2,4-dichloro-triazinyl) | red |
| 149 | phenyl-W₃ | same K | 2-fluoro-4-chloro-triazinyl | red |
| 150 | phenyl-W₄ | same K | 2-fluoro-4-chloro-triazinyl | red |
| 151 | phenyl-W₅ | same K | 2-fluoro-4-chloro-triazinyl | red |
| 152 | phenyl-W₆ | same K | 2,4-dichloro-triazinyl | red |

-continued

| Example | D₁ | K | Z | Hue |
|---|---|---|---|---|
| 153 | (phenyl with W₇ para) | 8-amino-1-hydroxy-3,6-disulfonaphthalene (H-acid type) | triazine with F, F, Cl | red |
| 154 | (phenyl with W₃ para) | H-acid type | triazine with Cl, Cl, Cl | red |
| 155 | (phenyl with W₂ para) | H-acid type | triazine with F, Cl, F | red |
| 156 | (2-OCH₃ phenyl with W₁ para) | 7-amino-1-hydroxy-3,6-disulfonaphthalene (γ-acid type) | triazine with Cl, Cl | bluish-red |
| 157 | (2-CH₃ phenyl with W₆ para) | γ-acid type | triazine–N(CH₂CH₂SO₂CH₂CH₂Cl)₂ with Cl | bluish-red |

| Example | $D_1$ | K | Z | Hue |
|---|---|---|---|---|
| 158 | 2-OCH$_3$, 5-W$_2$ phenyl | 1-NH, 2-OH (H acid-like: HO, HO$_3$S, SO$_3$H) | triazine with F, NH-phenyl-NHCOCH(CH$_2$CH$_2$CO$_2$SH)—CH$_2$CH$_2$CO$_2$SH$_2$CH$_2$CHN—C=O | bluish-red |
| 159 | 2-CH$_3$, 5-W$_3$ phenyl | same H acid | triazine with F, NH-phenyl-CO—NH(CH$_2$)$_2$—SO$_2$—(CH$_2$)$_2$Cl | bluish-red |
| 160 | 2-Cl, 5-W$_1$ phenyl | same H acid | triazine with Cl, NHCH$_2$CH$_2$OCH$_2$CH$_2$—SO$_2$—CH$_2$CH$_2$Cl | yellowish-red |
| 161 | 2-OCH$_3$, 5-W$_6$ phenyl | same H acid | triazine with Cl, NH-phenyl-SO$_2$CH=CH$_2$ | bluish-red |

-continued

| Example | D₁ | K | Z | Hue |
|---|---|---|---|---|
| 162 | 2-CH₃, 4-W₃ phenyl | 1-NH-, 2-HO-, 6-SO₃H, 8-SO₃H naphthalene (H-acid type) | chlorotriazinyl-NH-C₆H₄-SO₂CH₂CH₂OSO₃H | red |
| 163 | 2-OCH₃, 4-W₅ phenyl | same H-acid type | N(CH₂CH₂SO₂CH₂CH₂Cl)₂ triazinyl (Cl) | bluish-red |
| 164 | 4-W₁ phenyl | same H-acid type | 2,4-dichloro-triazinyl | yellowish-red |
| 165 | 3-W₆ phenyl | same H-acid type | N(CH₂CH₂SO₂CH₂CH₂Cl)₂ triazinyl (Cl) | yellowish-red |

| Example | $D_1$ | K | Z | Hue |
|---|---|---|---|---|
| 166 | W₂-phenyl | chromotropic acid derivative | F-triazine-NH-phenyl-N(H)C(=O)CH₂CH₂CO₂SH₂CH₂CHN—C=O | red |
| 167 | W₃-phenyl | chromotropic acid derivative | F-triazine-NH-phenyl-C(=O)-NH-(CH₂)₂-N[(CH₂)₂-SO₂]-Cl(H₂C)₂—SO₂ | red |
| 168 | W₁-phenyl | chromotropic acid derivative | Cl-triazine-C-NHCH₂CH₂OCH₂CH₂-ClH₂CH₂C—SO₂ | yellowish-red |
| 169 | W₆-phenyl | chromotropic acid derivative | Cl-triazine-NH-phenyl-SO₂CH=CH₂ | yellowish-red |

| Example | D₁ | K | Z | Hue |
|---|---|---|---|---|
| 170 | (W₃-substituted methylbenzene) | 1-amino-8-hydroxynaphthalene-3,6-disulfonic acid (H-acid type) | Cl-triazine with NH-phenyl-SO₂CH₂CH₂OSO₃H substituent | red |
| 171 | (W₅-substituted methylbenzene) | H-acid type | Cl-triazine with N(CH₂CH₂SO₂CH₂CH₂Cl)₂ | red |
| 172 | (W₁-substituted methylbenzene) | H-acid type | Cl-triazine with C—O—CH₃ | yellowish-red |
| 173 | (W₁-substituted benzene) | H-acid type | Cl-triazine with C—CH₃ | yellowish-red |

-continued

| Example | D₁ | K | Z | Hue |
|---|---|---|---|---|
| 174 | methylphenyl-W₁ | 1-amino-8-hydroxy-naphthalene-3,6-disulfonic acid derivative (NH−, HO−, HO₃S−, −SO₃H) | triazine with Cl, −SCH₃ substituents | red |
| 175 | methylphenyl-W₁ | 1-amino-8-hydroxy-naphthalene-3,6-disulfonic acid derivative (NH−, HO−, HO₃S−, −SO₃H) | triazine with Cl, −NH(CH₂)₃SO₂CH₂CH₂Cl substituents | red |

EXAMPLE 176

70.25 parts of 4-β-sulfatoethylsulfonylaniline are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amidosulfonic acid. 77.8 parts of 1-amino-8-hydroxynaphthaline-3,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 70.25 parts of 4-β-sulfatoethylsulfonylamiline hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

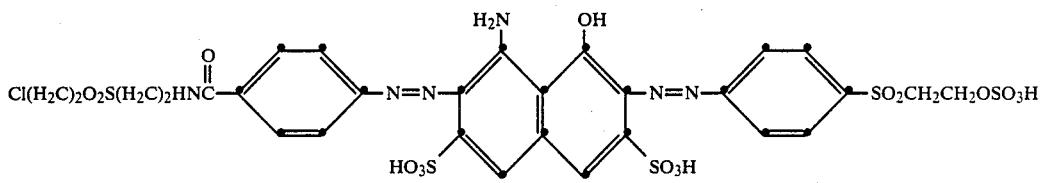

a temperature between 4° and 8° C. and a pH value between 1 and 2 for 4 to 5 hours. After this reaction time the pH value is adjusted to 6.0 with sodium carbonate.

In a separate batch, 82 parts of 1-β-(β'-chloroethylsulfonyl)-ethylcarbamoyl-4-aminobenzene hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 178

82 parts of 1-β(β'-chloroethylsulfonyl)-ethylcarbamoyl-4-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then

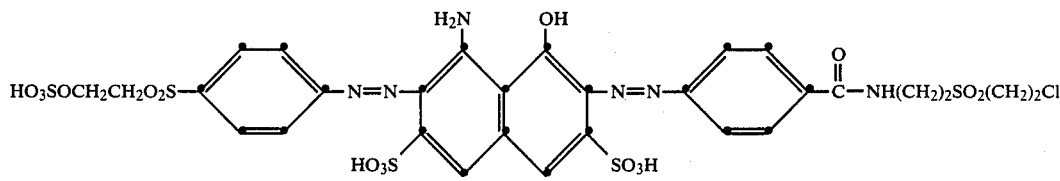

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 177

82 parts of 1-β-(β'-chloroethylsulfonyl)-ethylcarbamoyl-4-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxynaphthaline-3,6-disulfonic added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amidosulfonic acid. 77.8 parts of 1-amino-8-hydroxynaphthaline-4,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 70.25 parts of 4-β-sulfatoethylsulfonylamiline hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

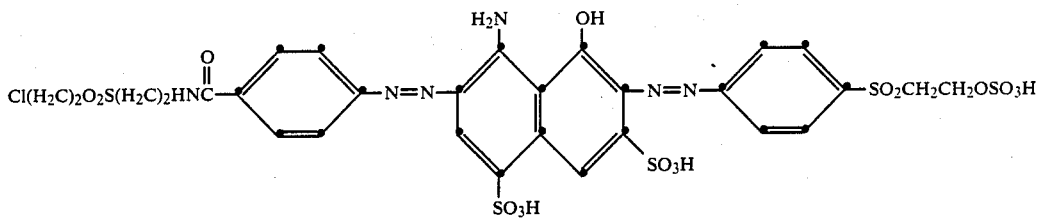

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 179

70.25 parts of 4-β-sulfatoethylsulfonylaniline are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amidosulfonic acid. 77.8 parts of 1-amino-8-hydroxynaphthaline-4,6-disulfonic acid are then added, and the batch is stirred at a temperature between 4° and 8° C. and a pH value between 1 and 2 for 4 to 5 hors. After this reaction time the pH value is adjusted to 6.0 with sodium carbonate.

In a separate batch, 82 parts of 1-β-(β'-chloroethylsulfonyl)-ethylcarbamoyl-4-aminobenzene hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

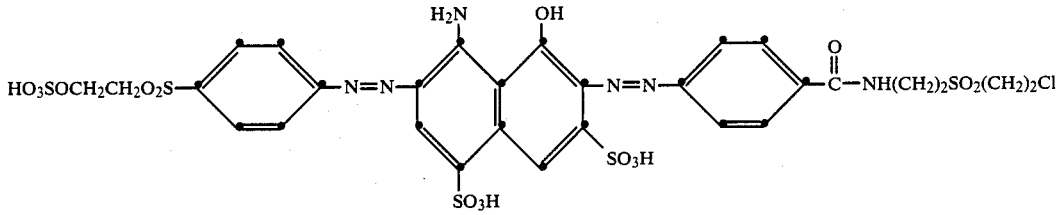

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 180

82 parts of 1-β-(β'-chloroethylsulfonyl)-ethylcarbamoyl-3-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotiztion is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxynaphthaline-3,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 82 parts of 1-β-(β'-chloroethylsulfonyl)-ethylcarbamoyl-4-aminobenzene hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

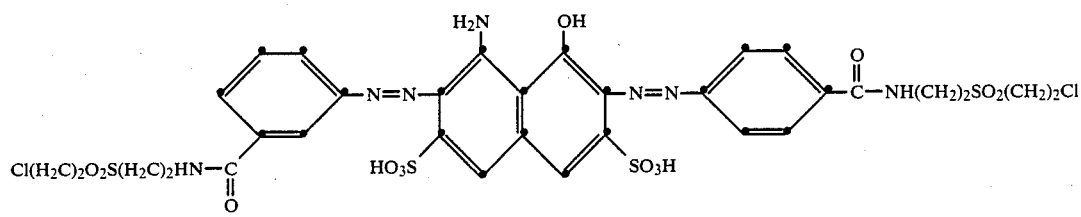

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 181

82 parts of 1-β(β'-chloroethylsulfonyl)-ethylcarbamoyl-3-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxynaphthaline-3,6-disulfonic acid are then added, and the batch is stirred at a temperature between 4 ° and 8° C. and a pH value between 1 and 2 for 4 to 5 hours. After this reaction time the pH value is adjusted to 6.0 with sodium carbonate.

In a separate batch, 82 parts of 1-β(β'-chloroethylsulfonyl)-ethylcarbamoyl-3-aminobenzene hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

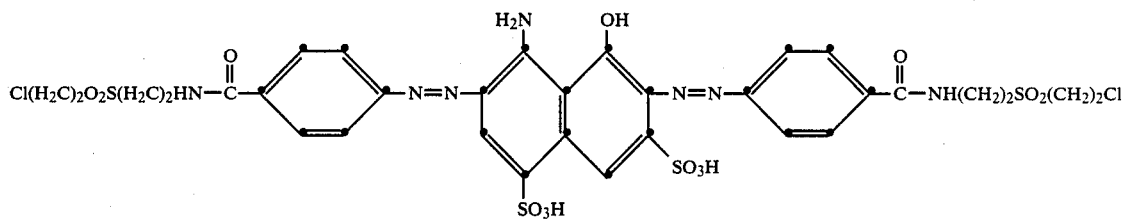

This compound is very highly suitable for use as a dye for dyeing cellulose fiber materials by the known dyeing and printing methods and conventional fiixing methods customary in the industry for fiber-reactive dyes; it produces on these materials navy shades having good fastness properties.

EXAMPLE 182

82 parts of 1-β(β'-chloroethylsulfonyl)-ethylcarbamoyl-4-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxynaphthaline-4,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 82 parts of 1-β(β'-chloroethylsulfonyl)-ethylcarbamoyl-4-aminobenzene hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

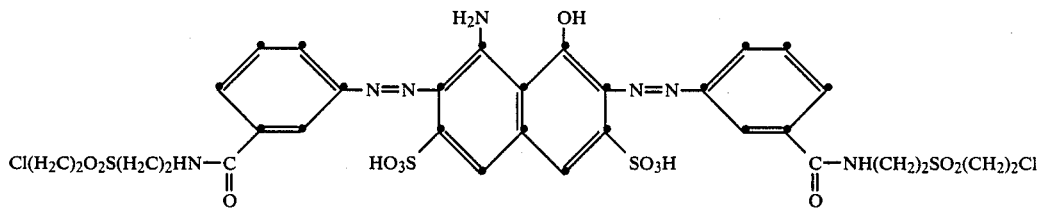

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 183

70.25 parts of 4-β-sulfatoethylsulfonylaniline are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amidosulfonic acid. 77.8 parts of 1-amino-8-hydroxynaphthaline-3,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 82 parts of 1-β(β'-chloroethylsulfonyl)-ethylcarbamoyl-3-aminobenzene hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

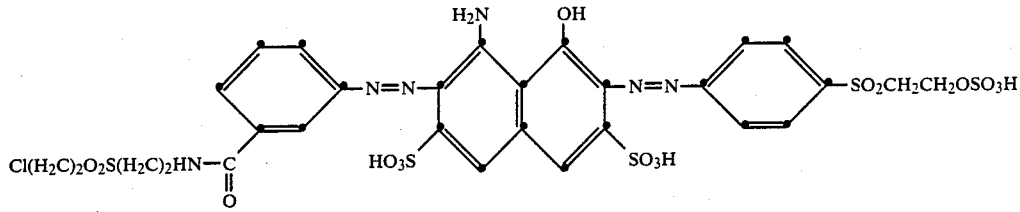

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 184

82 parts of 1-β(β'-chloroethylsulfonyl)-ethylcarbamoyl-3-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 parts of amido-sulfonic acid. 77.8 parts of 1-amino-8-hydroxy-naphthaline-3,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 70.25 parts of 4-β-sulfatoethylsulfonylaniline are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

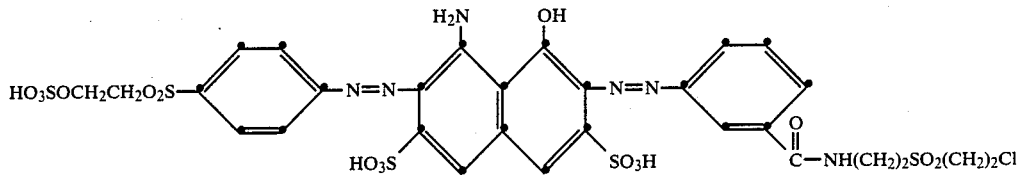

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 185

82 parts of 1-β(β'-chloroethylsulfonyl)-ethylcarbamoyl-3-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxy-naphthaline-4,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 70.25 parts of 4-β-sulfatoethylaniline are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

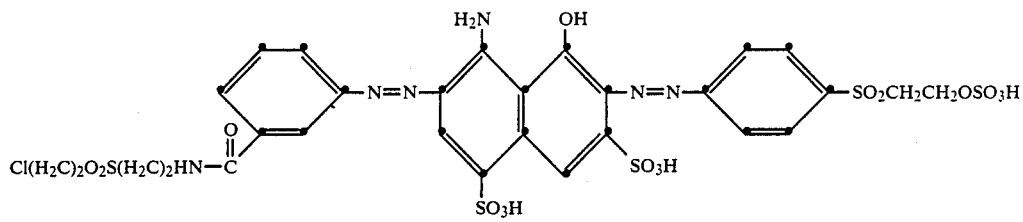

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 186

70.25 parts of 4-β-sulfatoethylsulfonylaniline are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxynaphthaline-4,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 82 parts of 1-β(β'-chloroethylsulfonyl)-ethylcarbamoyl-3-aminobenzene hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

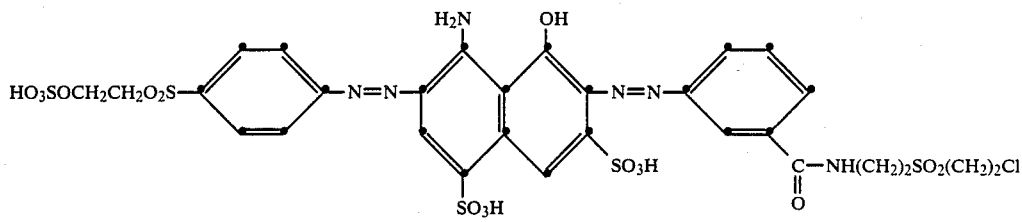

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 187

82.0 parts of the disazo dye 1-amino-2-[4'-1-β(β'-chloroethylsulfonylethylocarbamoylphenyl-phenylazo)]-7-(2''-sulfo-5''-aminophenylazo)-8-naphthol-3,6-disulfonic acid [sic] are reacted in the form of a neutral solution at 0° to 5° with a suspension of 18.5 parts of cyanuric chloride which have been dissolved in 110 parts of acetone and reprecipitated with 250 parts of ice. The reaction takes place at pH 6.0 to 6.5, the pH value being maintained by the dropwise addition of 50 parts of 2-normal sodium carbonate solution. 32 parts of 1-β(β'-chloroethylsulfonyl)-ethylcarbamoyl-3-aminobenzene hydrochloride are then added as a powder, and the mixture is heated to 20° to 30° while the pH value is maintained at 6.0 to 6.5 by the dropwise addition of 100 parts of 2-normal sodium carbonate solution. The resulting dye of the structure

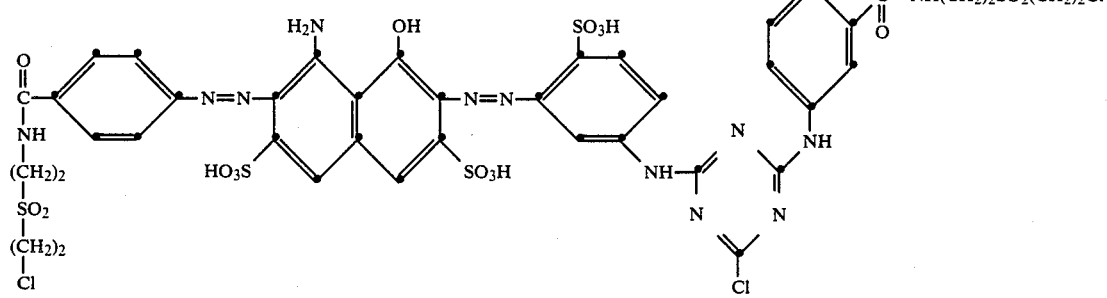

is isolated by salting out or by spray-drying.

EXAMPLE 188

82.0 parts of the disazo dye 1-amino-2-[3'-1-β(β'-chloroethylsulfonyl)-ethylcarbonylphenyl-phenylazo]-7-(2"-sulfo-5"-aminophenylazo)-8-naphthol-3,6-disulfonic acid [sic] are reacted in the form of a neutral solution at 0° with 14.2 parts of 2,4,6-trifluoro-1,3,5-triazine in the course of 20 minutes. The reaction takes place at pH 6.0 to 6.5, the pH value being maintained by the dropwise addition of 50 parts of 2-normal sodium carbonate solution. 32 parts of 1β(β'-chloroethylsulfonyl)ethylcarbamoyl-4-aminobenzene hydrochloride are then added in the form of a powder, and the mixture is heated to 0° to 10° while the pH value is maintained at 5.0 to 6.5 by the dropwise addition of 100 parts of 2-normal sodium carbonate solution. The resulting dye of the structure

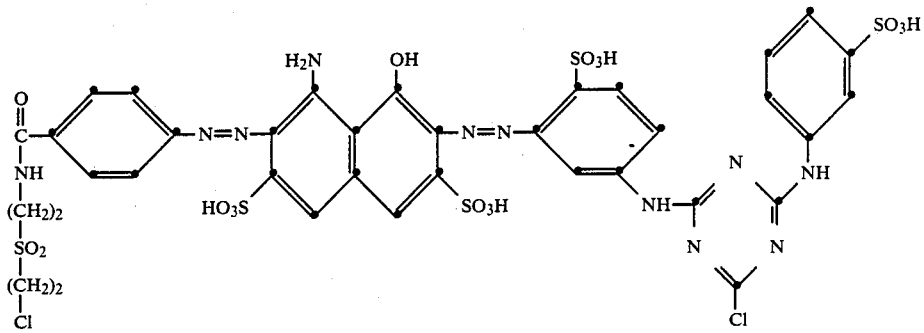

ice. The reaction takes place at pH 6.0 to 6.5, the pH value being maintained by the dropwise addition of 50 parts of 2-normal sodium carbonate solution. 17.3 parts of 3-aminobenzenesulfonic acid are then added as a powder, and the mixture is heated to 20° to 30° while the pH value is maintained at 6.0 to 6.5 by the dropwise addition of 100 parts of 2-normal sodium carbonate solution. The resulting dye of the structure is isolated by salting out or by spray-drying.

EXAMPLE 190

82.0 parts of the disazo dye 1-amino-2-[3'-1-β(β'-chloroethylsulfonylethylcarbamoylphenyl-phenylazo)]-7-(2"-sulfo-5"-aminophenylazo-8-naphthol-3,6-disulfonic acid [sic] are reacted in the form of a neutral solution at 0° to 5° with a suspension of 18.5 parts of cyanuric chloride which have been dissolved in

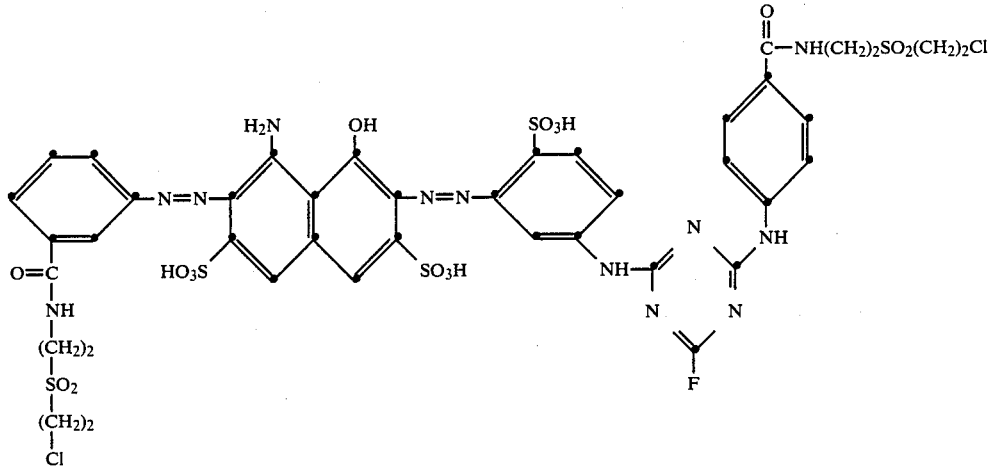

is isolated by salting out or by spray-drying.

EXAMPLE 189

82.0 parts of the disazo dye 1-amino-2-[4'-1-β(β'-chloroethylsulfonylethylcarbamoylphenyl-phenylazo)]-7-(2"-sulfo-5"-aminophenylazo-8-naphthol-3,6-disulfonic acid [sic] are reacted in the form of a neutral solution at 0° to 5° with a suspension of 18.5 parts of cyanuric chloride which have been dissolved in 110 parts of acetone and reprecipitated with 250 parts of ice. The reaction takes place at pH 6.0 to 6.5, the pH value being maintained by the dropwise addition of 50 parts of 2-normal sodium carbonate solution. 20.8 parts of HClH$_2$NCH$_2$CH$_2$SO$_2$CH$_2$CH$_2$Cl are then added as a powder, and the mixture is heated to 20° to 30° while the pH value is maintained at 6.0 to 6.5 by the dropwise addition of 100 parts of 2-normal sodium carbonate solution. The resulting dye of the structure

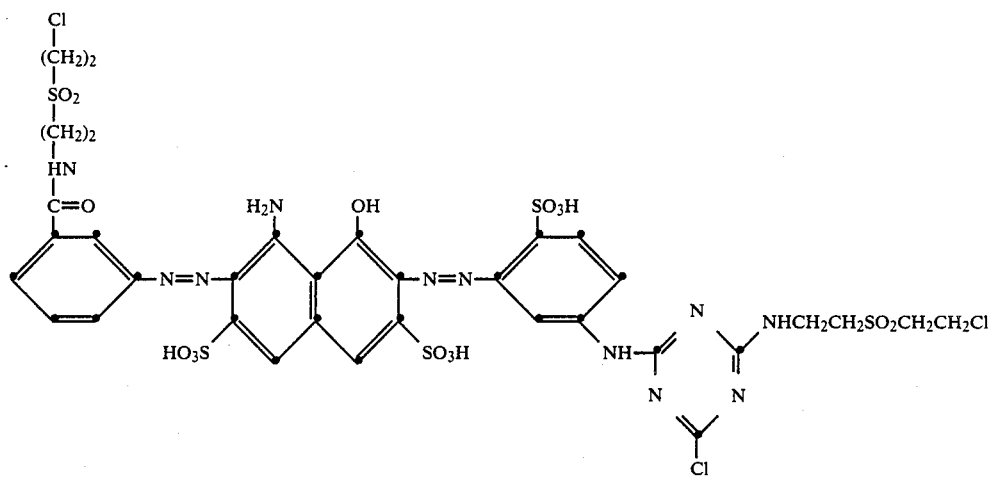

is isolated by salting out or by spray-drying.

EXAMPLE 191

83 parts of the disazo dye 1-amino-2-[4′-1-γ-(β′-chloroethylsulfonyl)-propylcarbamoylphenyl-phenylazo]-7-(2″-sulfo-5″-aminophenylazo)-8-naphthol-3,6-disulfonic acid [sic] are reacted in the form of a neutral solution at 0° to 5° with a suspension of 18.5 parts of cyanuric chloride which have been dissolved in 110 parts of acetone and reprecipitated with 250 parts of ice. The reaction takes place at pH 6.0 to 6.5, the pH value being maintained by the dropwise addition of 50

EXAMPLE 192

82 parts of the disazo dye 1-amino-2-[4′-1-β-(β′-chloroethylsulfonyl)-ethylcarbamoylphenyl-phenylazo]-7-(2″-sulfo-5″-aminophenylazo)-8-naphthol-3,6-disulfonic acid [sic] are reacted in the form of a neutral solution at 20° to 25° with a suspension of 21.0 parts of 2,4-dichloro-6-isopropoxytriazine. The reaction takes place at pH 6.0 to 6.5, the pH value being maintained by the dropwise addition of 50 parts of 2-normal sodium carbonate solution. The resulting resulting [sic] dye of the structure

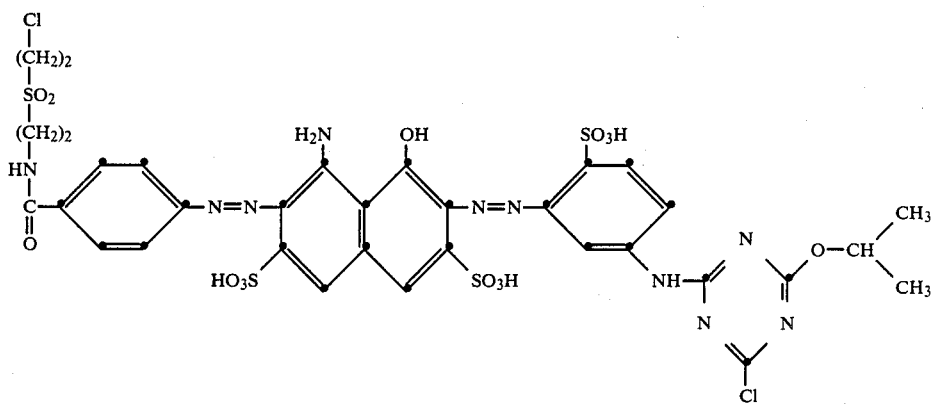

is isolated by salting out or by spray-drying.

parts of 2-normal sodium carbonate solution. The resulting dye of the structure

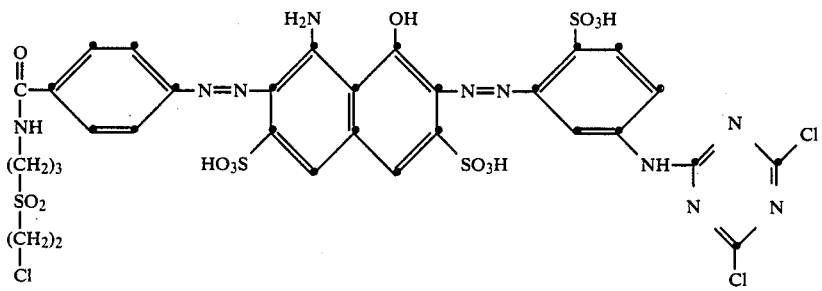

is isolated by salting out or by spray-drying.

EXAMPLE 193

82.0 parts of the disazo dye 1-amino-2-[4′-1-β-(β′-chloroethylsulfonyl)-ethylcarbamoylphenylphenylazo]-7-(2''-sulfo-5''-aminophenylazo)-8-naphthol-3,6-disulfonic acid are reacted in the form of a neutral solution at 0° with 14.2 parts of 2,4,6-trifluoro-1,3,5-triazine in the course of 20 minutes. The reaction takes plce at pH 6.0 to 6.5, the pH value being maintained by the dropwise addition of 50 parts of 2-normal sodium carbonate solution. 17.3 parts of 3-amino-benzenesulfonic acid are then added in the form of a powder, and the mixture is heated to 0° to 20° while the pH value is maintained at 6.0 to 6.5 by the dropwise addition of 100 parts of 2-normal sodium carbonate solution. The resulting dye of the structure hydrochloride in 150 parts of water and 20.3 parts by volume of an aqueous 5N sodium nitrite solution is added at 0° to 5° with stirring to a mixture of 26 parts by volume of 31% aqueous hydrochloric acid and 150 parts of ice. The resulting suspension is stirred for a further hour, and excess nitrous acid is destroyed with amidosulfonic acid. For the coupling reaction, this is then added to a solution of 31.9 parts of 1-amino-8-naphthol-3,6-disulfonic acid in 500 parts of water, which has been brought to a pH value of 4 with hydrochloric acid. The pH value of the coupling is maintained at 1.5 to 2.5 with sodium acetate. After the first coupling reaction

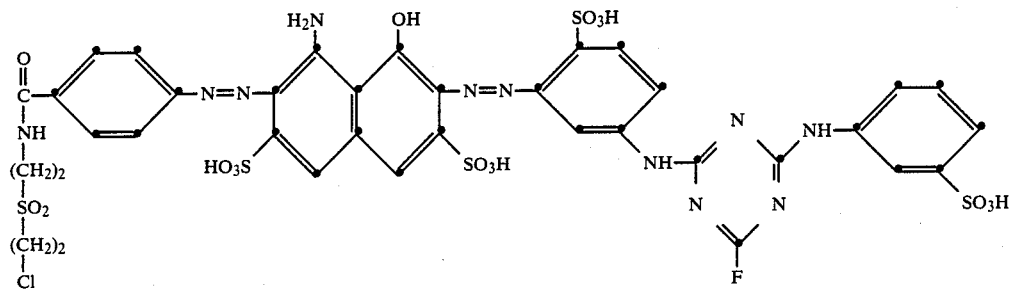

is isolated by salting out or by spray-drying.

EXAMPLE 194

82.0 parts of the disazo dye 1-amino-2-[3'-1-β(β'-chloroethylsulfonyl)-ethylcarbamoylphenyl-phenylazo]-7-(2''-sulfo-5''-aminophenylazo)-8-naphthol-3,6-disulfonic acid are reacted in the form of a neutral solution at 0° with 14.2 parts of 2,4,6-trifluoro-1,3,5-triazine in the course of 20 minutes. The reaction takes place at pH 6.0 to 6.5, the pH value being maintained by the dropwise addition of 50 parts of 2-normal sodium carbonate solution. 25.2 parts of HClH$_2$NCH$_2$CH$_2$OCH$_2$CH$_2$SO$_2$CH$_2$CH$_2$Cl are then added in the form of a powder, and the mixture is heated to 0° to 10° while the pH value is maintained at 4.0 to 4.5 by the dropwise addition of 100 parts of 2-normal sodium carbonate solution. The resulting dye of the structure has ended, the monoazo compound formed is reacted with the diazonium salt solution in a second coupling reaction. This diazonium salt solution is prepared as follows:

18.8 parts of 1,3-diaminobenzene-4-sulfonic acid are added to 200 parts of water and neutralized with sodium carbonate. At 50° to 60° C., 23 parts of 2,4,5,6-tetrachloropymidine are added dropwise in the course of 8 hours. The pH is maintained at a constant 6.0 with 2N NaOH, and the temperature must not exceed 65° C. After the condensation has ended, the fine suspension is filtered and washed with 5% of sodium chloride solution. The press cake is acidified with 35 parts by volume of 31% aqueous hydrochloric acid, has added to it 500 parts of ice and is diazotized by slowly adding 20 parts by volume of an aqueous 5N sodium nitrite solution. As customary, excess nitrous acid is then destroyed with a little amidosulfonic acid. The diazonium salt suspension

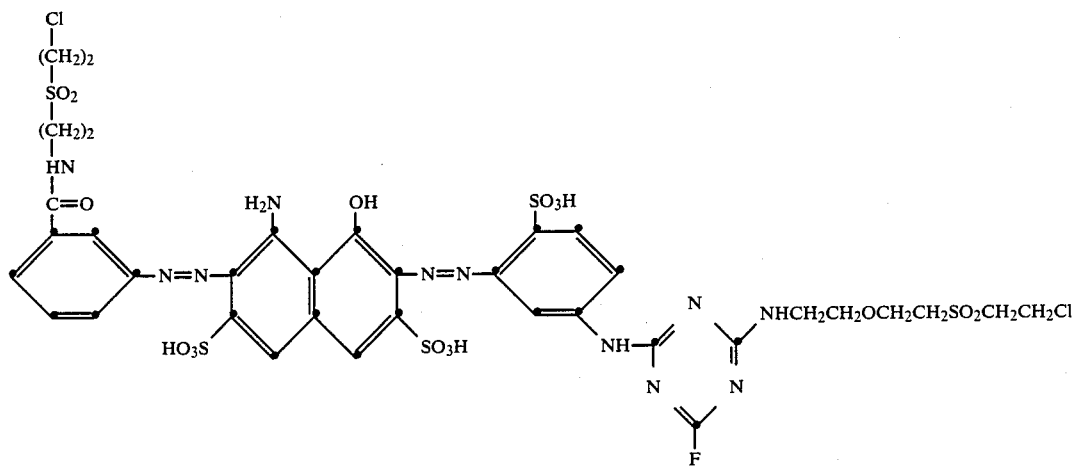

is isolated by salting out or by spray-drying.

EXAMPLE 195

A mixture of a neutral solution of 33 parts of 1-β(β'-chloroethylsulfonyl)-ethylcarbamoyl-4-aminobenzene is then adjusted to a pH value of 5.5 to 6.5 with 17.8 parts of sodium bicarbonate and, as mentioned above, coupled with the solution of the monoazo compound at a pH value of 5.5 to 6.5. The disazo compound formed is salted out with sodium chloride, filtered off with suction and dried.

This gives the alkali metal salt of the compound of the formula

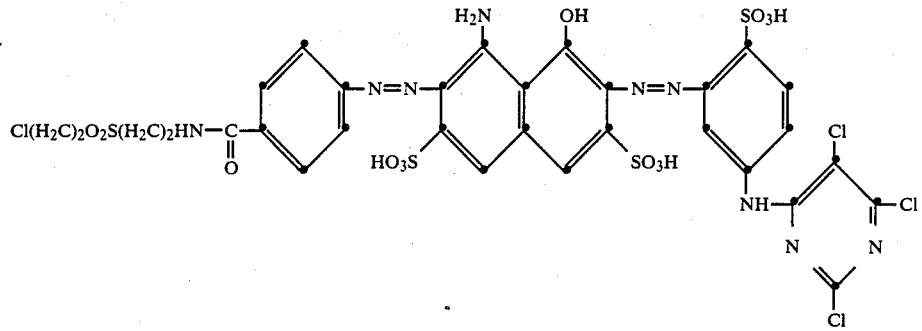

in the form of a black, electrolyte-containing powder. This compound has very good dye properties and produces by the application and fixing methods customary in the industry on cellulose fiber materials navy dyeings and prints having very good end-use and manufacturing fast properties. Applied from a weakly acid bath, the compound also gives on wool navy dyeings whose wet fastness properties after ammoniacal aftertreatment are excellent.

EXAMPLE 196

A mixture of a neutral solution of 33 parts of 1-β(β'-chloroethylsulfonyl)-ethylcarbamoyl-3-aminobenzene hydrochloride in 150 parts of water and 20.3 parts by volume of an aqueous 5N sodum nitrite solution is added at 0° to 5° with stirring to a mixture of 26 parts by volume of 31% aqueous hydrochloric acid and 150 parts of ice. The resulting suspension is stirred for a further hour, and excess nitrous acid is destroyed with amidosulfonic acid. For the coupling reaction, this is then added to a solution of 31.9 parts of 1-amino-8-naphthol-3,6-disulfonic acid in 500 parts of water, which has been brought to a pH value of 4 with hydrochloric acid. The pH value of the coupling is maintained at 1.5 to 2.5 with sodium acetate. After the first coupling reaction has ended, the monoazo compound formed is reacted with the diazonium salt solution in a second coupling reaction. This diazonium salt solution is prepared as follows:

18.8 parts of 1,3-diaminobenzene-4-sulfonic acid are added to 200 parts of water and neutralized with sodium carbonate. At 50° to 60° C., 23 parts of 2,4,5,6-tetrachloropyrimidine are added dropwise in the course of 8 hours. The pH is maintained at a constant 6.0 with 2N NaOH, and the temperature must not exceed 65° C. After the condensation has ended, the fine suspension is filtered and washed with 5% of sodium chloride solution. The press cake is acidified with 35 parts by volume of 31% aqueous hydrochloric acid, has added to it 500 parts of ice and is diazotized by slowly adding 20 parts by volume of an aqueous 5N sodium nitrite solution. As customary, excess nitrous acid is then destroyed with a little amidosulfonic acid. The diazonium salt suspension is then adjusted to a pH value of 5.5 to 6.5 with 17.8 parts of sodium bicarbonate and, as mentioned above, coupled with the solution of the monoazo compound at a pH value of 5.5 to 6.5. The disazo compound formed is salted out with sodum chloride, filtered off with suction and dried.

This gives the alkali metal salt of the compound of the formula

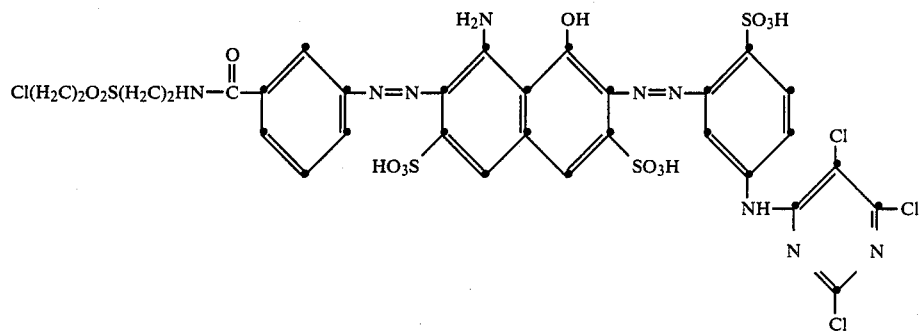

in the form of a black, electrolyte-containing powder. This compound has very good dye properties and produces by the application and fixing methods customary in the industry on cellulose fiber materials navy dyeings and prints having very good end-use and manufacturing fast properties. Applied from a weakly acid bath, the compound also gives on wool navy dyeings whose wet fastness properties after ammoniacal aftertreatment are excellent.

EXAMPLE 197

A mixture of a neutral solution of 34 parts of 1-γ(β'-chloroethylsulfonyl)-propylcarbamoyl-4-aminobenzene hydrochloride in 150 parts of water and 20.3 parts by volume of an aqueous 5N sodium nitrite solution is added at 0° to 5° with stirring to a mixture of 26 parts by volume of 31% aqueous hydrochloric acid and 150 parts of ice. The resulting suspension is stirred for a further hour, and excess nitrous acid is destroyed with amidosulfonic acid. For the coupling reaction, this is then added to a solution of 31.9 parts of 1-amino-8-naphthol-3,6-disulfonic acid in 500 parts of water, which has been brought to a pH value of 4 with hydrochloric acid. The pH value of the coupling is maintained at 1.5 to 2.5 with sodium acetate. After the first coupling reaction has ended, the monoazo compound formed is reacted with the diazonium salt solution in a second coupling reaction. This diazonium salt solution is prepared as follows:

18.8 parts of 1,3-diaminobenzene-4-sulfonic acid are added to 200 parts of water and neutralized with sodium carbonate. At 50° to 60° C., 23 parts of 2,4,5,6-tetra-chloropyrimidine are added dropwise in the course of 8 hours. The pH is maintained at a constant 6.0 with 2N NaOH, and the temperature must not exceed 65° C. After the condensation has ended, the fine suspension is filtered and washed with 5% of sodium chloride solution. The press cake is acidified with 35 parts by volume of 31% aqueous hydrochloric acid, has added to it 500 parts of ice and is diazotized by slowly adding 20 parts by volume of an aqueous 5N sodium nitrite solution. As customary, excess nitrous acid is then destroyed with a little amidosulfonic acid. The diazonium salt suspension is then adjusted to a pH value of 5.5 to 6.5 with 17.8 parts of sodium bicarbonate and, as mentioned above, coupled with the solution of the monoazo compound at a pH value of 5.5 to 6.5. The disazo compound formed is salted out with sodium chloride, filtered off with suction and dried.

This gives the alkali metal salt of the compound of the formula

EXAMPLE 198

A mixture of a neutral solution of 33 parts of 1-$\beta(\beta'$-chloroethylsulfonyl)-ethylcaerbamoyl-4-aminobenzene hydrochloride in 150 parts of water and 20.3 parts by volume of an aqueous 5N sodium nitrite solution is added at 0° to 5° with stirring to a mixture of 26 parts by volume of 31% aqueous hydrochloric acid and 150 parts of ice. The resulting suspension is stirred for a further hour, and excess nitrous acid is destroyed with amidosulfonic acid. For the coupling reaction, this is then added to a solution of 31.9 parts of 1-amino-8-naphthol-3,6-disulfonic acid in 500 parts of water, which has been brought to a pH value of 4 with hydrochloric acid. The pH value of the coupling is maintained at 1.5 to 2.5 with sodium acetate. After the first coupling reaction has ended, the monoazo compound formed is reacted with the diazonium salt solution in a second coupling reaction. This diazonium salt solution is prepared as follows:

18.8 parts of 1,3-diaminobenzene-4-sulfonic acid are added to 200 parts of water and neutralized with sodium carbonate. At 20° to 30° C., 18 parts of 5-chloro-2,4.6-trifluoropyrimidine are added dropwise in the course of 8 hours. The pH is maintained at a constant 6.0 with 2N NaOH, and the temperature must not exceed 65° C. After the condensation has ended, the fine suspension is filtered and washed with 5% of sodium chloride solution. The press cake is acidified with 35 parts by volume of 31% aqueous hydrochloric acid, has added to it 500

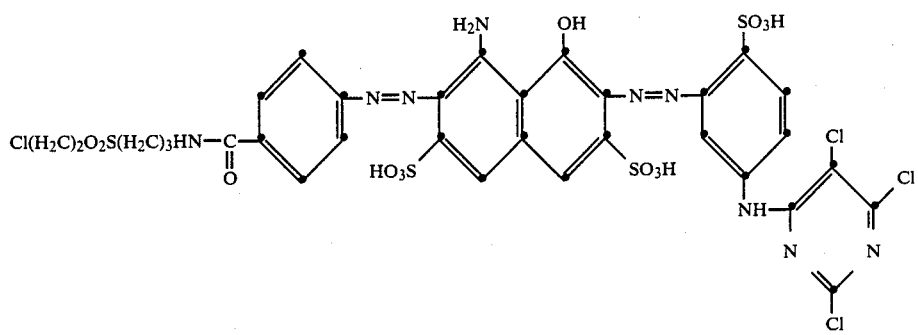

parts of ice and is diazotized by slowly adding 20 parts by volume of an aqueous 5N sodium nitrite solution. As customary, excess nitrous acid is then destroyed with a little amidosulfonic acid. The diazonium salt suspension is then adjusted to a pH value of 5.5 to 6.5 with 17.8 parts of sodium bicarbonate and, as mentioned above, coupled with the solution of the monoazo compound at a pH value of 5.5 to 6.5. The disazo compound formed is salted out with sodium chloride, filtered off with suction and dried.

This gives the alkali metal salt of the compound of the formula in the form of a black, electrolyte-containing powder. This compound has very good dye properties and produces by the application and fixing methods customary in the industry on cellulose fiber materials navy dyeings and prints having very good end-use and manufacturing fast properties. Applied from a weakly acid bath, the compound also gives on wool navy dyeings whose wet fastness properties after ammoniacal aftertreatment are excellent.

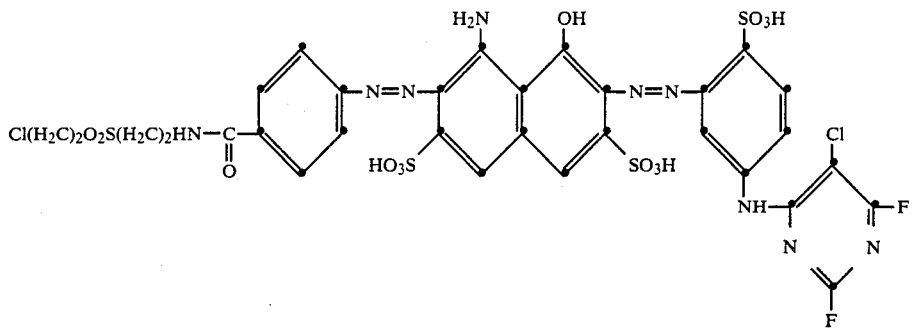

in the form of a black, electrolyte-containing powder. This compound has very good dye properties and produces by the application and fixing methods customary in the industry on cellulose fiber materials navy dyeings and prints having very good end-use and manufacturing fast properties. Applied from a weakly acid bath, the compound also gives on wool navy dyeings whose wet fastness properties after ammoniacal aftertreatment are excellent.

EXAMPLE 199

A mixture of a neutral solution of 33 parts of 1-β(β'-chloroethylsulfonyl)-ethylcarbamoyl-3-aminobenzene hydrochloride in 150 parts of water and 20.3 parts by volume of an aqueous 5N sodium nitrite solution is added at 0° to 5° with stirring to a mixture of 26 parts by volume of 31% aqueous hydrochloric acid and 150 parts of ice. The resulting suspension is stirred for a further hour, and excess nitrous acid is destroyed with amidosulfonic acid. For the coupling reaction, this is then added to a solution of 31.9 parts of 1-amino-8-naphthol-3,6-disulfonic acid in 500 parts of water, which has been brought to a pH value of 4 with hydrochloric acid. The pH value of the coupling is maintained at 1.5 to 2.5 with sodium acetate. After the first coupling reaction has ended, the monoazo compound formed is reacted with the diazonium salt solution in a second coupling reaction. This diazonium salt solution in a second coupling reaction. This diazonium salt solution is prepared as follows:

18.8 parts of 1,3-diaminobenzene-4-sulfonic acid are added to 200 parts of water and neutralized with sodium carbonate. At 50° to 60° C., 18 parts of 5-chloro-2,4,6-trifluoropyrimidine are added dropwise in the course of 8 hours. The pH is maintained at a constant 6.0 with 2N NaOH, and the temperature must not exceed 65° C. After the condensation has ended, the fine suspension is filtered and washed with 5% of sodium chloride solution. The press cake is acidified with 35 parts by volume of 31% aqueous hydrochloric acid, has added to it 500 parts of ice and is diazotized by slowly adding 20 parts by volume of an aqueous 5N sodium nitrite solution. As customary, excess nitrous acid is then destroyed with a little amidosulfonic acid. The diazonium salt suspension is then adjusted to a pH value of 5.5 to 6.5 with 17.8 parts of sodium bicarbonate and, as mentioned above, coupled with the solution of the monoazo compound at a pH value of 5.5 to 6.5. The disazo compound formed is salted out with sodium chloride, filtered off with suction and dried.

This gives the alkali metal salt of the compound of the formula

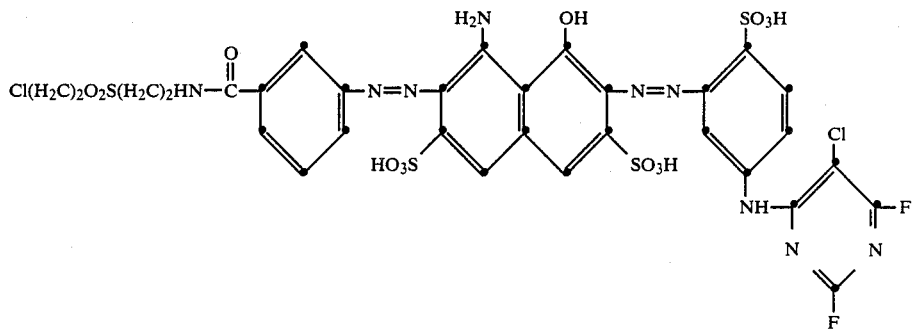

in the form of a black, electrolyte-containing powder. This compound has very good dye properties and produces by the application and fixing methods customary in the industry on cellulose fiber materials navy dyeings and prints having very good end-use and manufacturing fast properties. Applied from a weakly acid bath, the compound also gives on wool navy dyeings whose wet fastness properties after ammoniacal aftertreatment are excellent.

EXAMPLE 200

18.8 parts of 1,3-diaminobenzene-4-sulfonic acid are added to 200 parts of water and neutralized with sodium carbonate. At 50° to 60° C., 23 parts of 2,4,5,6-tetrachloropyrimidine are added dropwise in the course of 8 hours. The pH is maintained at a constant 6.0 with 2N NaOH, and the temperature must not exceed 65° C. After the condensation has ended, the fine suspension is filtered and washed with 5% of sodium chloride solution. The press cake is acidified with 35 parts by volume of 31% aqueous hydrochloric acid, has added to it 500 parts of ice and is diazotized by slowly adding 20 parts by volume of an aqueous 5N sodium nitrite solution. As customary, excess nitrous acid is then destroyed with a little amidosulfonic acid. For the coupling reaction, this is then added to a solution of 31.9 parts of 1-amino-8-naphthol-3,6-disulfonic acid in 500 parts of water, which has been brought to a pH value of 4 with hydrochloric acid. The pH value of the coupling is maintained at 1.5 to 2.5 with sodium acetate. After the first coupling reaction has ended, the monoazo compound formed is reacted with the diazonium salt solution in a second coupling reaction. This diazonium salt solution is prepared as follows:

A mixture of a neutral solution of 33 parts of 1-β(β'-chloroethylsulfonyl)-ethylcarbamoyl-4-aminobenzene hydrochloride in 150 parts of water and 20.3 parts by volume of an aqueous 5N sodium nitrite solution is added at 0° to 5° with stirring to a mixture of 26 parts by volume of 31% aqueous hydrochloric acid and 150 parts of ice. The resulting suspension is stirred for a further hour, and excess nitrous acid is destroyed with amidosulfonic acid. The diazonium salt suspension is then adjusted to a pH value of 5.5 to 6.5 with 17.8 parts of sodium bicarbonate and, as mentioned above, coupled with the solution of the monoazo compound at a pH value of 5.5 to 6.5. The disazo compound formed is salted out with sodium chloride, filtered off with suction and dried.

This gives the alkali metal salt of the compound of the formula carbonate. At 20° to 30° C., 18 parts of 5-chloro-2,4,6-trichloropyrimidine are added dropwise in the course of 1 hour. The pH is maintained at a constant 6.0 with 2N NaOH, and the temperature must not exceed 65° C. After the condensation has ended, the fine suspension is filtered and washed with 5% of sodium chloride solution. The press cake is acidified with 35 parts by volume of 31% aqueous hydrochloric acid, has added to it 500 parts of ice and is diazotized by slowly adding 20 parts by volume of an aqueous 5N sodium nitrite solution. As customary, excess nitrous acid is then destroyed with a little amidosulfonic acid. For the coupling reaction, this is then added to a solution of 31.9 parts of 1-amino-8-naphthol-3,6-disulfonic acid in 500 parts of water, which has been brought to a pH value of 4 with hydrochloric acid. The pH value of the coupling is maintained at 1.5 to 2.5 with sodium acetate. After the first coupling reaction has ended, the monoazo compound formed is reacted with the diazonium salt solution in a second coupling reaction. This diazonium salt solution is prepared as follows:

A mixture of a neutral solution of 33 parts of 1-β(β'-chloroethylsulfonyl)-ethylcarbamoyl-3-aminobenzene hydrochloride in 150 parts of water and 20.3 parts by volume of an aqueous 5N sodium nitrite solution is added at 0° to 5° with stirring to a mixture of 26 parts by volume of 31% aqueous hydrochloric acid and 150

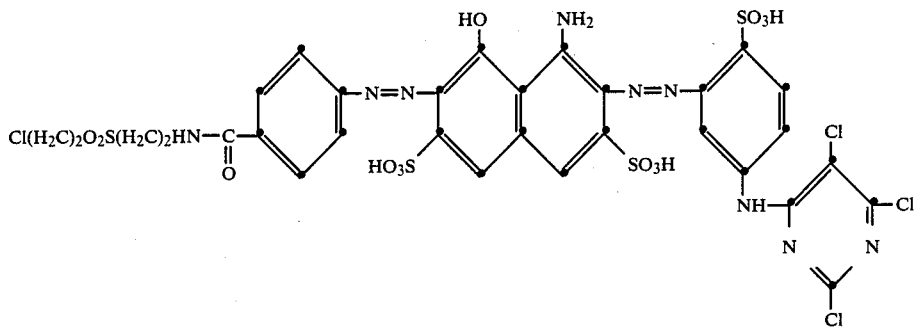

in the form of a black, electrolyte-containing powder. This compound has very good dye properties and produces by the application and fixing methods customary in the industry on cellulose fiber materials navy dyeings and prints having a very good end-use and manufacturing fast properties. Applied from a weakly acid bath, the compound also gives on wool navy dyeings whose wet fastness properties after ammoniacal aftertreatment are excellent.

EXAMPLE 201

18.8 parts of 1,3-diaminobenzene-4-sulfonic acid are added to 200 parts of water and neutralized with sodium parts of ice. The resulting suspension is stirred for a further hour, and excess nitrous acid is destroyed with amidosulfonic acid. The diazonium salt suspension is then adjusted to a pH value of 5.5 to 6.5 with 17.8 parts of sodium bicarbonate and, as mentioned above, coupled with the solution of the monoazo compound at a pH value of 5.5 to 6.5. The disazo compound formed is salted out with sodium chloride, filtered off with suction and dried.

This gives the alkali metal salt of the compound of the formula

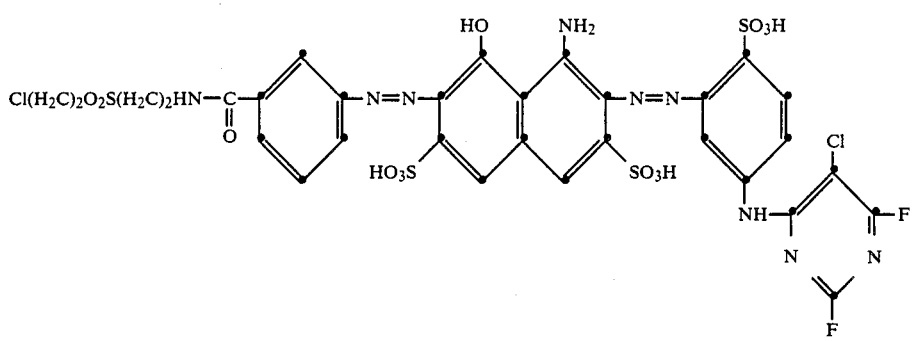

in the form of a black, electrolyte-containing powder. This compound has very good dye properties and produces by the application and fixing methods customary in the industry on cellulose fiber materials navy dyeings and prints having a very good end-use and manufacturing fast properties. Applied from a weakly acid bath, the compound also gives on wool navy dyeings whose wet fastness properties after ammoniacal aftertreatment are excellent.

The methods described (Examples 176–201) can also be used to prepare the dyes which are listed in the table below and which dye cotton in the indicated hue.

| Ex. | | Hue |
|---|---|---|
| 202 | (structure) | navy |
| 203 | (structure) | greenish-navy |
| 204 | (structure) | navy |
| 205 | (structure) | greenish-navy |
| 206 | (structure) | navy |

-continued

| Ex. | | Hue |
|---|---|---|
| 207 | structure with CH₃O, OH, NH₂, SO₃H, HO₃S, HO₃SOH₂CH₂CO₂S-phenyl-N=N-, C-NH(CH₂)₃SO₂(CH₂)₂Cl | greenish-navy |
| 208 | structure with OH, NH₂, SO₃H, HO₃S, H₂C=HCO₂S-phenyl-N=N-, N[(CH₂)₃SO₂CH=CH₂]₂ | greenish-navy |
| 209 | structure with H₃C, OH, NH₂, SO₃H, HO₃S, HO₃SOH₂CH₂CO₂S-phenyl-N=N-, N[(CH₂)₃SO₂CH₂CH₂Cl]₂ | navy |
| 210 | structure with CH₃O, OH, NH₂, SO₃H, HO₃S, HO₃SOH₂CH₂CO₂S-phenyl-N=N-, N[(CH₂)₃SO₂CH₂CH₂Cl]₂ | greenish-navy |

-continued

| Ex. | Structure | Hue |
|---|---|---|
| 211 | (disazo naphthalene dye with HO₃SOH₂CH₂CO₂S-C₆H₄-N=N- and -N=N-C₆H₄-CNH(CH₂)₂O(CH₂)₂SO₂(CH₂)₂Cl on NH₂/OH/SO₃H/HO₃S naphthalene) | navy |
| 212 | (disazo naphthalene dye with H₂C=HCO₂S(H₂C)₂HN-CO-C₆H₄-N=N- and -N=N-C₆H₄-C(O)-NH(CH₂)₂SO₂CH=CH₂ on OH/NH₂/SO₃H/HO₃S naphthalene) | navy |
| 213 | (disazo naphthalene dye with Cl(H₂C)₂O₂S(H₂C)₂HN-CO-C₆H₄-N=N- and -N=N-C₆H₄-C(O)-NH(CH₂)₃SO₂(CH₂)₂Cl on OH/NH₂/SO₃H/HO₃S naphthalene) | navy |
| 214 | (disazo naphthalene dye with Cl(H₂C)₂O₂S(H₂C)₂HNC(O)-C₆H₄-N=N- and Cl-C₆H₃-(N=N-)-C(O)-NH(CH₂)₂SO₂CH₂CH₂Cl on OH/NH₂/SO₃H/HO₃S naphthalene) | navy |

-continued

| Ex. | Structure | Hue |
|---|---|---|
| 215 | (structure with Cl(H₂C)₂O₂S(H₂C)₂HN-CO- phenyl-N=N- / HO₃S, NH₂, OH / SO₃H, CH₃O / -C(O)-NH(CH₂)₂SO₂(CH₂)₂Cl) | greenish-navy |
| 216 | (structure with Cl(H₂C)₂O₂S(H₂C)₂HN-CO- phenyl-N=N- / HO₃S, NH₂, OH / SO₃H, CH₃ / -C(O)-NH(CH₂)₂SO₂CH=CH₂) | navy |
| 217 | (structure with Cl(H₂C)₂O₂S(H₂C)₃HN-CO- phenyl-N=N- / HO₃S, NH₂, OH / SO₃H / -C(O)-NH(CH₂)₃SO₂(CH₂)₂Cl) | navy |
| 218 | (structure with Cl(H₂C)₂O₂S(H₂C)₂O(H₂C)₂HN-CO- phenyl-N=N- / HO₃S, NH₂, OH / SO₃H / -C(O)-NH(CH₂)₂O(CH₂)₂SO₂(CH₂)₂-Cl) | navy |

| Ex. | Structure | Hue |
|---|---|---|
| 219 | (structure) | greenish-navy |
| 220 | (structure) | navy |
| 221 | (structure) | navy |
| 222 | (structure) | greenish-navy |

| Ex. | | Hue |
|---|---|---|
| 223 | (structure) | navy |
| 224 | (structure) | greenish-navy |
| 225 | (structure) | greenish-navy |
| 226 | (structure) | greenish-navy |
| 227 | (structure) | navy |

-continued

| Ex. | Structure | Hue |
|---|---|---|
| 228 | | navy |
| 229 | | greenish-navy |
| 230 | | navy |
| 231 | | navy |

-continued

| Ex. | Structure | Hue |
|---|---|---|
| 232 | (structure with H₂C=HCO₂S(H₂C)₂HN-C(=O)- phenyl-N=N- on amino-naphthol-disulfonic acid -N=N-phenyl-C(=O)-NH(CH₂)₂SO₂CH=CH₂) | navy |
| 233 | (structure with Cl(H₂C)₂O₂S(H₂C)₂HN-C(=O)- phenyl-N=N- on amino-naphthol-disulfonic acid -N=N-phenyl-C(=O)-NH(CH₂)₃SO₂(CH₂)₂Cl) | navy |
| 234 | (structure with Cl(H₂C)₂O₂S(H₂C)₂HN-C(=O)-phenyl-N=N- on amino-naphthol-disulfonic acid -N=N-(Cl-phenyl)-C(=O)-NH(CH₂)₂SO₂CH₂CH₂Cl) | navy |
| 235 | (structure with Cl(H₂C)₂O₂S(H₂C)₂HN-C(=O)-phenyl-N=N- on amino-naphthol-disulfonic acid -N=N-(CH₃O-phenyl)-C(=O)-NH(CH₂)₂SO₂(CH₂)₂-Cl) | greenish-navy |

-continued

| Ex. | | Hue |
|---|---|---|
| 236 | structure with CH₃, OH, NH₂, SO₃H, HO₃S substituents on naphthalene, azo-linked to phenyl-C(=O)-NH(CH₂)₂SO₂CH=CH₂ and phenyl-C(=O)-NH(CH₂)₂SO₂CH₂CH₂Cl | navy |
| 237 | structure with OH, NH₂, SO₃H, HO₃S substituents on naphthalene, azo-linked to phenyl-C(=O)-NH(CH₂)₃SO₂CH=CH₂ and phenyl-C(=O)-NH(CH₂)₂SO₂CH=CH₂ | navy |
| 238 | structure with OH, NH₂, SO₃H, HO₃S substituents on naphthalene, azo-linked to phenyl-C(=O)-NH(CH₂)₃SO₂(CH₂)₂Cl and phenyl-C(=O)-NH(CH₂)₂SO₂CH₂CH₂Cl | navy |
| 239 | structure with Cl, OH, NH₂, SO₃H, HO₃S substituents on naphthalene, azo-linked to phenyl-C(=O)-NH(CH₂)₂SO₂CH₂CH₂Cl and phenyl-C(=O)-NH(CH₂)₂SO₂CH₂CH₂Cl | navy |

| Ex. | | Hue |
|---|---|---|
| 240 | 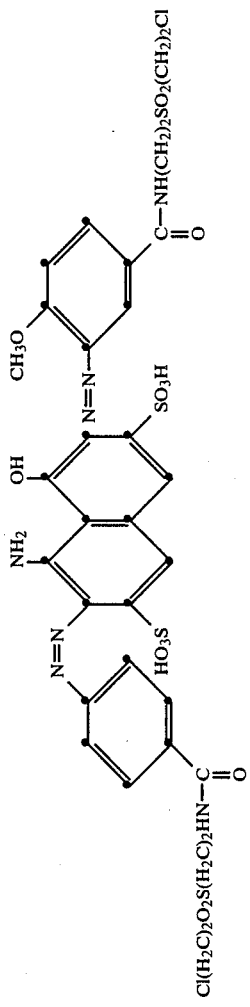 | greenish-navy |
| 241 | 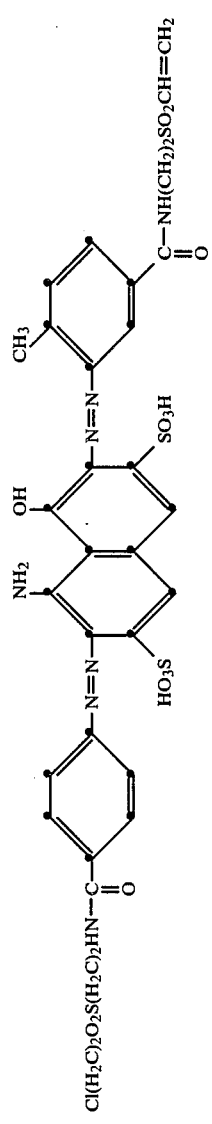 | navy |
| 242 | 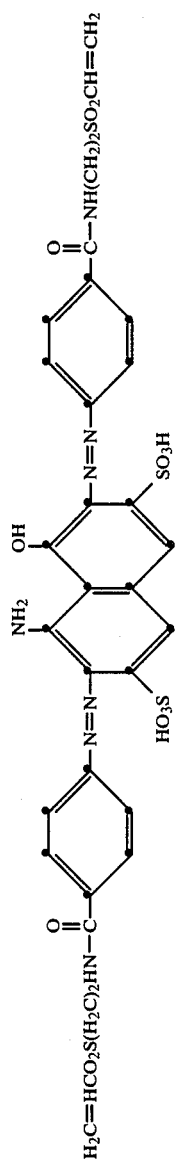 | navy |
| 243 | 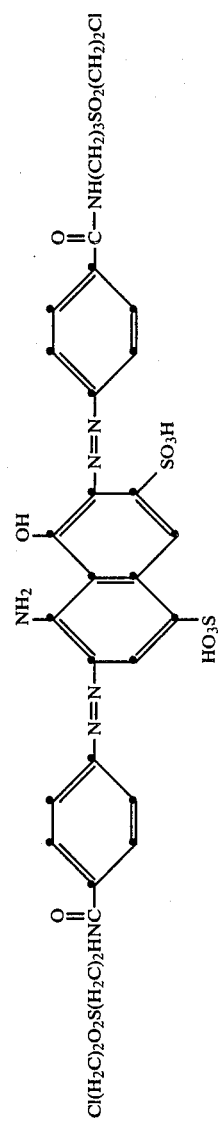 | navy |

| Ex. | | Hue |
|---|---|---|
| 244 |  | navy |
| 245 |  | greenish-navy |
| 246 |  | navy |
| 247 |  | greenish-navy |

| Ex. | | Hue |
|---|---|---|
| 248 | (structure) | greenish-navy |
| 249 | (structure) | navy |
| 250 | (structure) | navy |
| 251 | (structure) | navy |
| 252 | (structure) | greenish-navy |

-continued
| Ex. | | Hue |
|---|---|---|
| 253 | 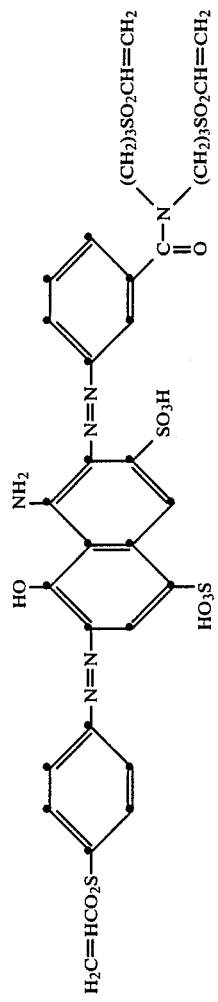 | navy |
| 254 | 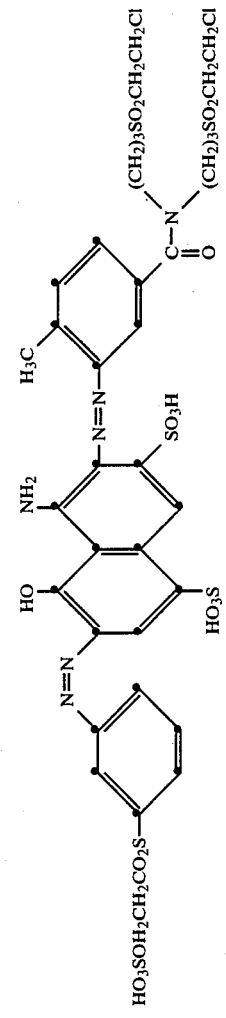 | navy |
| 255 | 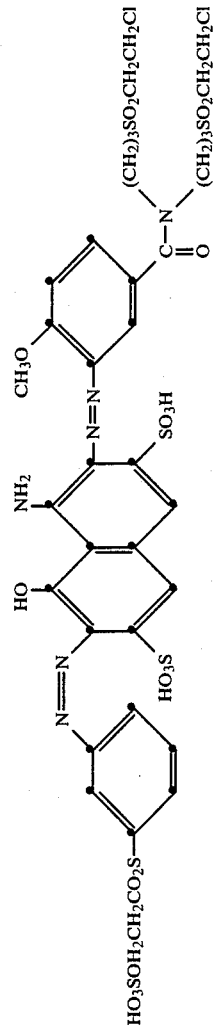 | navy |
| 256 | 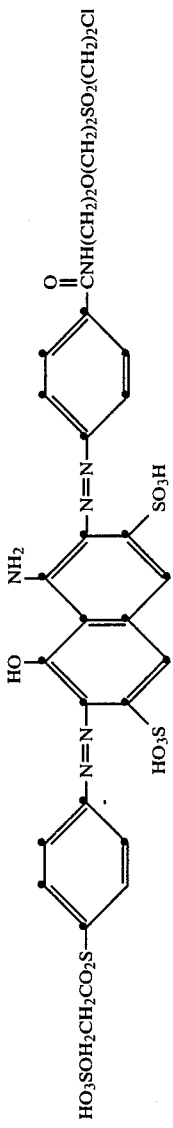 | navy |
| 257 | 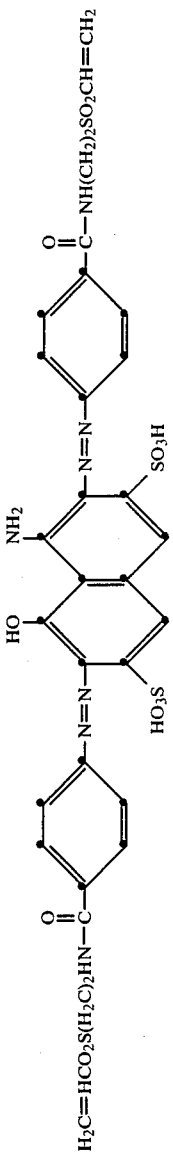 | navy |

-continued

| Ex. | Structure | Hue |
|---|---|---|
| 258 | disazo dye with central 1-amino-8-hydroxynaphthalene-3,6-disulfonic acid (H-acid) core; one azo coupling to 4-[C(=O)NH(CH$_2$)$_3$SO$_2$(CH$_2$)$_2$Cl]phenyl, other azo coupling to 4-[Cl(H$_2$C)$_2$O$_2$S(H$_2$C)$_2$HNC(=O)]phenyl | navy |
| 259 | H-acid core; one azo coupling to 4-chloro-3-[C(=O)NH(CH$_2$)$_2$SO$_2$CH$_2$CH$_2$Cl]phenyl, other azo coupling to 3-[Cl(H$_2$C)$_2$O$_2$S(H$_2$C)$_2$HNC(=O)]phenyl | navy |
| 260 | H-acid core; one azo coupling to 4-methoxy-3-[C(=O)NH(CH$_2$)$_2$SO$_2$(CH$_2$)$_2$Cl]phenyl, other azo coupling to 4-[Cl(H$_2$C)$_2$O$_2$S(H$_2$C)$_2$HNC(=O)]phenyl | navy |
| 261 | H-acid core; one azo coupling to 3-methyl-4-[C(=O)NH(CH$_2$)$_2$SO$_2$CH=CH$_2$]phenyl, other azo coupling to 4-[Cl(H$_2$C)$_2$O$_2$S(H$_2$C)$_2$HNC(=O)]phenyl | navy |

| Ex. | | Hue |
|---|---|---|
| 262 | Structure with Cl(H₂C)₂O₂S(H₂C)₃HN-C(=O)- phenyl-N=N- naphthalene (OH, NH₂, SO₃H, HO₃S) -N=N- phenyl -C(=O)-NH(CH₂)₃SO₂(CH₂)₂Cl | navy |
| 263 | Structure with Cl(H₂C)₂O₂S(H₂C)₂O(H₂C)₂HN-C(=O)- phenyl -N=N- naphthalene (OH, NH₂, SO₃H, HO₃S) -N=N- phenyl -C(=O)-NH(CH₂)₂O(CH₂)₂-SO₂-(CH₂)₂Cl | navy |
| 264 | Structure with H₂C=HCO₂S(H₂C)₂HNC(=O)- phenyl -N=N- naphthalene (OH, NH₂, SO₃H, HO₃S) -N=N- phenyl(CH₃O)-C(=O)-N(CH₂CH₂SO₂CH=CH₂)₂ | navy |
| 265 | Structure with H₂C=HCO₂S(H₂C)₂HNC(=O)- phenyl -N=N- naphthalene (OH, NH₂, SO₃H, HO₃S) -N=N- phenyl(CH₃)-C(=O)-N(CH₂CH₂SO₂CH=CH₂)₂ | navy |

-continued

| Ex. | | Hue |
|---|---|---|
| 266 | structure | navy |
| 267 | structure | navy |
| 268 | structure | navy |
| 269 | structure | greenish-navy |

-continued

| Ex. | Structure | Hue |
|---|---|---|
| 270 | | navy |
| 271 | | greenish-navy |
| 272 | | greenish-navy |
| 273 | | navy |
| 274 | | greenish-navy |

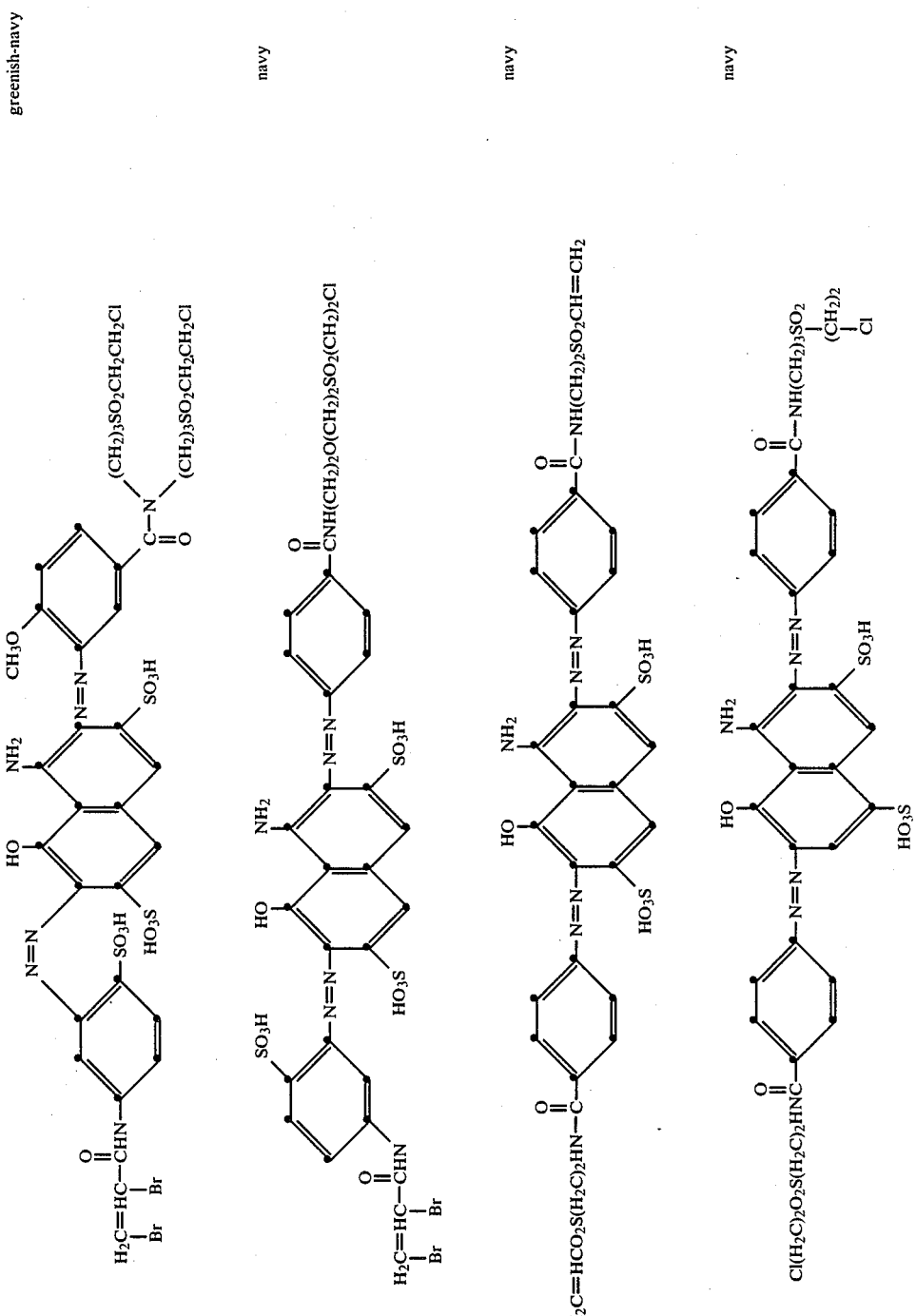

| Ex. | | Hue |
|---|---|---|
| 279 | (structure with Cl-substituted phenyl-azo-naphthalene bearing NH2, OH, SO3H, HO3S groups, azo-linked to phenyl-C(=O)-NH(CH2)2SO2CH2CH2Cl and Cl(H2C)2O2S(H2C)2HNC(=O)-phenyl) | navy |
| 280 | (structure with CH3O-substituted phenyl-azo-naphthalene bearing NH2, OH, SO3H, HO3S groups, azo-linked to phenyl-C(=O)-NH(CH2)2SO2(CH2)2Cl and Cl(H2C)2O2S(H2C)2HN-C(=O)-phenyl) | greenish-navy |
| 281 | (structure with CH3-substituted phenyl-azo-naphthalene bearing NH2, OH, SO3H, HO3S groups, azo-linked to phenyl-C(=O)-NH(CH2)2SO2CH=CH2 and Cl(H2C)2O2S(H2C)2HN-C(=O)-phenyl) | navy |
| 282 | (structure with phenyl-azo-naphthalene bearing NH2, OH, SO3H, HO3S groups, azo-linked to phenyl-C(=O)-NH(CH2)2SO2CH=CH2 and H2C=HCO2S(H2C)2HN-C(=O)-phenyl) | navy |

-continued

| Ex. | Structure | Hue |
|---|---|---|
| 283 | Cl(H₂C)₂O₂S(H₂C)₂HNC(O)-C₆H₄-N=N-[naphthalene: HO, NH₂, SO₃H, HO₃S]-N=N-C₆H₄-C(O)-NH(CH₂)₃SO₂(CH₂)₂Cl | navy |
| 284 | Cl(H₂C)₂O₂S(H₂C)₂HNC(O)-C₆H₄-N=N-[naphthalene: HO, NH₂, SO₃H, HO₃S]-N=N-C₆H₃(Cl)-C(O)-NH(CH₂)₂SO₂CH₂CH₂Cl | navy |
| 285 | Cl(H₂C)₂O₂S(H₂C)₂HN-C(O)-C₆H₃(SO₃H)-N=N-[naphthalene: HO, NH₂, SO₃H, HO₃S]-N=N-C₆H₃(OCH₃)-C(O)-NH(CH₂)₂SO₂(CH₂)₂Cl | greenish-navy |
| 286 | Cl(H₂C)₂O₂S(H₂C)₂HN-C(O)-C₆H₄-N=N-[naphthalene: HO, NH₂, SO₃H, HO₃S]-N=N-C₆H₃(CH₃)-C(O)-NH(CH₂)₂SO₂CH=CH₂ | navy |

| Ex. | Structure | Hue |
|---|---|---|
| 287 | (bis-azo naphthalene dye with H₂C=HCO₂S(H₂C)₂HN-C(O)- phenyl-N=N- and -N=N-phenyl-C(O)-NH(CH₂)₂SO₂CH=CH₂ substituents, NH₂, OH, SO₃H, HO₃S groups) | navy |
| 288 | (bis-azo naphthalene dye with Cl(H₂C)₂O₂S(H₂C)₂HN-C(O)- phenyl-N=N- and -N=N-phenyl-C(O)-NH(CH₂)₃SO₂(CH₂)₂Cl substituents) | navy |
| 289 | (bis-azo naphthalene dye with Cl(H₂C)₂O₂S(H₂C)₂HNC(O)- phenyl-N=N- and Cl-phenyl-N=N- with -C-NH(CH₂)₂SO₂CH₂CH₂Cl) | navy |
| 290 | (bis-azo naphthalene dye with Cl(H₂C)₂O₂S(H₂C)₂HN-C(O)-phenyl-N=N- and OCH₃-phenyl-N=N- with -C-NH(CH₂)₂SO₂(CH₂)₂Cl) | greenish-navy |

| Ex. | | Hue |
|---|---|---|
| 291 | structure with CH₃, NH₂, HO, SO₃H, HO₃S groups; Cl(H₂C)₂O₂S(H₂C)₂HN—C(=O)— and —C(=O)—NH(CH₂)₂SO₂CH=CH₂ substituents on a bis-azo naphthalene | navy |
| 292 | bis-azo naphthalene with OH, NH₂, SO₃H, HO₃S; H₂C=HCO₂S(H₂C)₂HN—C(=O)— and NH-dichlorotriazinyl substituents | navy |
| 293 | bis-azo naphthalene with OH, NH₂, SO₃H, HO₃S; (ClH₂CH₂CO₂SH₂CH₂C)₂N—C(=O)— and NH-dichlorotriazinyl substituents | navy |
| 294 | bis-azo naphthalene with OH, NH₂, SO₃H, HO₃S; ClH₂CH₂CO₂S(H₂C)₃HN—C(=O)— and NH-(chloro, amino)triazinyl substituents | navy |

-continued

| Ex. | | Hue |
|---|---|---|
| 295 | (structure) | navy |
| 296 | (structure) | navy |
| 297 | (structure) | navy |
| 298 | (structure) | navy |

| Ex. | | Hue |
|---|---|---|
| 299 | Structure with H$_2$C=HCO$_2$S(H$_2$C)$_2$HNC(=O)– attached to phenyl–N=N– linked to aminonaphthol disulfonic acid (NH$_2$, OH, HO$_3$S, HO$_3$S) –N=N– phenyl(HO$_3$S)–NH–triazine(F)–NHCH$_2$CH$_2$OH | navy |
| 300 | Structure with (H$_2$C=HCO$_2$S—(H$_2$C)$_3$)$_2$N—C(=O)–phenyl(HO$_3$S)–N=N–aminonaphthol disulfonic acid–N=N–phenyl(HO$_3$S)–NH–triazine(Cl)–NH–phenyl–SO$_3$H | navy |
| 301 | Structure with H$_2$C=HCO$_2$S(H$_2$C)$_2$HNC(=O)–phenyl–N=N–aminonaphthol disulfonic acid (NH$_2$, OH, HO$_3$S, HO$_3$S)–N=N–phenyl(HO$_3$S)–NH–pyrimidine(Cl, Cl) | navy |
| 302 | Structure with Cl(H$_2$C)$_2$O$_2$S(H$_2$C)$_2$HNC(=O)–phenyl–N=N–aminonaphthol disulfonic acid–N=N–phenyl(HO$_3$S)–NH–triazine(F)–N(CH$_2$CH$_2$SO$_2$CH$_2$CH$_2$Cl)$_2$ | navy |

-continued

| Ex. | | Hue |
|---|---|---|
| 303 | (structure) | navy |
| 304 | (structure) | navy |
| 305 | (structure) | navy |
| 306 | (structure) | navy |

-continued

| Ex. | | Hue |
|---|---|---|
| 307 | [structure] | navy |
| 308 | [structure] | navy |
| 309 | [structure] | navy |
| 310 | [structure] | navy |

| Ex. | | Hue |
|---|---|---|
| 311 | (complex azo dye structure with NH₂, OH, HO₃S, SO₃H, HO₃S groups on naphthalene; phenyl-N=N linkage with H₂C=HCO₂S(H₂C)₂HN–C(=O)– substituent; NH-triazine with F and NH-tolyl(CH₃) substituents) | navy |
| 312 | (complex azo dye structure with NH₂, OH, HO₃S, SO₃H, HO₃S groups on naphthalene; Cl-phenyl-N=N linkage with Cl(H₂C)₂O₂S(H₂C)₂HN–C(=O)– substituent; NH-triazine with two Cl substituents) | navy |
| 313 | (complex azo dye structure with NH₂, OH, HO₃S, SO₃H, HO₃S groups on naphthalene; CH₃-phenyl-N=N linkage with Cl(H₂C)₂O₂S(H₂C)₂HNC(=O)– substituent; NH-triazine with two Cl substituents) | navy |
| 314 | (complex azo dye structure with NH₂, OH, HO₃S, SO₃H, HO₃S groups on naphthalene; OCH₃-phenyl-N=N linkage with Cl(H₂C)₂O₂S(H₂C)₂HNC(=O)– substituent; NH-triazine with Cl and NH₂ substituents) | greenish-navy |

-continued

| Ex. | | Hue |
|---|---|---|
| 315 | (structure) | navy |
| 316 | (structure) | navy |
| 317 | (structure) | navy |
| 318 | (structure) | navy |

-continued

| Ex. | Structure | Hue |
|---|---|---|
| 319 | (complex azo dye structure with naphthalene core bearing NH₂, OH, HO₃S, SO₃H groups; diazo linkages to phenyl-SO₂(CH₂)₂Cl and to phenyl-NH-triazine(F)-NHCH₂CH₂OCH₂CH₂SO₂CH₂CH₂Cl; side chain: Cl(CH₂)₂SO₂(CH₂)₂HN-C(=O)-) | navy |
| 320 | (complex azo dye with naphthalene core NH₂, OH, HO₃S; diazo to phenyl bearing C(=O)NH-(CH₂)₂-O-(CH₂)₂-SO₂CH=CH₂ and diazo to phenyl-NH-triazine(F)-NH-C₆H₄-C(=O)NH(CH₂)₃SO₂CH=CH₂) | navy |
| 321 | (naphthalene core NH₂, OH, HO₃S, SO₃H with two azo linkages; one to phenyl-C(=O)-NH(CH₂)₂O(CH₂)₂SO₂(CH₂)₂Cl; other to phenyl-NH-triazine(Cl)(F)) | navy |
| 322 | (naphthalene core NH₂, OH, HO₃S, SO₃H; azo to phenyl-C(=O)-HN-(CH₂)₂-SO₂-(CH₂)₂-Cl; azo to phenyl-NH-triazine(F)-NH-phenyl-SO₃H-NHC(=O)-(CH₂)₃SO₂(CH₂)₂Cl) | navy |

-continued

| Ex. | Structure | Hue |
|---|---|---|
| 323 | | navy |
| 324 | | navy |
| 325 | | navy |
| 326 | | navy |

| Ex. | | Hue |
|---|---|---|
| 327 | 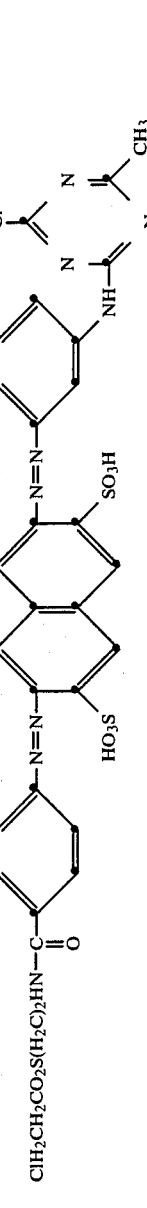 | navy |
| 328 | 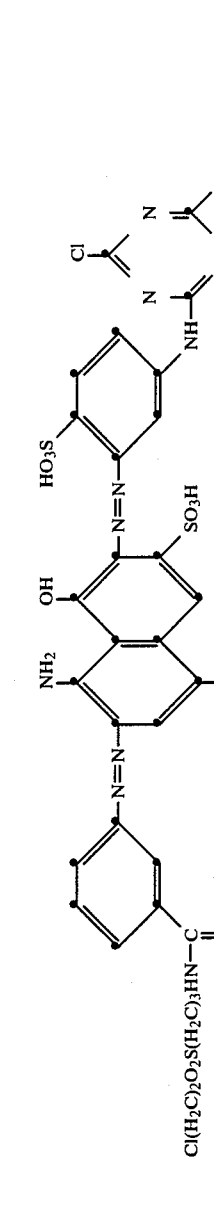 | navy |
| 329 | 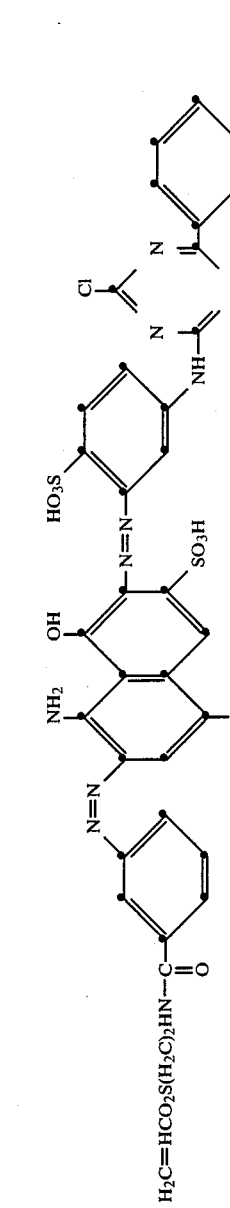 | navy |
| 330 | 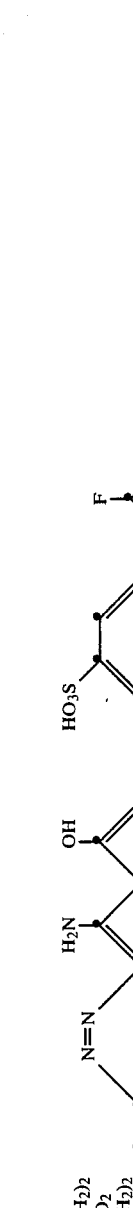 | navy |

-continued

| Ex. | Structure | Hue |
|---|---|---|
| 331 | (complex azo dye structure with H₂C=HCO₂S(H₂C)₂HN−C group, naphthalene with NH₂, OH, HO₃S, SO₃H substituents, azo linkages, fluorotriazine with NH-phenyl-SO₂CH=CH₂) | navy |
| 332 | (complex azo dye with Cl(H₂C)₂O₂S(H₂C)₂O(H₂C)₂HN−C(=O)−phenyl−N=N− naphthalene(OH, NH₂, SO₃H, HO₃S)−N=N−phenyl(HO₃S)−NH− fluorotriazine−N(CH₃)−phenyl) | navy |
| 333 | (complex azo dye with Cl(H₂C)₂O₂S(H₂C)₂O(H₂C)₂HN−C(=O)−phenyl−N=N− naphthalene(OH, NH₂, HO₃S, SO₃H)−N=N−phenyl(HO₃S)−NH− chlorotriazine−NH−CH(CH₃)₂ isopropoxy) | navy |
| 334 | (complex azo dye with H₂C=HCO₂S(H₂C)₃HNC(=O)−phenyl−N=N− naphthalene(OH, NH₂, HO₃S, SO₃H)−N=N−phenyl(HO₃S)−NH− fluorotriazine−NHCH₂CH₂OH) | navy |

-continued

| Ex. | | Hue |
|---|---|---|
| 335 | (structure) | navy |
| 336 | (structure) | navy |
| 337 | (structure) | navy |
| 338 | (structure) | navy |

| Ex. | | Hue |
|---|---|---|
| 339 | (structure) | navy |
| 340 | (structure) | navy |
| 341 | (structure) | navy |
| 342 | (structure) | navy |

-continued

| Ex. | Structure | Hue |
|---|---|---|
| 343 | | navy |
| 344 | | navy |
| 345 | | navy |
| 346 | | navy |

-continued

| Ex. | | Hue |
|---|---|---|
| 347 | (structure) | navy |
| 348 | (structure) | navy |
| 349 | (structure) | navy |
| 350 | (structure) | navy |

| Ex. | | Hue |
|---|---|---|
| 351 | [structure with HO₃S, NH₂, HO, SO₃H, HO₃S, NH linked to dichlorotriazine with Cl substituent; bottom aryl group with N(CH₂CH₂CH₂SO₂CH₂CH₂Cl)₂ amide] | navy |
| 352 | [structure similar to 351 with OCH₃ on triazine instead of one Cl; amide with ClH₂CH₂CO₂S(H₂C)₂HN–C(=O)] | navy |
| 353 | [structure with dichlorotriazine NH-phenyl-N=N-naphthalene(NH₂,HO,SO₃H,HO₃S)-N=N-phenyl-C(=O)NH(CH₂)₂SO₂(CH₂)₂Cl] | navy |
| 354 | [structure with fluorotriazine bearing NHCH₂CH₂OCH₂CH₂SO₂CH₂CH₂Cl group; linked through NH-phenyl-N=N-naphthalene-N=N-phenyl(NH₂,HO)-N=N-phenyl-C(=O)NH(CH₂)₂SO₂(CH₂)₂Cl] | navy |

-continued

| Ex. | | Hue |
|---|---|---|
| 355 | (structure) | navy |
| 356 | (structure) | navy |
| 357 | (structure) | navy |

-continued

| Ex. | | Hue |
|---|---|---|
| 358 | structure | navy |
| 359 | structure | navy |
| 360 | structure | navy |
| 361 | structure | navy |

-continued

| Ex. | Structure | Hue |
|---|---|---|
| 362 | | navy |
| 363 | | navy |
| 364 | | navy |
| 365 | | navy |

-continued

| Ex. | | Hue |
|---|---|---|
| 366 | [structure] | navy |
| 367 | [structure] | navy |
| 368 | [structure] | navy |
| 369 | [structure] | navy |

| Ex. | | Hue |
|---|---|---|
| 370 | | navy |
| 371 | | navy |
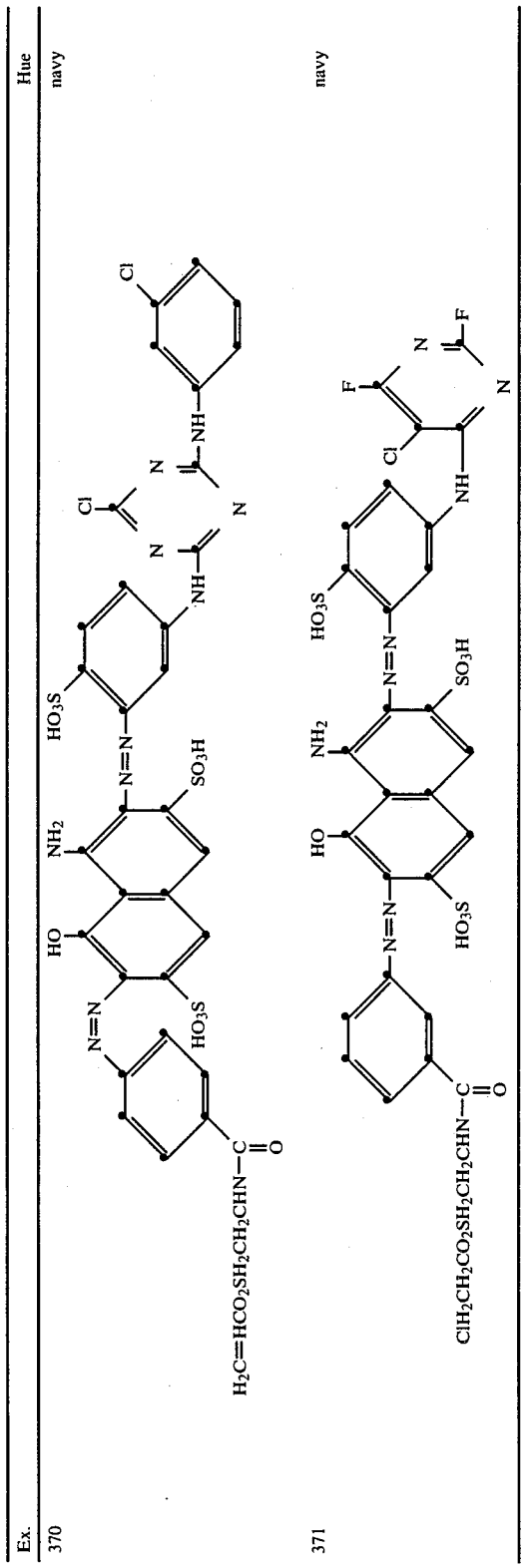

EXAMPLE 372

The diazo solution, prepared in the presence of hydrochloric acid, of 37 parts of 1-amino-4-β-(β'-chloroethylsulfonyl)-ethylaminocarbonylbenzene-2-sulfonic acid is added at 0°–5° C. and pH 5–6, for coupling, to a solution of 29.9 parts of 1-(2'-sulfo-5'-aminophenyl)-3-carboxy-5-pyrazolone. The yellow monoazo dye has subsequently added to it a suspension of 18.8 parts of cyanuric chloride and is acylated at pH 6.

The chlorotriazine dye formed is isolated; it conforms to the formula

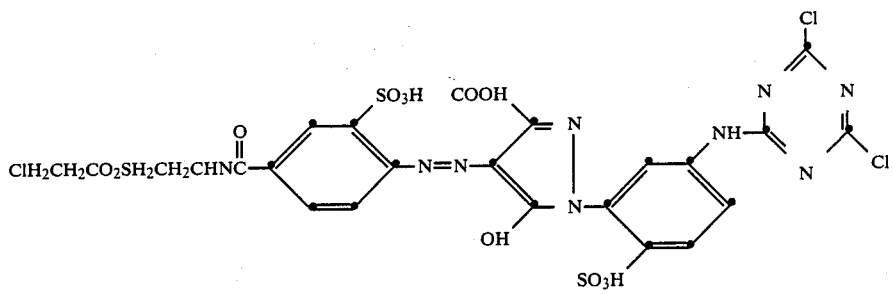

EXAMPLE 373

195 parts of cyanuric chloride are dissolved in 800 parts by volume of acetone; with thorough stirring this solution is added to a mixture of 1300 parts of water and 1300 parts of crushed ice and also 20 parts by volume of 2N hydrochloric acid. To this suspension thus obtained is added with stirring in the course of 50 to 60 minutes a solution, having a pH value of 6.9 to 7.2, of 239 parts of 2-amino-5-naphthol-7-sulfonic acid, 65 parts of sodium carbonate and 2000 parts of water. The reaction of the cyanochloride [sic] with the aminonaphthol is carried out at a temperature between 0° and 5° C. and a pH value of 3 to 5. Stirring is continued until free amine is no longer detectable by means of a diazotization test.

The coupling component solution thus prepared has added to it 370 parts of diazotized 1-amino-4-β-(β'-chloroethylsulfonyl)-ethylaminocarbonylbenzene-2-sulfonic acid. Stirring is carried out for 2 hours, during which the pH value is raised to 6.5–7.0 by sprinkling in sodium carbonate a little at a time. Stirring is continued at that pH value and at room temperature for a further hour. 173 parts of aniline-m-sulfonic acid and, a little at a time, about 110 parts of sodium carbonate are then added in order to maintain the pH value at 5.0 to 6.0. This reaction solution is heated to 50° C. and is maintained at that temperature for one hour with stirring. After the reaction solution has cooled down, the azo compound formed is precipitated by means of sodium chloride, filtered off with suction and dried at 60° C. under reduced pressure. This gives a red, electrolyte-containing powder which contains the sodium salt of the compound of the formula

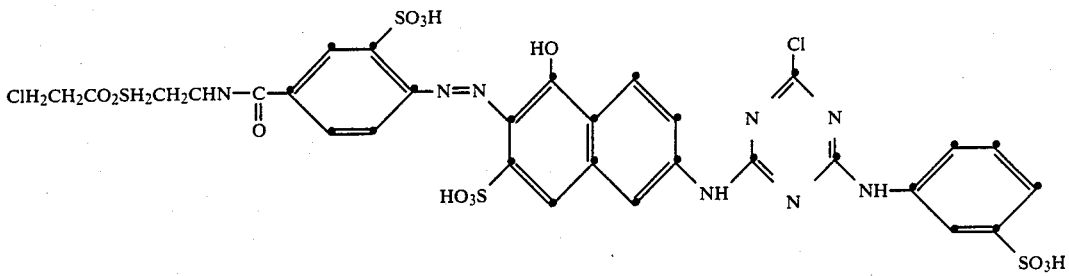

This azo compound is highly suitable for use as a dye. Owing to its fiber-reactive properties, it produces for example from an aqueous-alkaline liquor by a customary exhaust or padding method deep, orange dyeing on cotton fibers. The dyeings have very good wash and light fastness properties.

EXAMPLE 374

64 parts of 1-amino-8-naphthol-3,6-disulfonic acid are dissolved in 800 parts of water at pH 5.0 adding 30% sodium hydroxide solution. The temperature is then raised to 30° C., and 42 parts of 2,4-dichloro-6-isopropoxytriazine are added dropwise, the pH value being maintained at pH 4.0 to 4.5 by the dropwise addition of 2N sodium hydroxide solution. Condensation is carried out at pH 4.0 to 4.5 at 65° C. for 15 hours.

The solution is used as coupling component for dye synthesis.

To prepare the diazonium compound, 74 parts of 1-amino-4-β(β'-chloroethylsulfonyl)-ethylaminocarbonylbenzene-2-sulfonic acid are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula

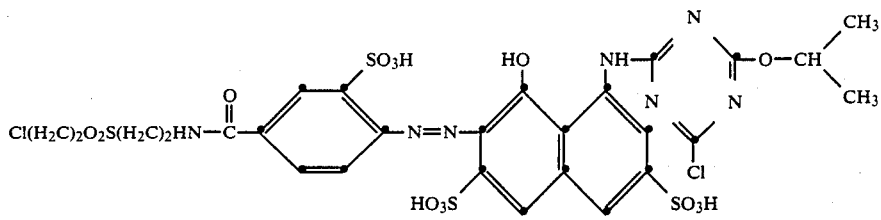

This compound has very good dye properties and dyes cellulose materials by the customary dyeing and printing processes for reactive dyes in bluish-red shades having very good wet fastness properties.

EXAMPLE 375

64 parts of 1-amino-8-naphthol-3,6-disulfonic acid are dissolved in 800 parts of water at pH 9.0 to 9.5 by adding 30% sodium hydroxide solution. The temperature is then reduced to 10° C., and 34 parts of 2,4,6-trifluoro-5-chloropyrimidine are added dropwise, while the pH value is maintained at pH 9.25 to 9.5 by the dropwise addition of 5N sodium hydroxide solution. The mixture is subsequently stirring at pH 8.5 to 9 and 15° C. for 15 minutes and then has added to it 4N hydrochloric acid solution until the pH value of 6.5 is reached.

The solution is used as coupling component for dye synthesis.

To prepare the diazonium compound, 74 parts of 1-amino-4-β(β'-chloroethylsulfonyl)-ethylaminocarbonylbenzene-2-sulfonic acid are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula

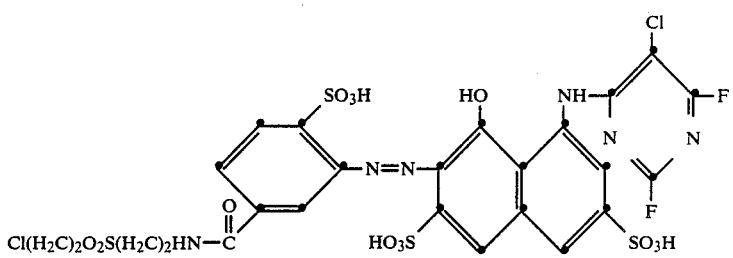

This compound has very good dye properties and dyes cellulose materials by the customary dyeing and printing processes for reactive dyes in bluish-red shades having very good wet fastness properties.

EXAMPLE 376

64 parts of 1-amino-8-naphthol-3,6-disulfonic acid are dissolved in 800 parts of water at pH 5.0 adding 30% sodium hydroxide solution. The temperature is then raised to 60° C., and 45 parts of 2,4,5,6-tetrachloropyrimidine are added dropwise, the pH value being maintained at pH 4.0 to 4.5 by the dropwise addition of 5N sodium hydroxide solution. Condensation is carried out at pH 4.0 to 4.5 at 65° C. for 15 hours.

The solution is used as coupling component for dye synthesis.

To prepare the diazonium compound, 74 parts of 1-amino-4-β(β'-chloroethylsulfonyl)-ethylaminocarbonylbenzene-2-sulfonic acid are suspended in 500 parts of ice-water, acidified with 45 parts of concentrated aqueous hydrochloric acid and diazotized with 40 parts by volume of a 5N sodium nitrite solution. This is followed by stirring at about 5° C. for 2 hours, and then excess nitrous acid is destroyed by means of amidosulfonic acid. The diazonium salt solution thus prepared is slowly added at a pH value of 5.5 to 6.0 to the solution of the coupling component. The mixture is stirred for 2 hours until coupling is complete. The pH value is maintained at 5.5 to 6.0 by adding sodium bicarbonate. The dye is then precipitated with sodium chloride, isolated on the suction filter and dried at 40° C. in vacuo. Milling gives a red, electrolyte-containing dye powder which contains the sodium salt of the compound of the formula

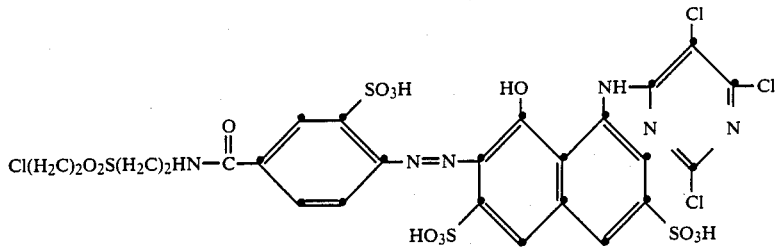

This compound has very good dye properties and dyes cellulose materials by the customary dyeing and printing processes for reactive dyes in bluish-red shades having very good wet fastness properties.

EXAMPLE 377

31.9 parts of 1-amino-8-hydroxynaphthaline-3,6-disulfonic acid are dissolved in 800 ml of water under neutral conditions, and the solution is cooled at 0° to 5°. At that temperature 14.2 parts of 2,4,6-trifluoro-1,3,5-triazine are added dropwise in the course of 20 minutes, during which the pH of the reaction solution is maintained weakly acid to Congo red by simultaneous addition of 2N sodium hydroxide solution. After addition of a mixture, adjusted to . . . [sic] 5, of 11 parts of N-methylaniline in 100 parts of water, the pH of the reaction mixture is first kept weakly acid to Congo red for a short time and then at 5-6 by the continuous addition of 2N sodium hydroxide solution. At the same time the temperature is raised to 20° to 25° in the course of 2 to 3 hours. After the reaction has ended, this intermediate is coupled at 0° to 10° and pH 6.5 with 37 parts of diazotized 1-amino-4-β-(β'-chloroethylsulfonyl)-ethylaminocarbonylbenzene-2-sulfonic acid. After the coupling has ended at pH 8, the reaction mixture is clarified and the resulting reactive dye of the formula

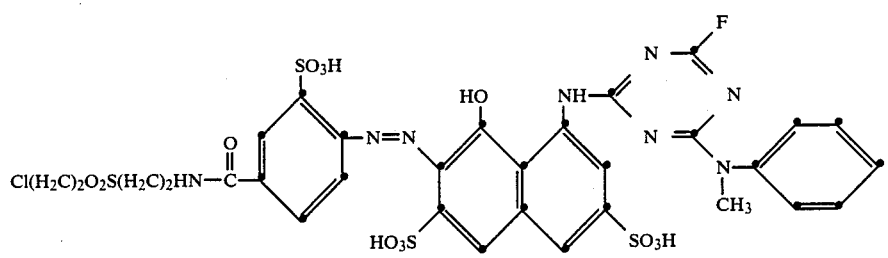

is isolated by evaporating or freeze-drying the reaction solution at pH 7. It dyes cotton in red shades.

EXAMPLE 378

The aqueous solution of the dye of Example 377 is vinylated at room temperature and pH value 10 for about 30 minutes. The pH value is reduced to 6.5 with hydrochloric acid. The monoazo dye is isolated; it conforms to the formula

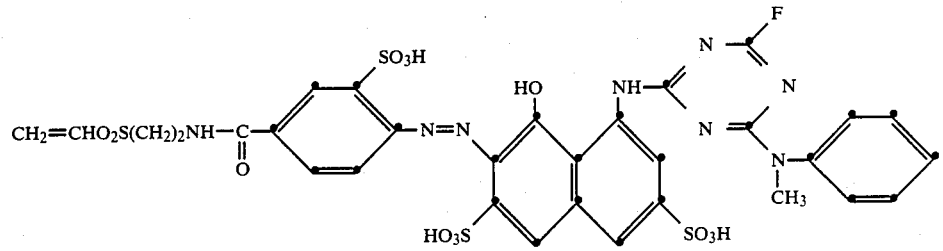

and dyes cotton in red shades.

EXAMPLE 379

(a) To a suspension of 255.2 parts of 1-amino-8-naphthol-3,6-disulfonic acid in 1440 parts of water and 720 parts of ice are added with thorough stirring 155.2 parts of cyanuric chloride; the reaction batch is subsequently stirred for a further 4 hours at a temperature of between 3° and 5° C. and at a pH value between 1.7 and 2.2, which is maintained by means of sodium bicarbonate.

(b) In a separate operation, the diazonium salt of the diazo component is prepared: A solution, having a pH value of 6.7–6.8, of 296 parts of 1-amino-4-β-(β'-chloroethylsulfonyl)-ethylaminocarbonylbenzene-2-sulfonic acid in 640 parts of water have [sic] added to it 105 parts by volume of 40% aqueous sodium nitrite solution. This mixture is added with thorough stirring to a mixture of 800 parts of comminuted ice and 70 parts by volume of 95% aqueous sulfuric acid. This is followed by stirring at a temperature between 0° C. and 5° C. for a further hour, and then, as usual, excess nitrous acid is treated with a little amidosulfonic acid.

(c) The primary condensation product prepared here in (a) from cyanuric chloride and the aminonaphtholdisulfonic acid is combined with the diazonium salt solution described here in (b). To carry out the coupling reaction, the strongly acid reaction mixture is brought at a temperature of about 5° C. to a pH value of 4.0 to 4.5 by means of sodium bicarbonate, and the temperature is raised to 15° to 20° C. Stirring is continued at that pH value and at that temperature for some more hours until the coupling has ended.

(d) The solution of the monoazo compound of (c) is combined with the solution, having a pH value of 5.5 to 6.0, of 240 parts of HClH₂NCH₂CH₂OCH₂CH₂OCH₂CH₂SO₂CH₂CH₂Cl in 640 parts of water. The pH value is maintained at about 6, and the reaction mixture mixture is heated to a temperature of 60° to 65° C. in the course of two hours. The pH is then raised by means of sodium bicarbonate to a value between 6.5 and 7.0, then the filtrate is spray-dried.

This gives about 1100 parts of powder, containing sodium chloride, of the formula acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amidosulfonic acid. 77.8 parts of 1-amino-8-hydroxynaphthaline-3,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 92 parts of 1-amino-4-β(β'-chloroethylsulfonyl)ethylaminocarbonylbenzene-2-sulfonic acid diazotized analogously to the above indications. The diazonium suspension obtained is added to

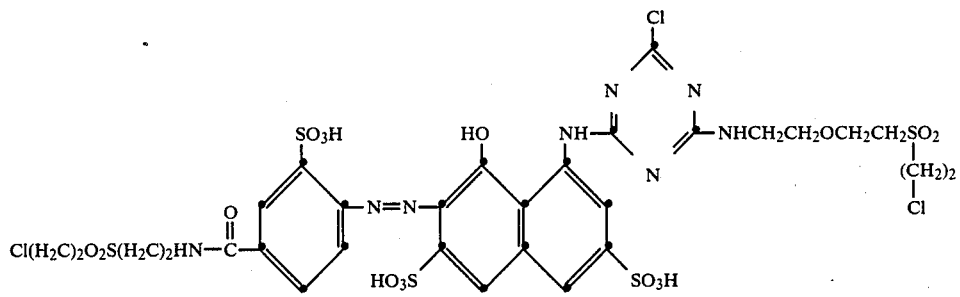

It dyes cotton in red shades.

EXAMPLE 380

The aqueous solution of the dye of Example 379 is vinylated at room temperature and pH value 10 for about 40 minutes. Subsequently the pH value is reduced with hydrochloric acid to 6.0, and the monoazo dye is spray-dried. It conforms to the formula the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

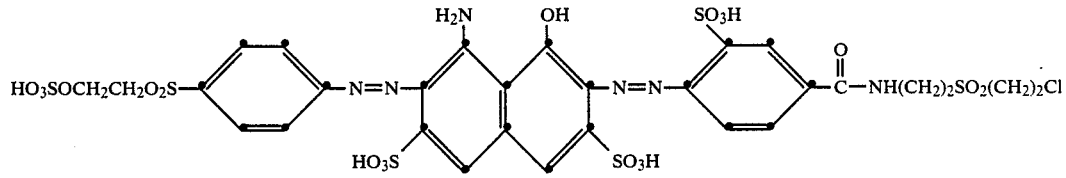

This compound is very highly suitable for use as a dye

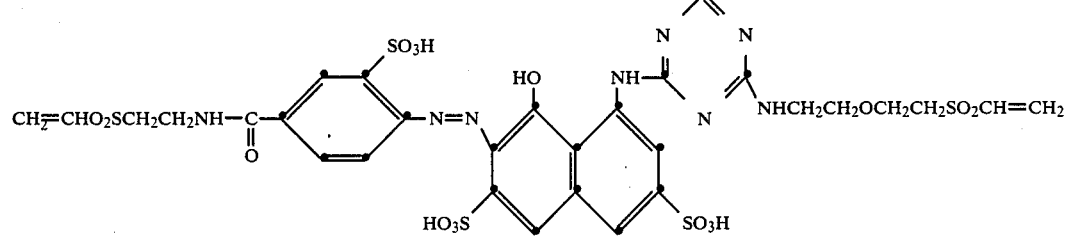

and dyes cotton in red shades having very good fastness properties.

EXAMPLE 381

70.25 parts of 4-β-sulfatoethylsulfonylaniline are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution for dyeing cellulose fiber materials by the known dyeing and printing methods and conventional fixing methods customary in the industry for fiber-reactive dyes; it produces on these materials navy shades having good fastness properties.

EXAMPLE 382

The aqueous solution of the dye of Example 381 is vinylated at room temperature and pH value 10 for about 30 minutes. Subsequently the pH value is reduced with hydrochloric acid to 5.0, and the monoazo dye is spray-dried. It conforms to the formula

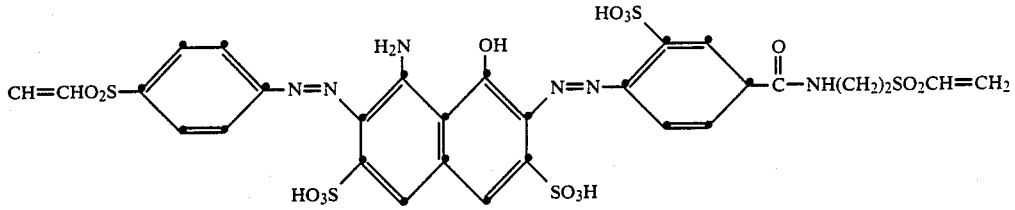

and dyes cotton in navy shades having very good fastness properties.

EXAMPLE 383

82 parts of 1-β-(β'-chloroethylsulfonyl)-ethylcarbamoyl-4-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amidosulfonic acid. 77.8 parts of 1-amino-8-hydroxynaphthaline-3,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 80 parts of 4-β-sulfatoethylsulfonylamiline are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

EXAMPLE 384

82 parts of 1-β-(β'-chloroethylsulfonyl)-ethylcarbamoyl-4-aminobenzene hydrochloride are added to 325 parts of water and are dissolved at 20° to 22° C. in the course of an hour by means of sodium carbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxynaphthaline-4,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 70.25 parts of 4-β-sulfatoethylsulfonylamiline hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

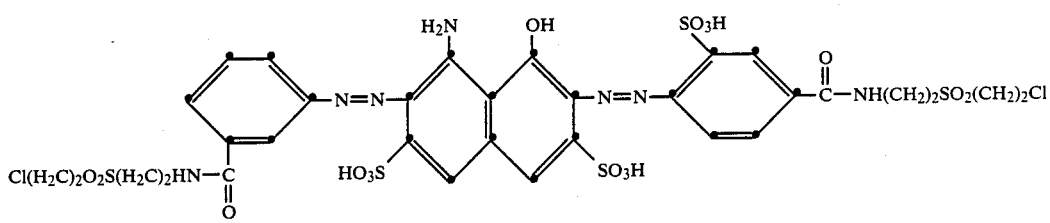

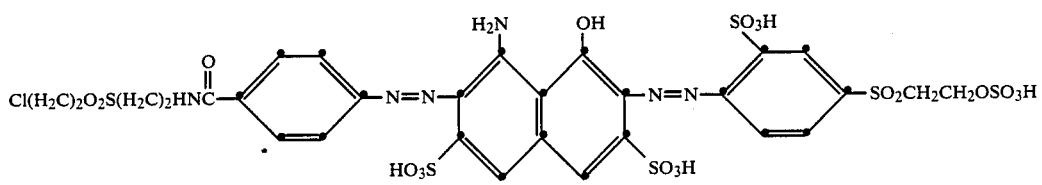

which dies cotton in navy shades having very good fastness properties.

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

EXAMPLE 385

82 parts of 1-β-(β'-chloroethylsulfonyl)-ethylcarbamoyl-3-aminobenzene hydrochloride are added to 325 parts of water and are dissolved at 20° to 22° C. in the course of an hour by means of sodium bicarbonate at a pH value of 5.3 to 6.0. 54 parts by volume of 31% aqueous hydrochloric acid and 225 parts of ice are then added in order to make the solution acid to Congo red and establish a temperature of 0° to 5° C. At that temperature the diazotization is carried out by means of 32.75 parts by volume of a 40% aqueous sodium nitrite solution. Subsequently a small excess of nitrous acid is destroyed with 0.5 part of amido-sulfonic acid. 77.8 parts of 1-amino-8-hydroxynaphthaline-3,6-disulfonic acid are then added, and the batch is stirred at a temperature between 4° and 8° C. and a pH value between 1 and 2 for 4 to 5 hours. After this reaction time the pH value is adjusted to 6.0 with sodium carbonate.

In a separate batch, 70.25 parts of 4-β-sulfatoethylsulfonylamiline hydrochloride are diazotized analogously to the above indications. The diazonium suspension obtained is added to the prepared solution of the monoazo compound. The pH value is maintained at 6 to 7, and the reaction batch is stirred for a further 3 hours. The diazo compound prepared is isolated by evaporating the reaction batch, if necessary after a clarifying filtration.

This gives a black, electrolyte-containing powder which contains the sodium compound of the formula

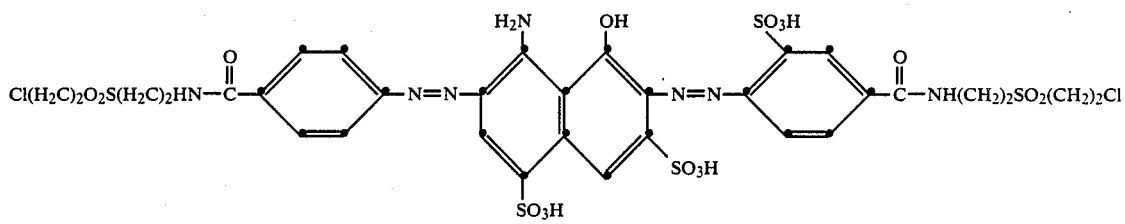

This compound is very highly suitable for use as a dye for dyeing cellulose fiber materials by the known dyeing and printing methods and conventional fixing methods customary in the industry for fiber-reactive dyes; it produces on these materials navy shades having good fastness properties.

Further dyes which can be prepared by the methods given in Examples 372 to 385 are the reactive dyes of the following formulae.

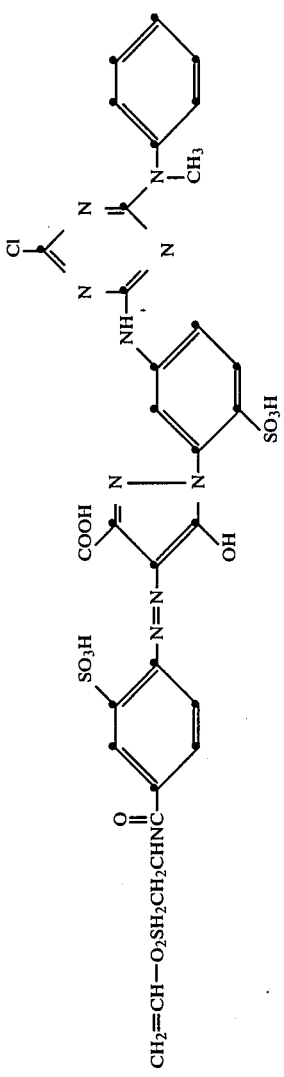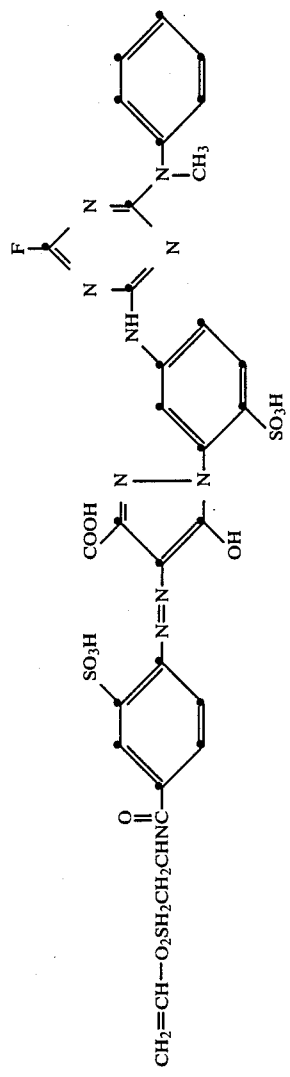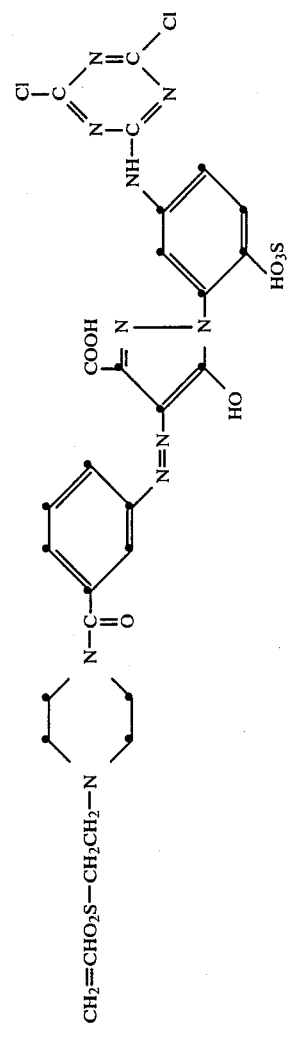

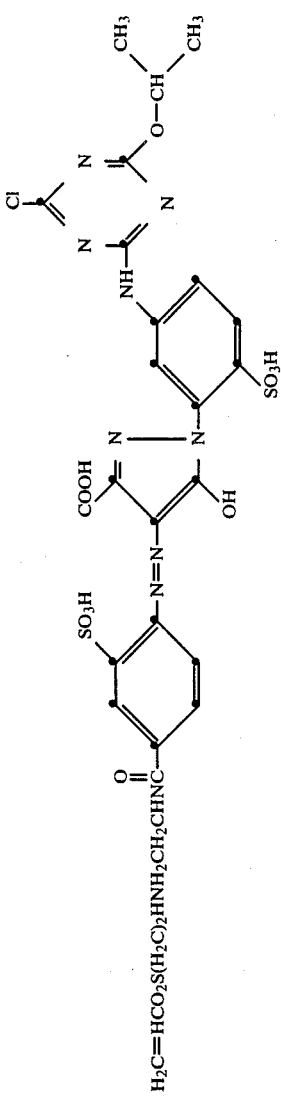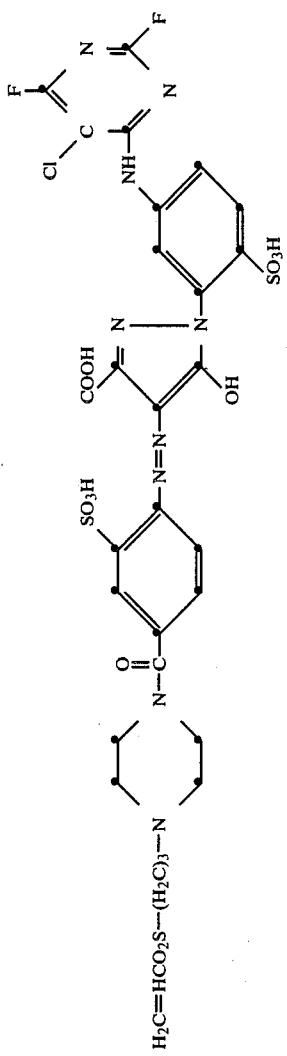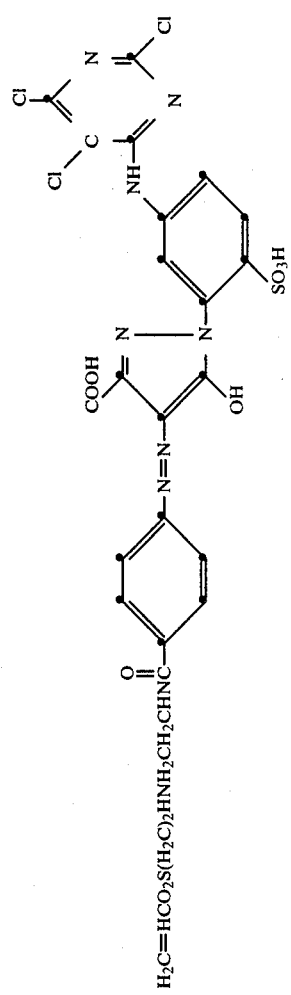

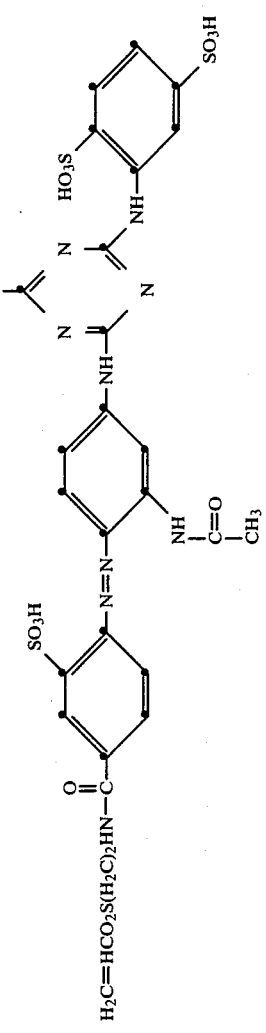
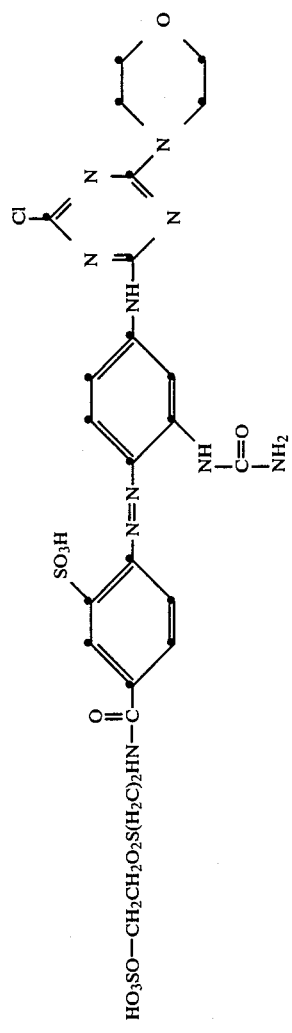
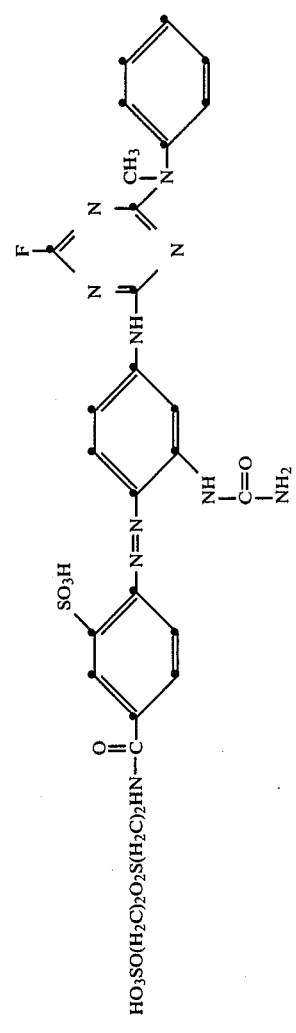

-continued
| | | | |
|---|---|---|---|
| 395 | 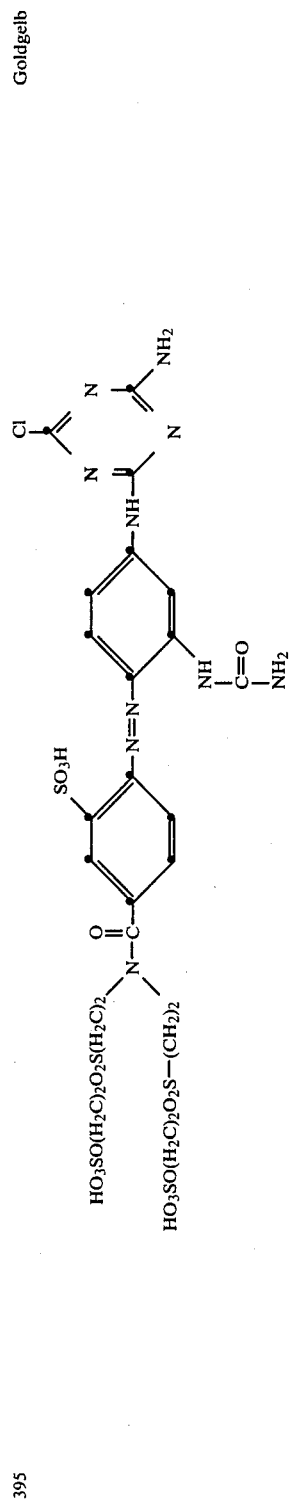 | | Goldgelb |
| 396 | 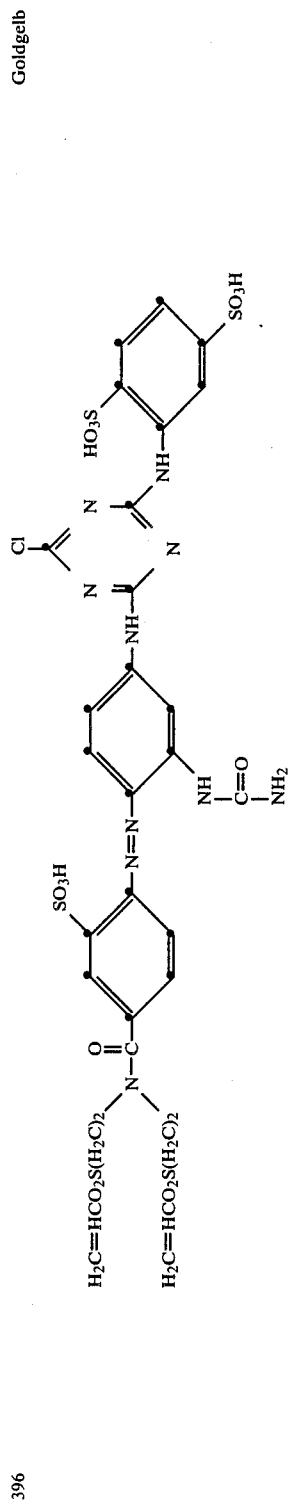 | | Goldgelb |
| 397 | 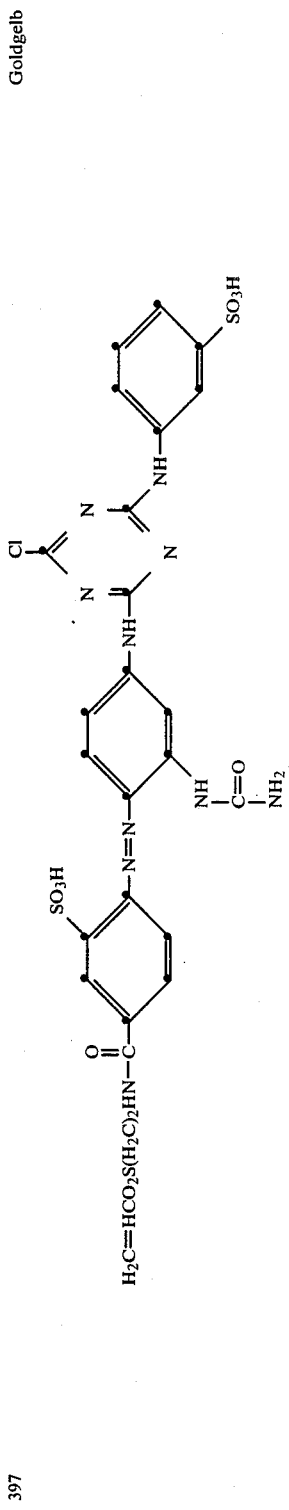 | | Goldgelb |

| | | |
|---|---|---|
| 398 | 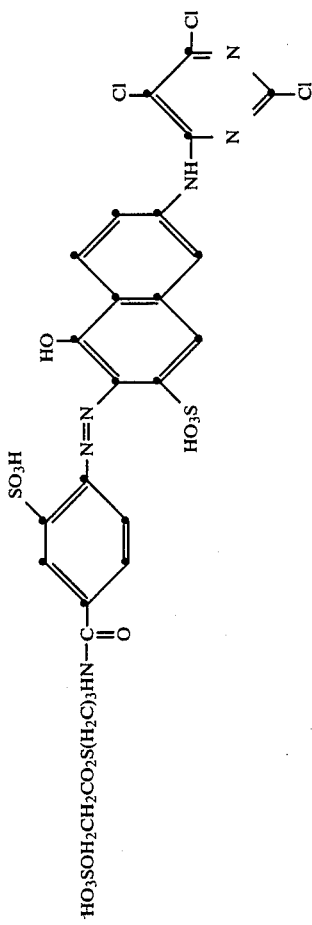 Orange | |
| 399 | 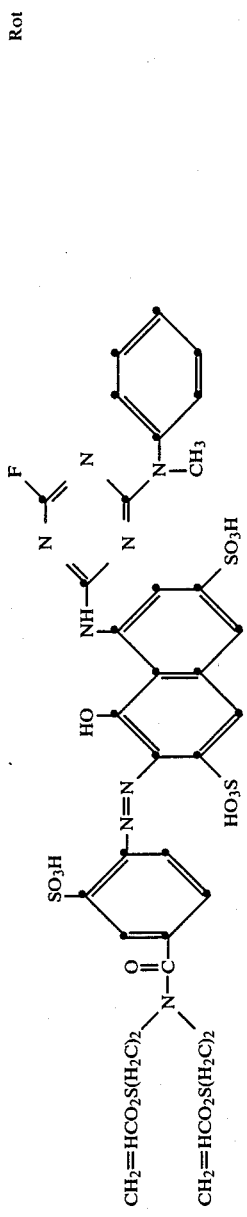 Rot | |
| 400 | 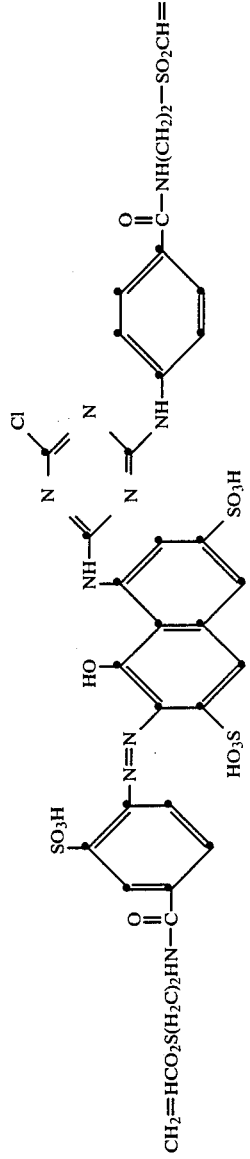 Rot | |

-continued
| 401 | 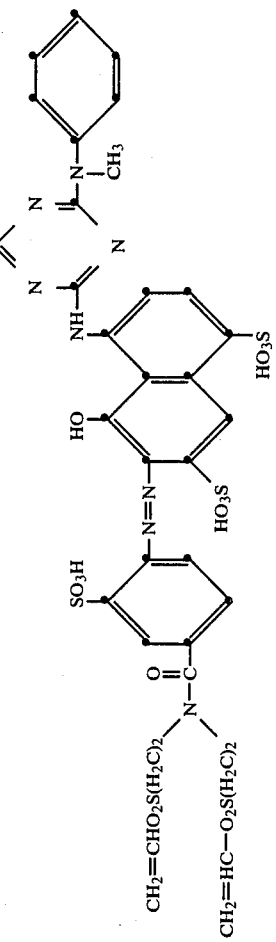 | Scharlach |
| --- | --- | --- |
| 402 | 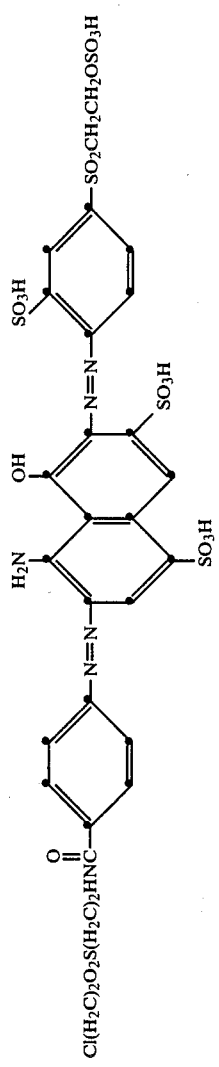 | Marineblau |
| 403 | 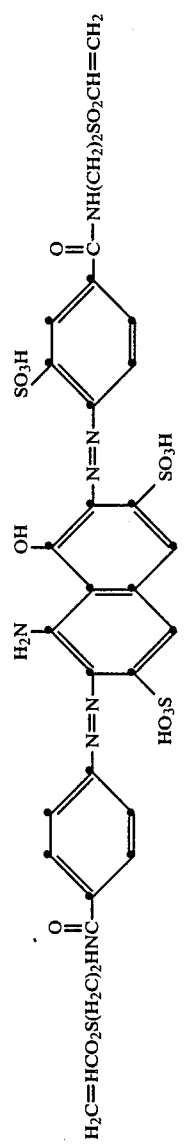 | Marineblau |

DYEING METHOD I 2 parts of the dye obtained in Example 1 are dissolved in 400 parts of water; to this solution are added 1,500 parts of a solution which contains per liter 53 g of sodium chloride. This dyebath is entered at 40° C. with 100 parts of a cotton fabric. After 45 minutes, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. This dyebath is entered at 35° C. with 100 parts of a cotton fabric. After 20 minutes, 100 parts of a solution which cotains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. This dyebath is then entered at 25° C. with 100 parts of a cotton fabric. After 10 minutes, 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is applied to a cotton fabric on a padmangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water. To this solution are added 50 parts of a solution which contains per liter 16 g of sodium hydroxide and 0.04 liter of 38° Be sodium silicate. The resulting solution is applied to a cotton fabric on a padmangle in such a way that its weight increases by 70%, and the fabric is then wound onto a beam. In this state the cotton fabric is left to stand at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% solution of a nonionic detergent for a quarter of an hour, is rinsed and is dried.

PRINTING METHOD I 3 parts of the reactive dye obtained in Example 1 are sprinkled with high-speed stirring into 100 parts of a stock thickening containing 50 parts of 5% sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

I claim:

1. A fiber-reactive dye of the formula

in which D is the radical of a monoazo, polyazo or metal complex azo dye; U is —CO—; R is a radical of the formula

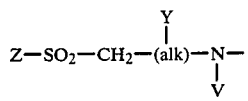

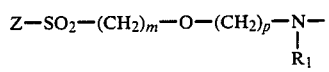

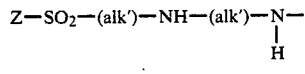

or

-continued

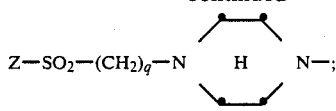

Z is sulfatoethyl, β-thiosultafoethyl, β-phosphatoethyl, β-acetoxyethyl, β-halogenoethyl or vinyl; alk is strightchained or branched $C_1$-$C_6$-alkylene; Y is hydrogen, chlorine, bromine, fluorine, hydroxyl, sulfato, $C_1$-$C_4$-alkanoyloxy, cyano, carboxyl, alkoxycarbonyl having 1 to 5 C-atoms, carbamoyl or a radical —$SO_2$—Z in which Z is as defined above; V is hydrogen or $C_1$-$C_4$-alkyl unsubstituted or substituted by carboxyl, sulfo, $C_1$-$C_2$-alkoxy, halogen or hydroxyl or is a radical

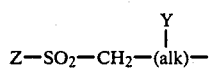

in which Z, alk and Y are as defined above; $R_1$ is hydrogen or $C_{1-6}$-alkyl; alk' are independently of each other straight-chained or branched $C_2$-$C_6$-alkylene; n is 1 or 2, r is 1 or 2, m is 1 to 6, p is 1 to 6, q is 1 to 6; and X is a fiber-reactive radical comprising a halogenotriazine, halogenopyrimidine, halogenoacryloyl, halogenopropionyl, β-halogenoethylsulfonyl, β-sulfatoethylsulfonyl or vinylsulfonyl fiber-reactive group, with the proviso that if D is a monoazo dye X must be a halogenotriazine or halogenopyrimidine group.

2. A fiber-reactive dye according to claim 1, of the formula

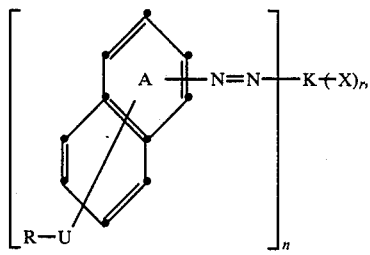

in which K is a benzene, naphthalene, pyridone or pyrazolone radical of a coupling component and the benzene or naphthalene radical A is further unsubstituted or substituted by $C_1$-$C_4$-alkyl, $C_1$-$C_4$-alkoxy, acetylamino, propionylamino, benzoylamino, amino, $C_1$-$C_4$-alkylamino, N,N-di-β-hydroxyethylamino, N,N-di-β-sulfatoethylamino, sulfobenzylamino, N,N-disulfobenzylamino, $C_1$-$C_4$-alkoxycarbonyl, $C_1$-$C_4$-alkylsulfonyl, trifluormethyl, nitro, cyano, halogen, carbamoyl, N-$C_1$-$C_4$-alkylcarbamoyl, sulfamoyl, N-$C_1$-$C_4$-alkylsulfamoyl, N-(β-hydroxyethyl)-sulfamoyl, N,N-di-(β-hydroxyethyl)-sulfamoyl, N-phenulsulfamoyl, ureido, hydroxyl, carboxyl, sulfomethyl or sulfo.

3. A fiber-reactive dye according to claim 2, of the formula

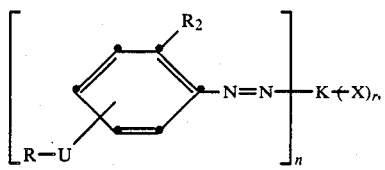

in which $R_2$ is hydrogen, $C_{1-4}$-alkyl, $C_{1-4}$-alkoxy, halogen, hydroxyl, carboxyl or sulfo, and U is —CO—.

4. A fiber-reactive dye according to claim 3, of the formula

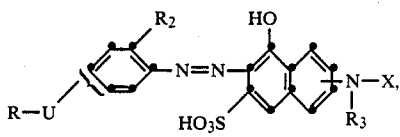

in which $R_3$ is hydrogen or a substituted or unsubstituted $C_{1-4}$-alkyl radical, and U is —CO—.

5. A fiber-reactive dye according to claim 3, of the formula

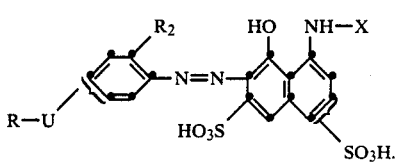

6. A fiber-reactive dye according to claim 3, of the formula

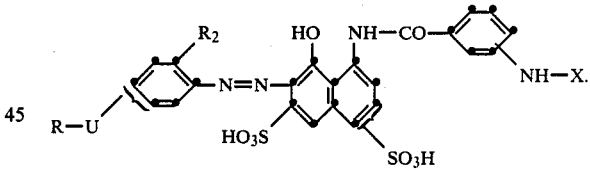

7. A fiber-reactive dye according to claim 3, of the formula

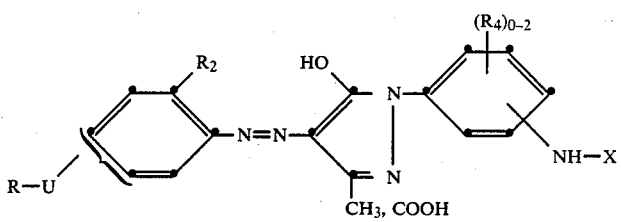

in which $R_4$ is 0 to 2 substituents from the group $C_{1-4}$-alkyl, $C_{1-4}$-alkoxy, halogen, carboxyl or sulfo.

8. A fiber-reactive dye according to claim 3, of the formula

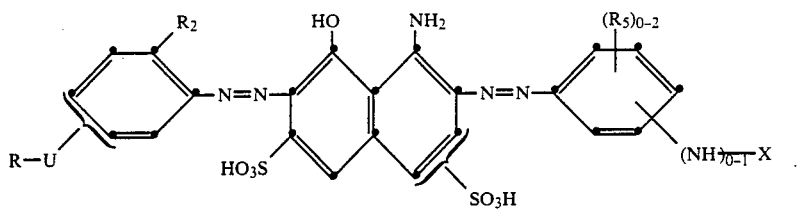
in which R₅ is 0 to 2 substituents from the group $C_{1-4}$-alkyl, $C_{1-4}$-alkoxy, halogen, carboxyl or sulfo.
9. A fiber-reactive dye according to claim 3, of the formula
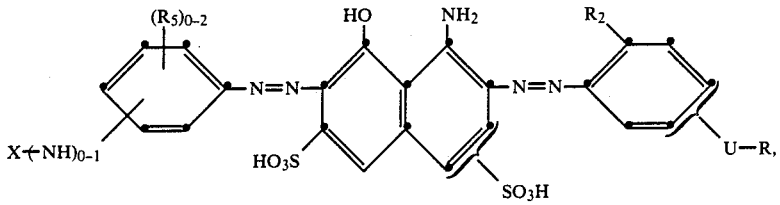
in which $R_5$ is 0 to 2 substituents from the group $C_{1-4}$-alkyl, $C_{1-4}$-alkoxy, halogen, carboxyl or sulfo.
10. A heavy metal complex of a fiber-reactive dye according to claim 3.
* * * * *